(12) United States Patent
Richie

(10) Patent No.: US 8,214,997 B2
(45) Date of Patent: Jul. 10, 2012

(54) ANCHOR STRUCTURE WITH BIDIRECTIONALLY DEFLECTABLE BORE GRIPPING FINGERS

(76) Inventor: Roy A. Richie, Tucson, AZ (US)

( * ) Notice: Subject to any disclaimer, the term of this patent is extended or adjusted under 35 U.S.C. 154(b) by 581 days.

(21) Appl. No.: 12/298,909

(22) PCT Filed: Apr. 26, 2007

(86) PCT No.: PCT/US2007/010047
§ 371 (c)(1),
(2), (4) Date: Oct. 28, 2008

(87) PCT Pub. No.: WO2007/133410
PCT Pub. Date: Nov. 22, 2007

(65) Prior Publication Data
US 2009/0074538 A1  Mar. 19, 2009

Related U.S. Application Data

(60) Provisional application No. 60/795,954, filed on Apr. 29, 2006.

(51) Int. Cl.
*B21J 15/04* (2006.01)
*F16B 13/06* (2006.01)

(52) U.S. Cl. .................. 29/522.1; 29/524.1; 29/525.01; 411/43; 411/45; 411/60.1

(58) Field of Classification Search .............. 29/522.1, 29/525.01, 525.04, 525.05, 525.06, 525.07, 29/243.522, 243.53; 411/45, 57.1, 60.1, 411/43, 60.3, 69
See application file for complete search history.

(56) References Cited

U.S. PATENT DOCUMENTS

| 3,107,570 A | | 10/1963 | Zifferer et al. |
| 3,232,162 A | * | 2/1966 | Ketchum ............. 29/243.522 |
| 3,491,649 A | * | 1/1970 | Smouton et al. ............. 411/43 |
| 3,560,030 A | * | 2/1971 | Macks et al. ............. 403/371 |
| 4,690,598 A | * | 9/1987 | Herb ............................ 411/40 |
| 4,898,505 A | | 2/1990 | Froehlich |
| 5,076,746 A | * | 12/1991 | Fischer et al. ............. 411/55 |
| 5,256,016 A | * | 10/1993 | Godfrey ..................... 411/32 |
| 5,707,190 A | * | 1/1998 | Hiraguri et al. ............. 411/56 |
| 5,993,129 A | * | 11/1999 | Sato ......................... 411/80.6 |
| 7,587,873 B2 | * | 9/2009 | Mcsherry et al. ............. 52/700 |

FOREIGN PATENT DOCUMENTS

| DE | 2524459 | 12/1976 |
| DE | 2535237 | 2/1977 |
| DE | 3341266 | 5/1985 |
| EP | 0124489 | 7/1984 |
| WO | WO8606447 | 11/1986 |

* cited by examiner

*Primary Examiner* — Flemming Saether

(57) ABSTRACT

A bore gripping anchor structure for attaching articles to the outer surfaces of masonry materials and other solids which is actuated by a blind rivet type installation tool. A basic embodiment has an anchor component with bidirectionally deflectable fingers (20) and a concentrically situated and slidably housed actuator device which has a stem (30) and a force applying portion, anvil (40). After insertion into a bore in a first direction, the actuator device is pulled in the opposite direction, so that said anvil (40) interacts with said fingers (20) in a manner which causes said fingers (20) to first be deflected outward and into substantial contact with the wall of the bore, and with continued pulling of said anvil (40) in the opposite direction causes the end portions of said fingers (20) to deflect inward and behind said anvil (40), to couple the anchor structure with the bore.

11 Claims, 24 Drawing Sheets

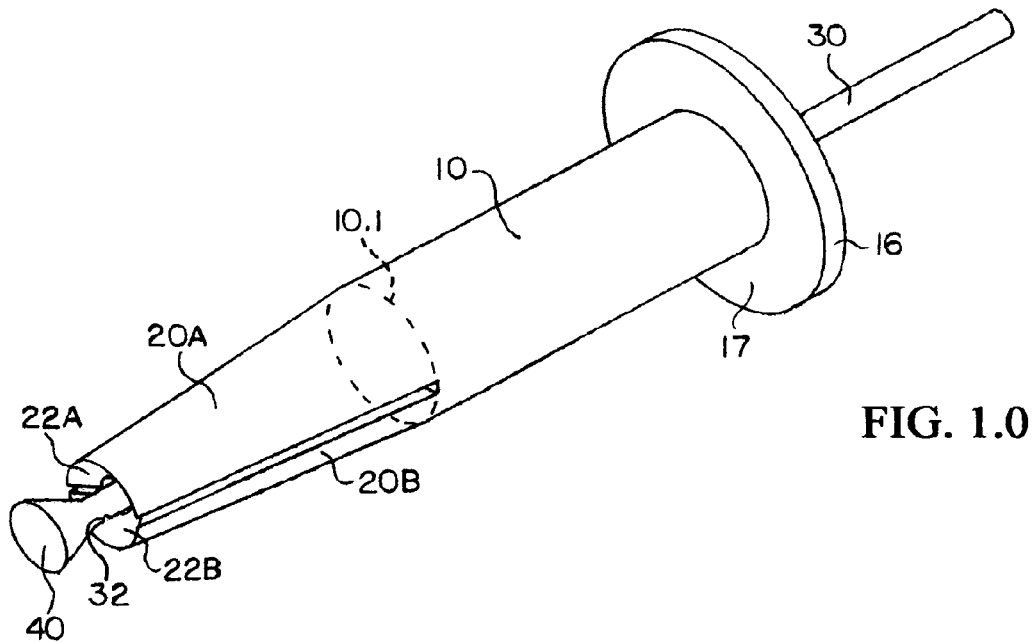
FIG. 1.0
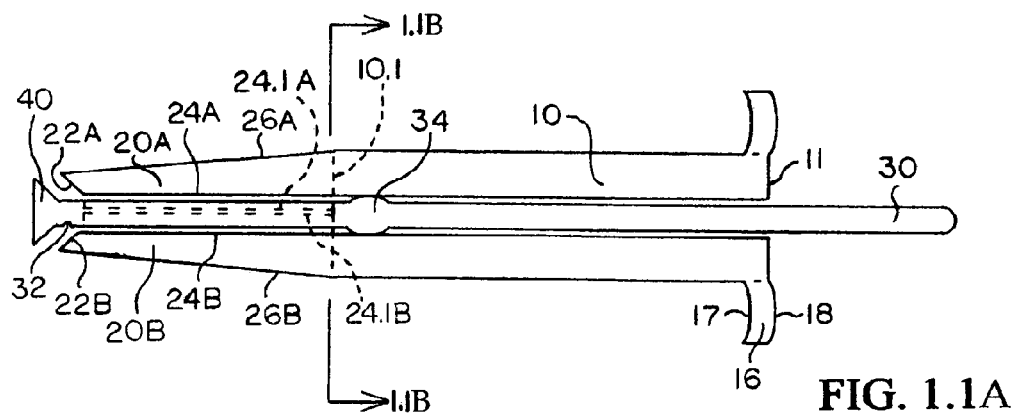
FIG. 1.1A
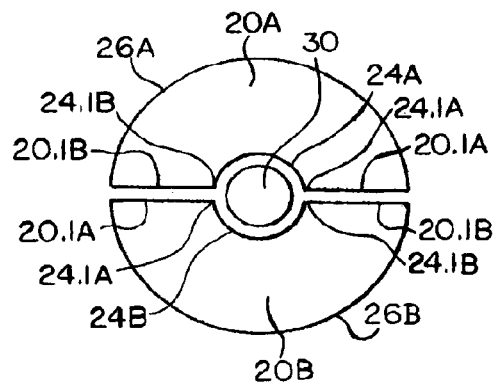
FIG. 1.1B

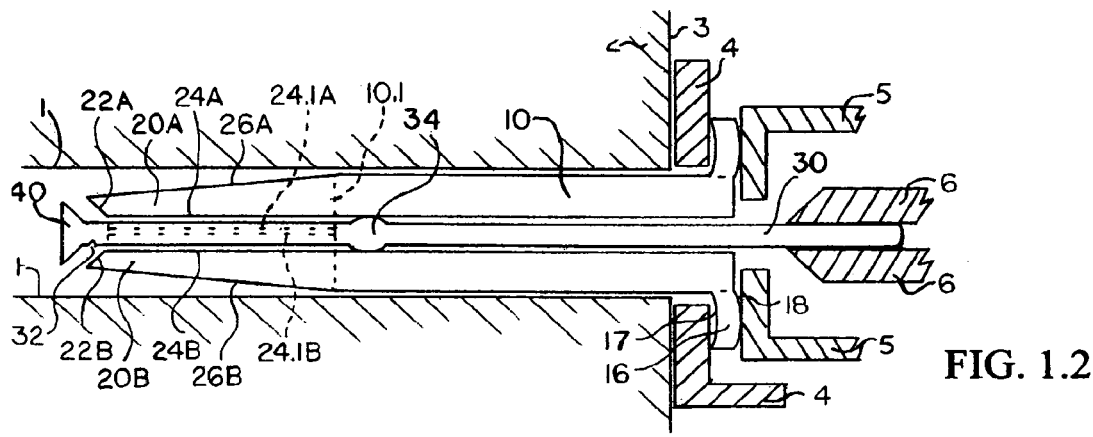
FIG. 1.2
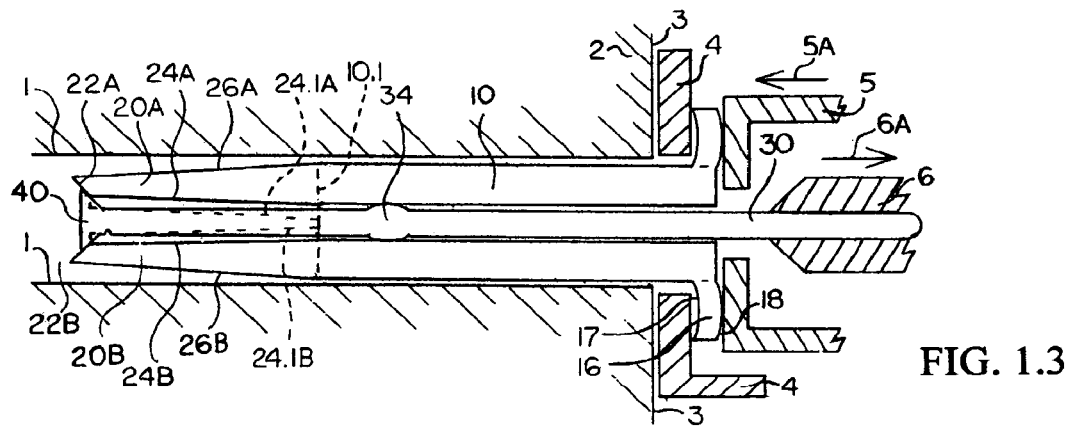
FIG. 1.3
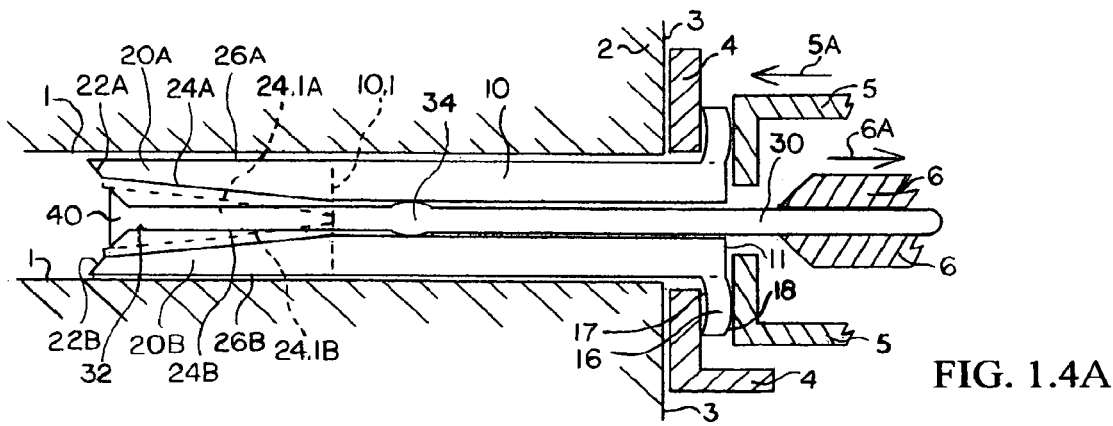
FIG. 1.4A
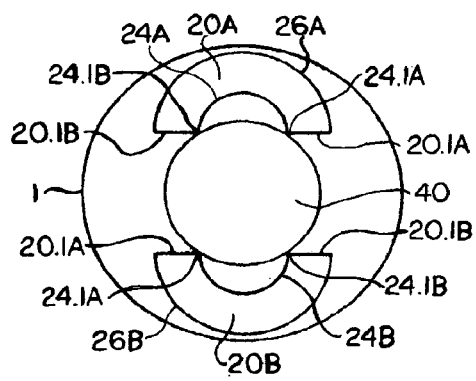
FIG. 1.4B

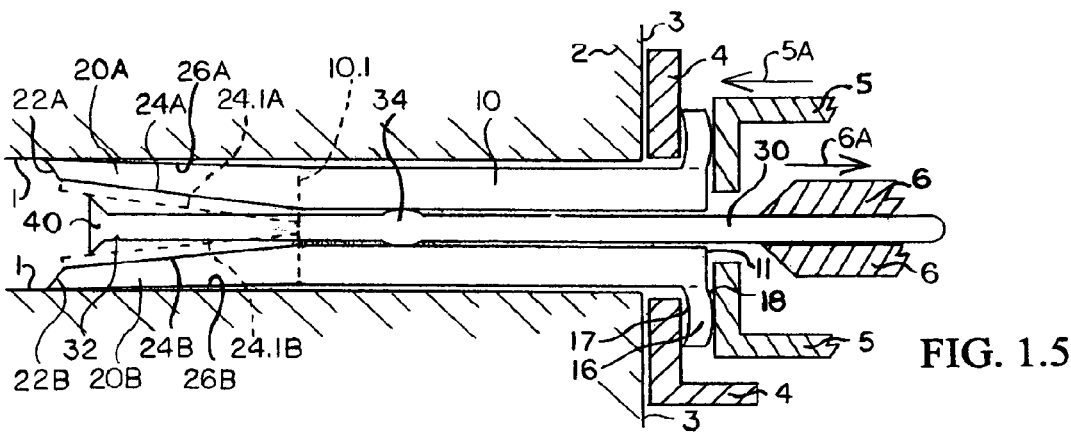
FIG. 1.5
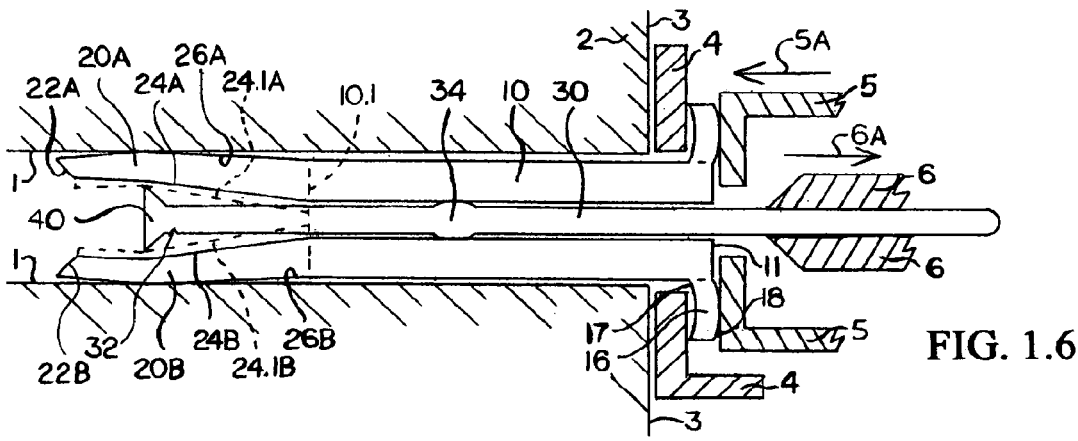
FIG. 1.6
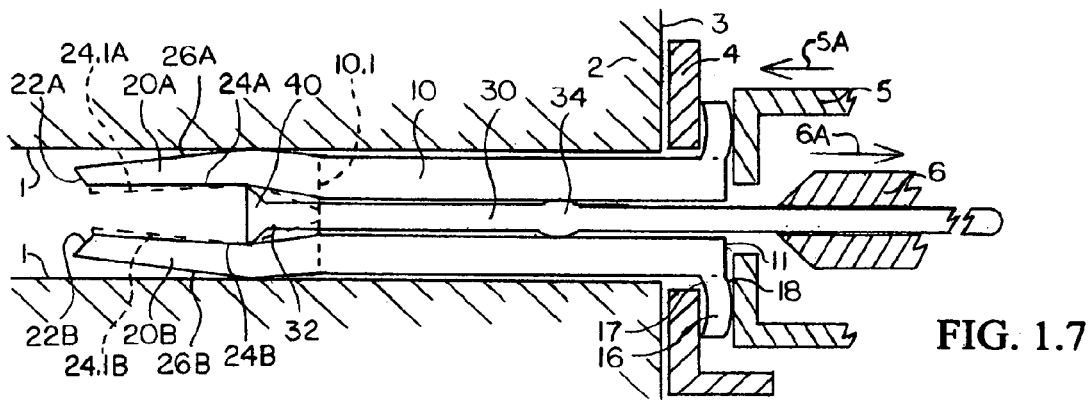
FIG. 1.7
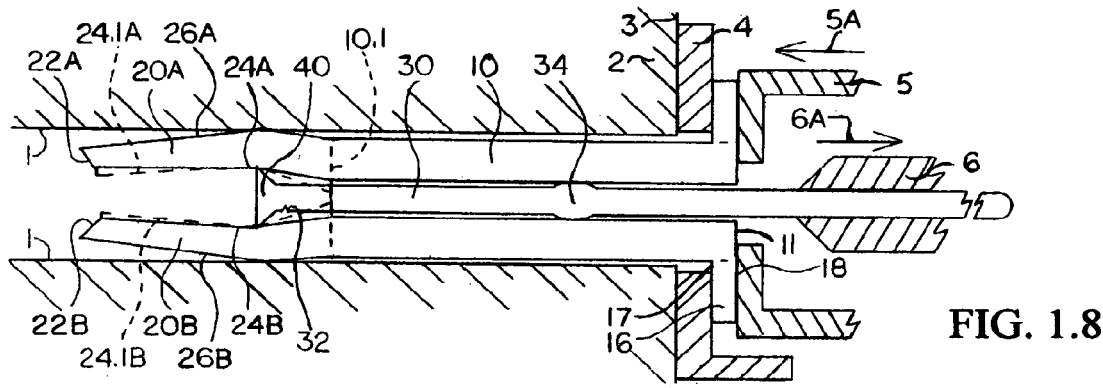
FIG. 1.8

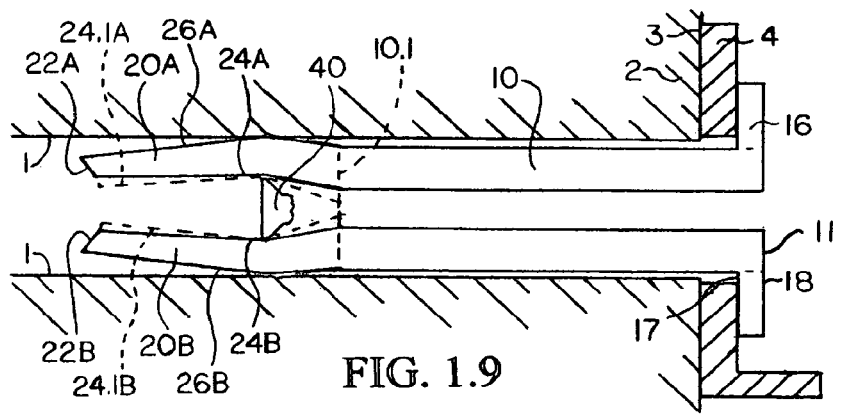
FIG. 1.9
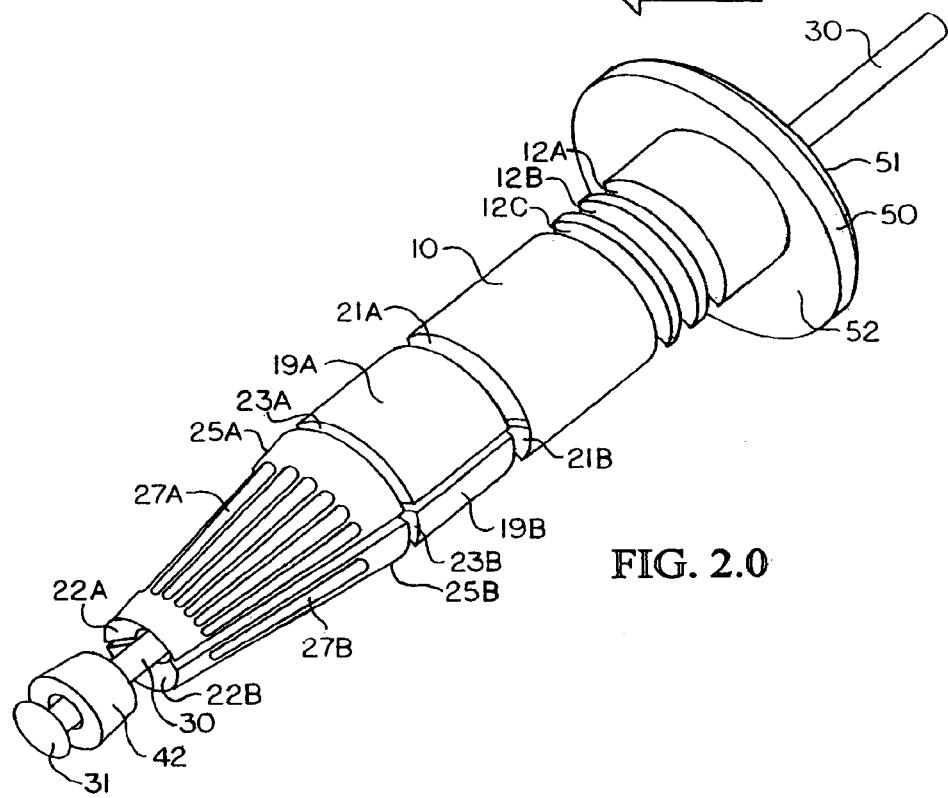
FIG. 2.0
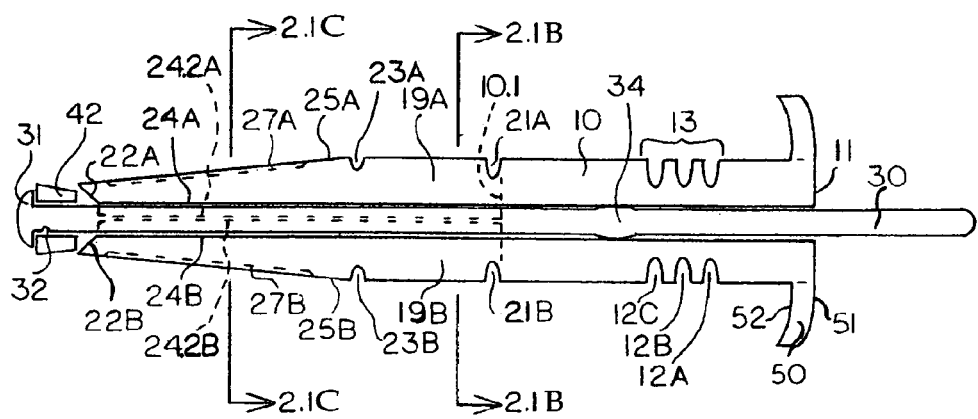
FIG. 2.1A

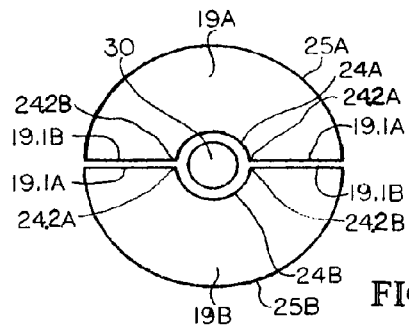
FIG. 2.1B
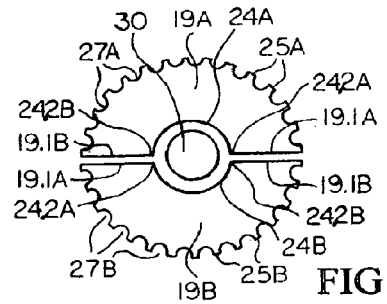
FIG 2.1C
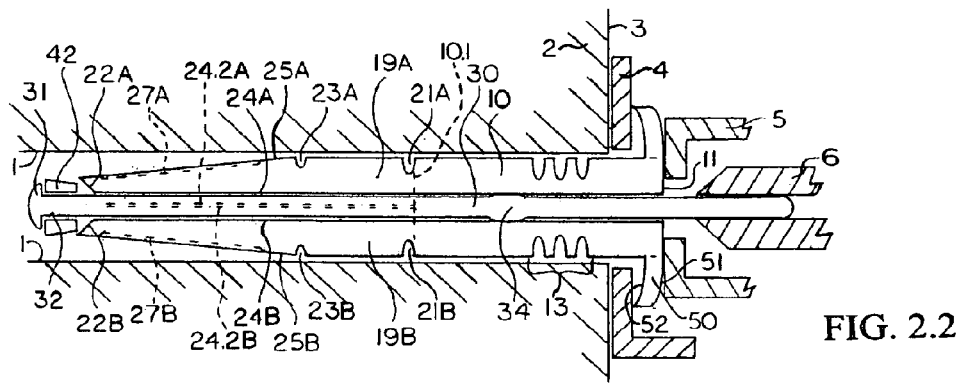
FIG. 2.2
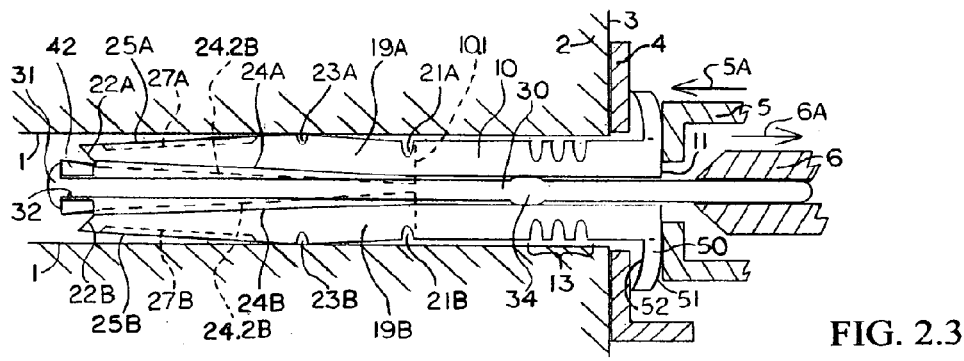
FIG. 2.3
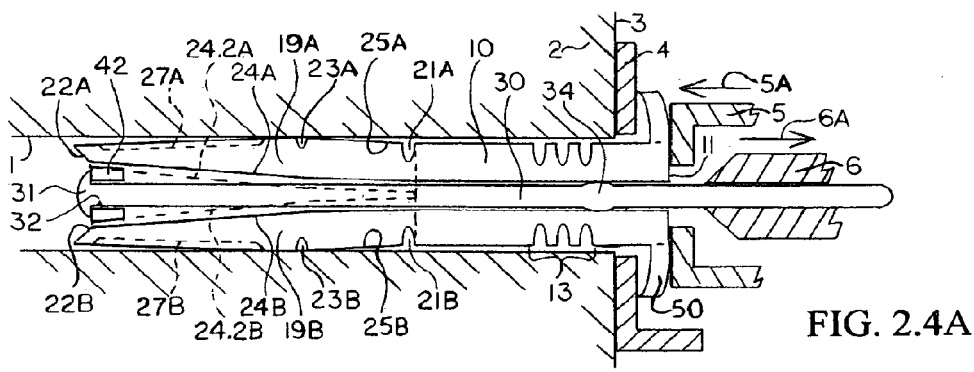
FIG. 2.4A

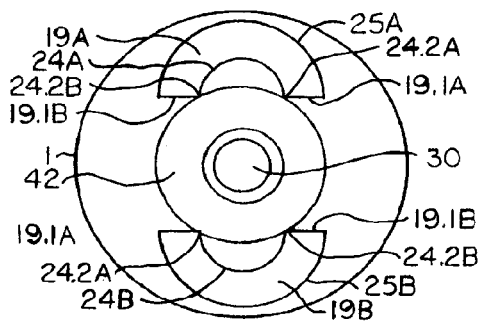
FIG. 2.4B
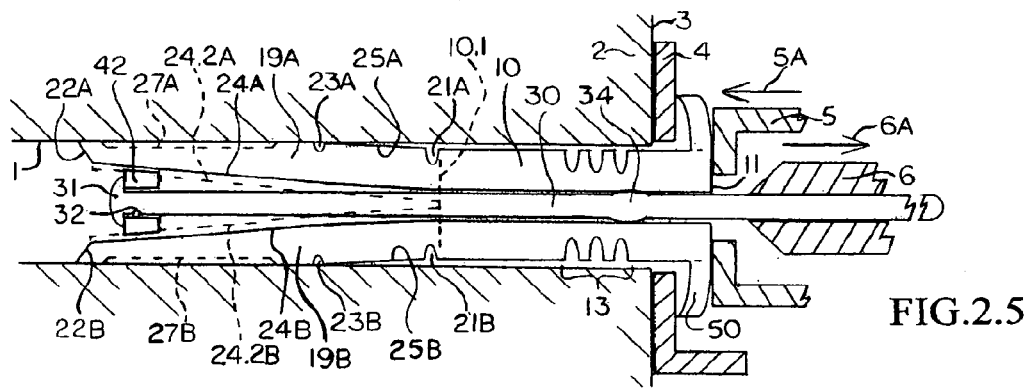
FIG. 2.5
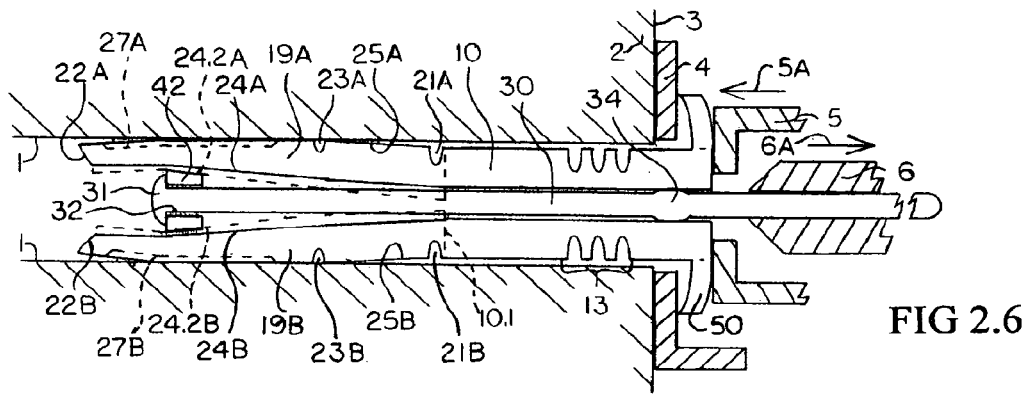
FIG 2.6
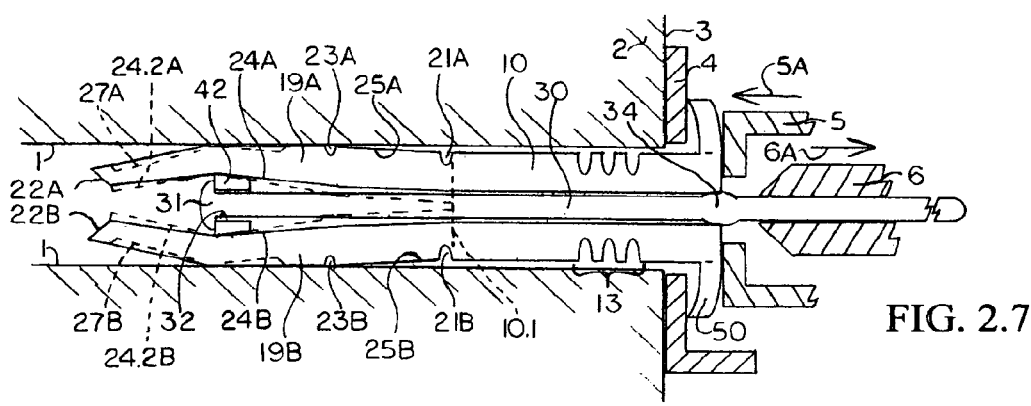
FIG. 2.7

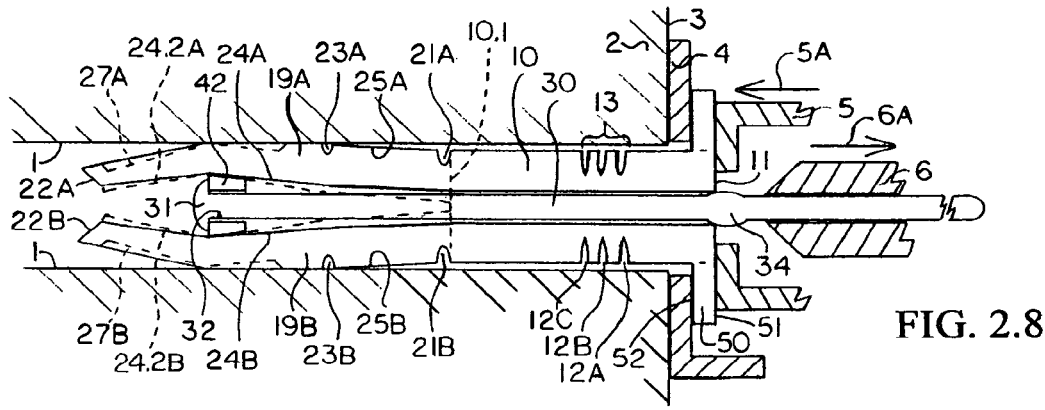
FIG. 2.8
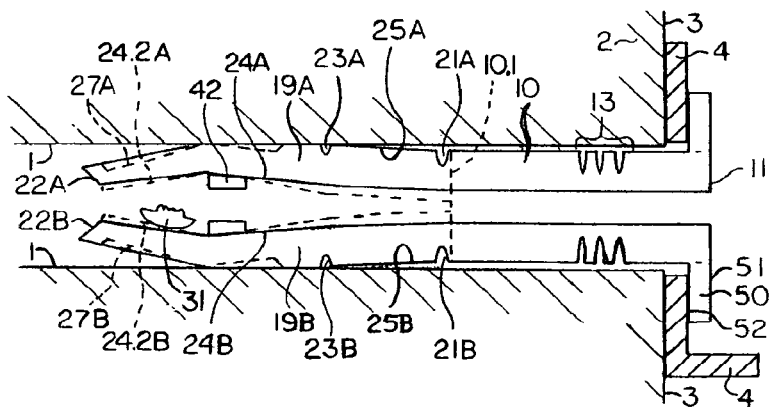
FIG. 2.9
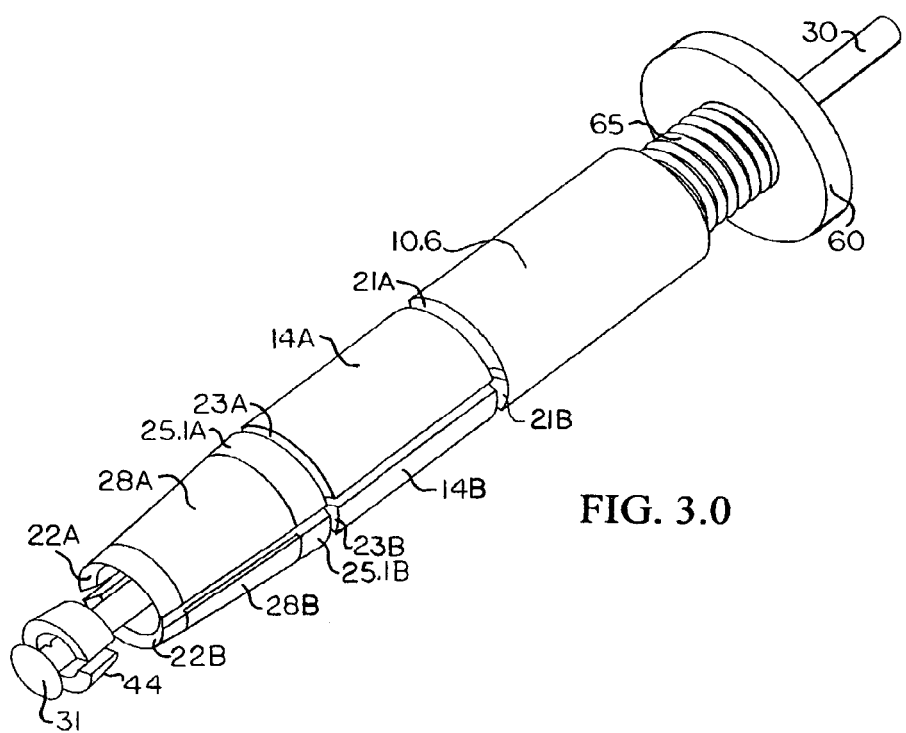
FIG. 3.0

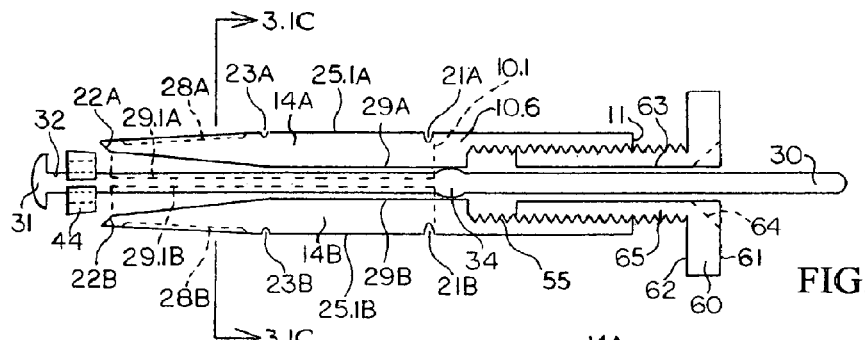
FIG. 3.1A
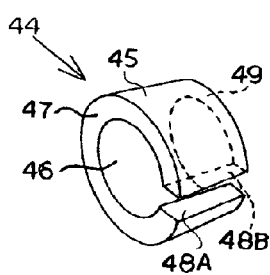
FIG. 3.1B
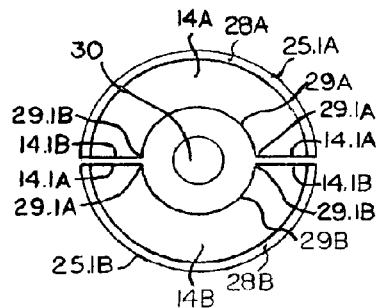
FIG. 3.1C
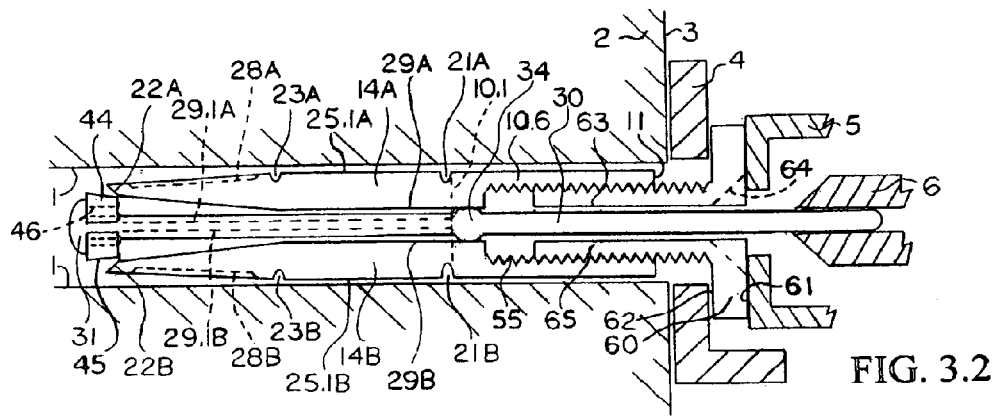
FIG. 3.2
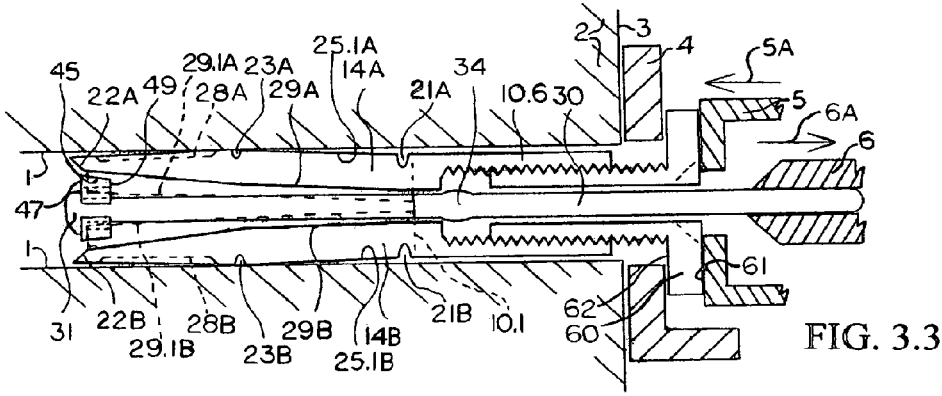
FIG. 3.3

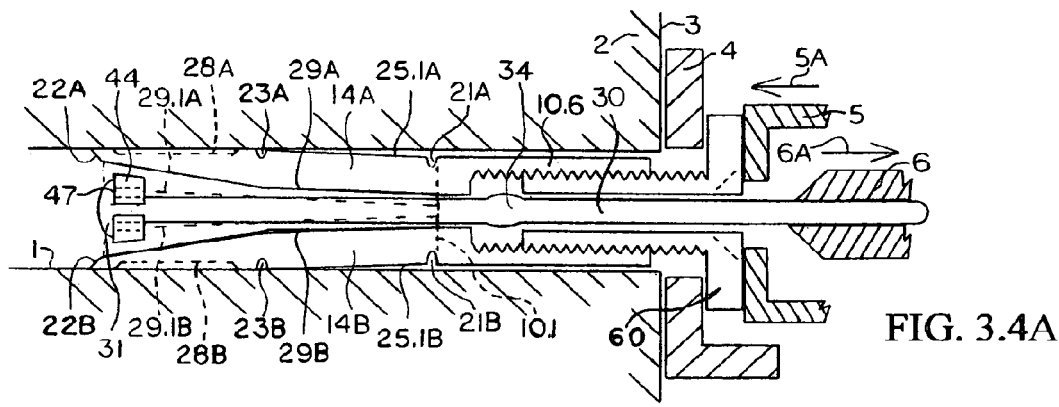
FIG. 3.4A
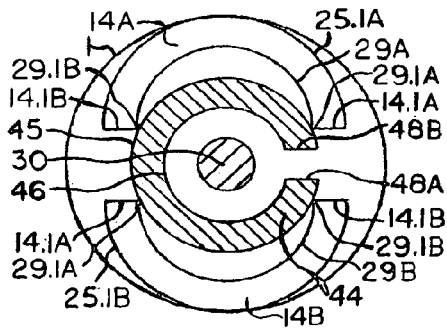
FIG. 3.4B
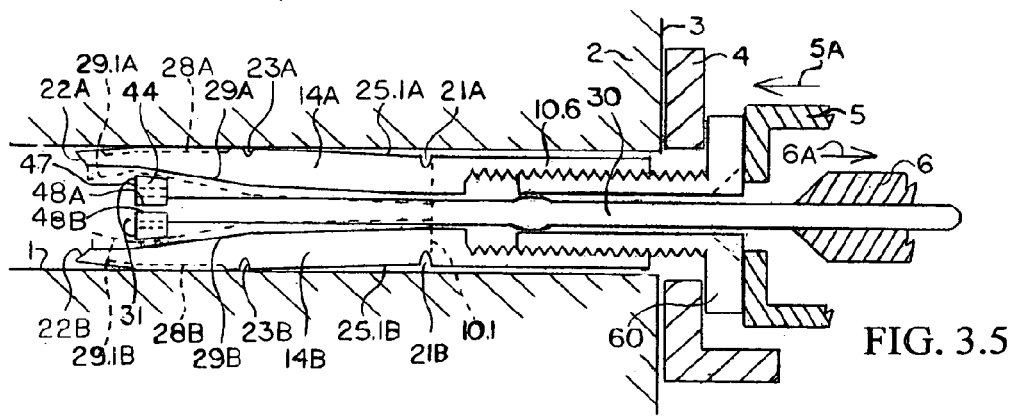
FIG. 3.5
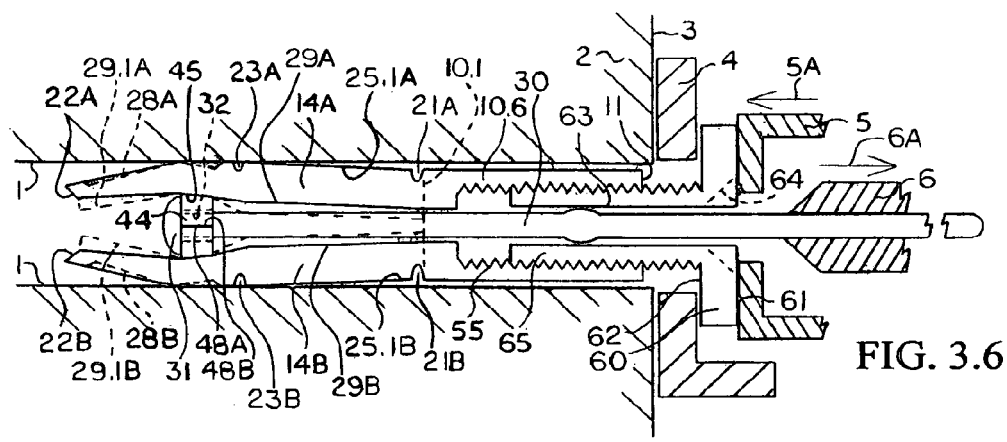
FIG. 3.6

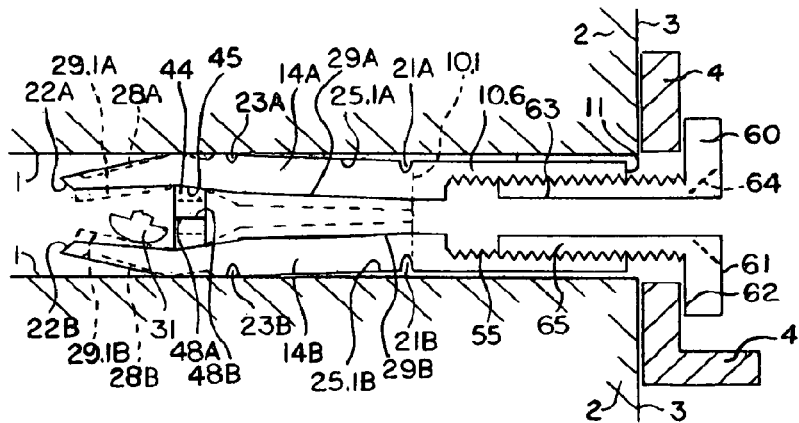
FIG. 3.7
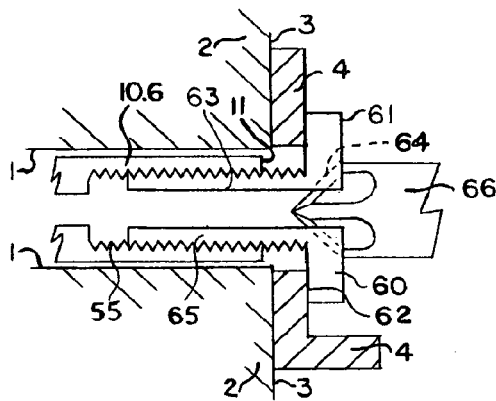
FIG. 3.8
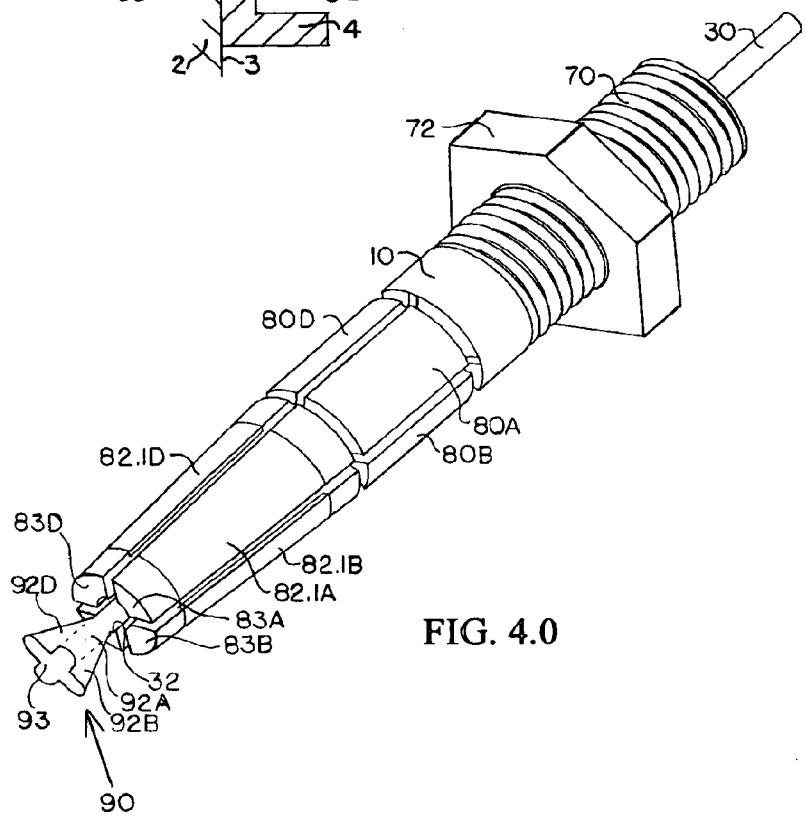
FIG. 4.0

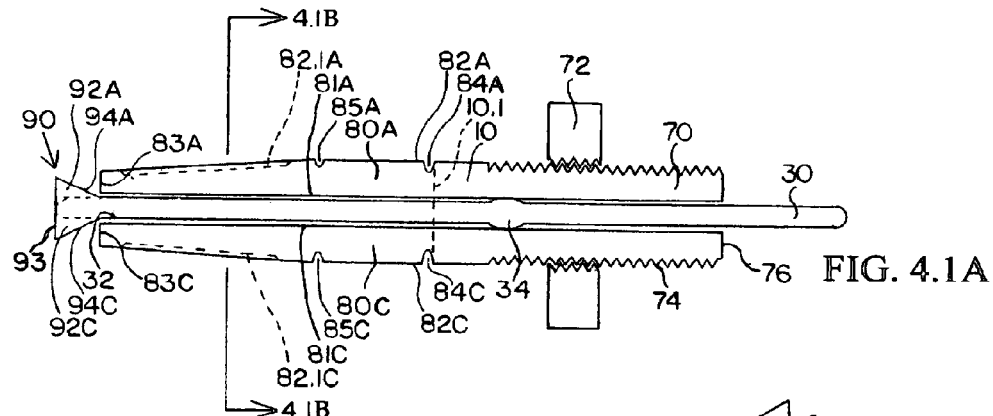
FIG. 4.1A
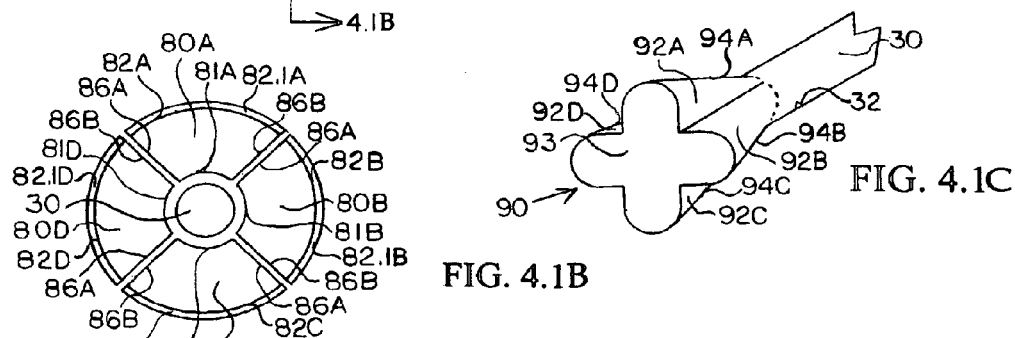
FIG. 4.1B
FIG. 4.1C
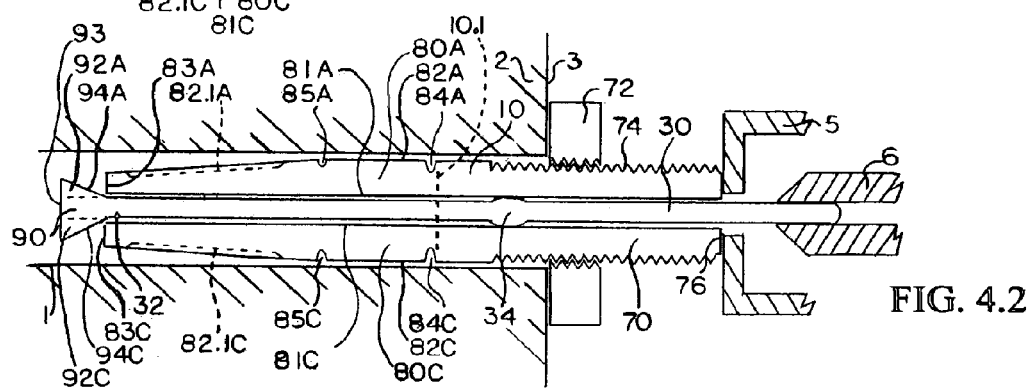
FIG. 4.2
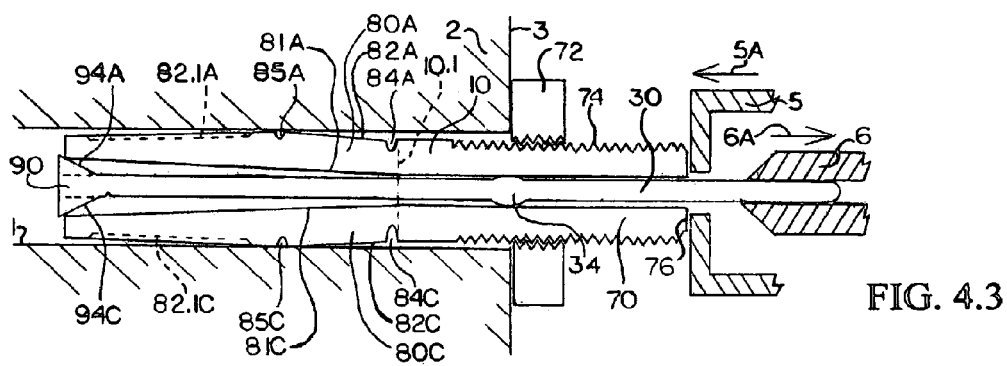
FIG. 4.3

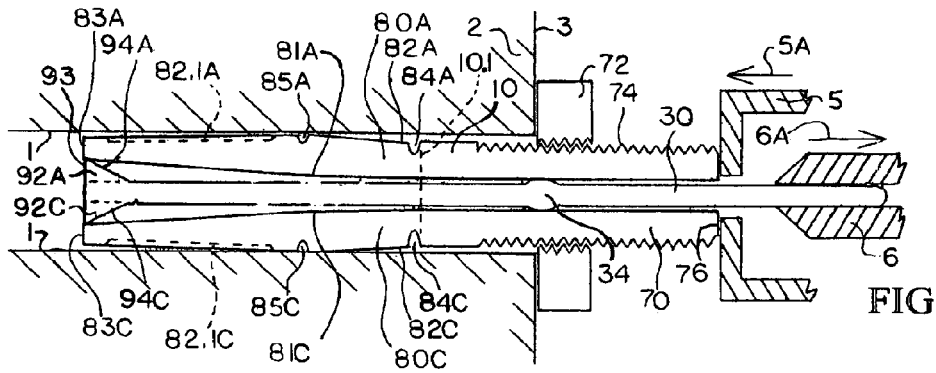
FIG. 4.4A
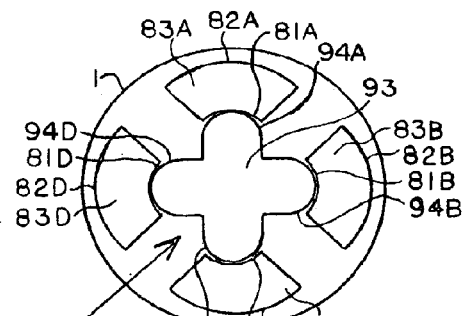
FIG. 4.4B
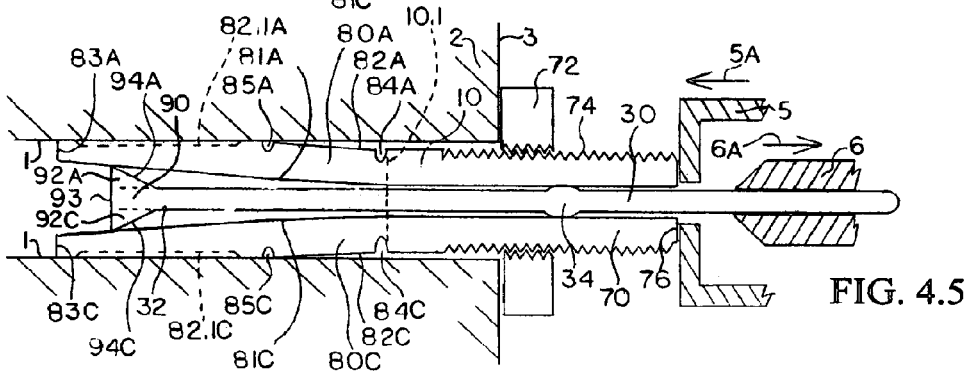
FIG. 4.5
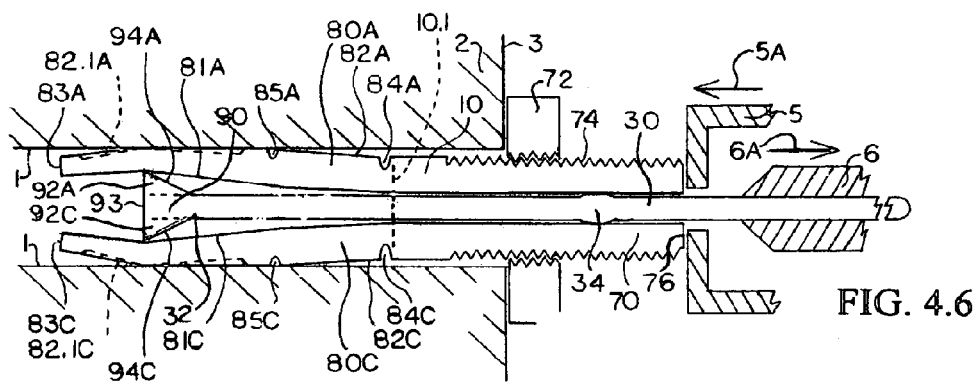
FIG. 4.6

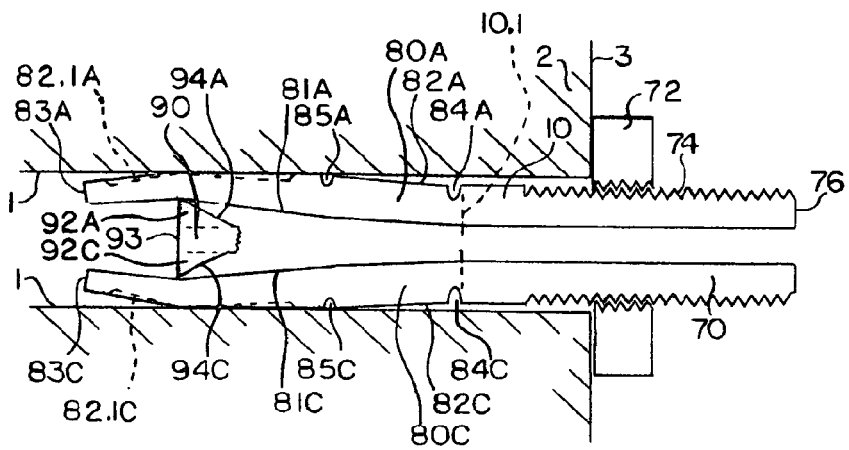
FIG. 4.7
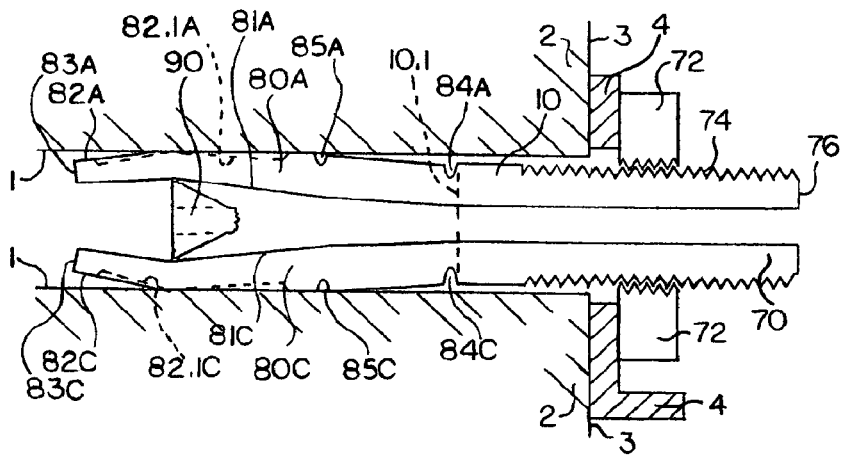
FIG. 4.8
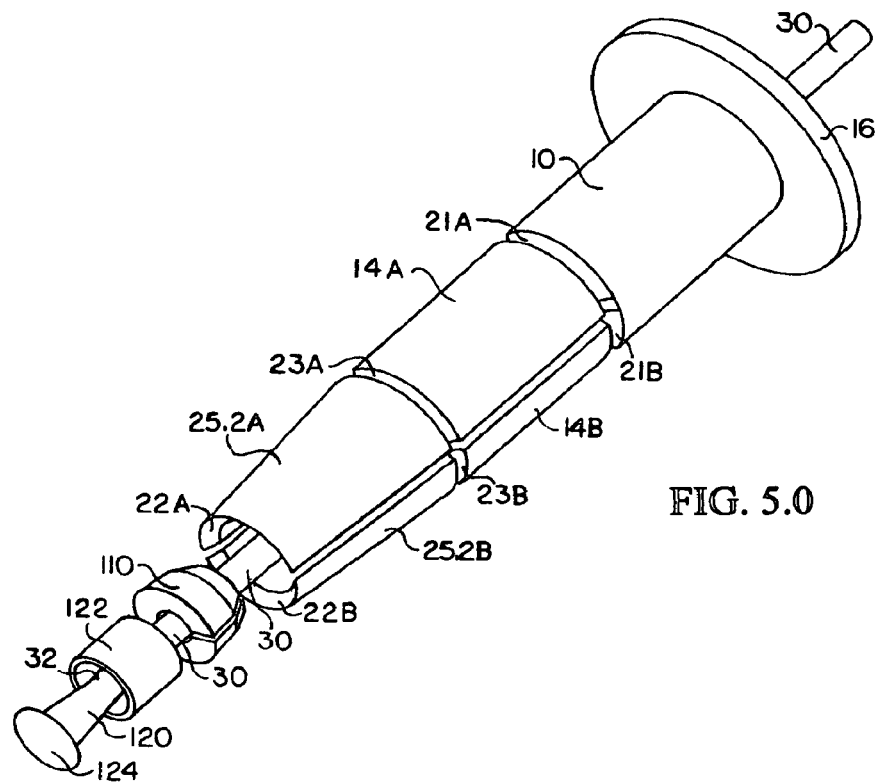
FIG. 5.0

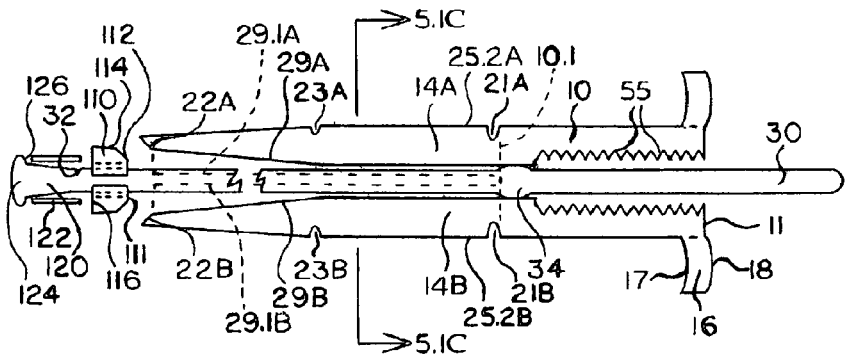
FIG. 5.1A
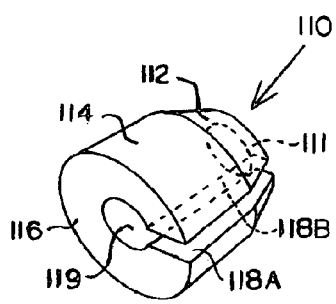
FIG. 5.1B
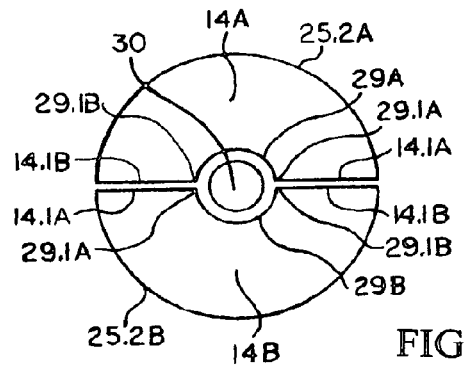
FIG. 5.1C
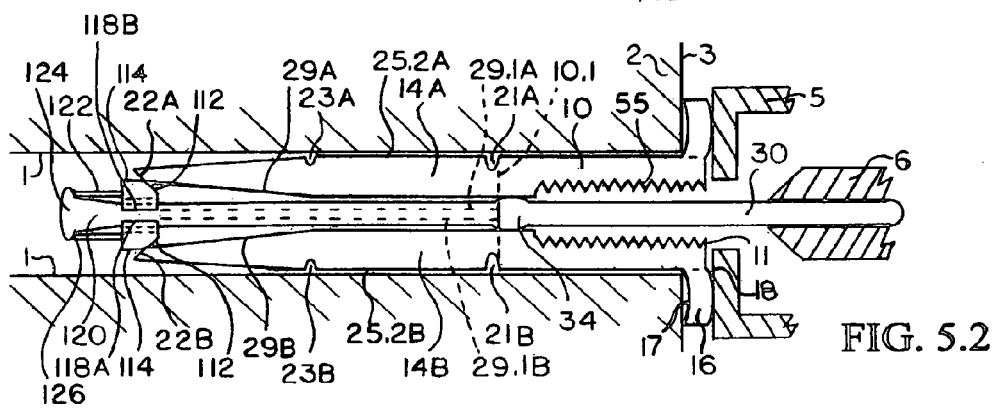
FIG. 5.2
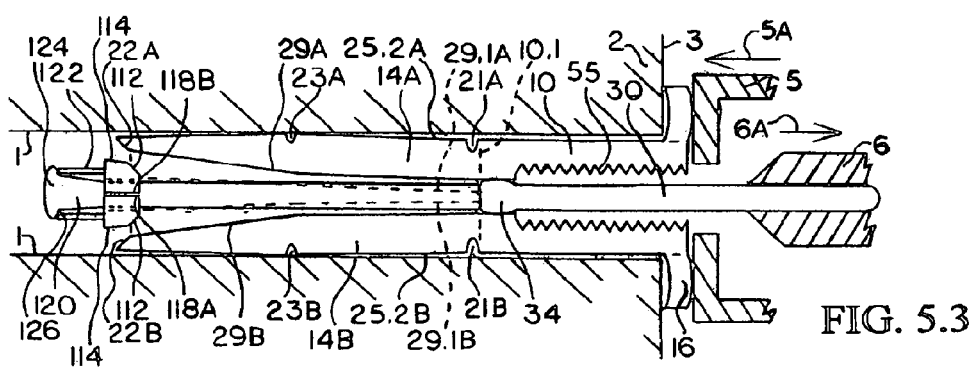
FIG. 5.3

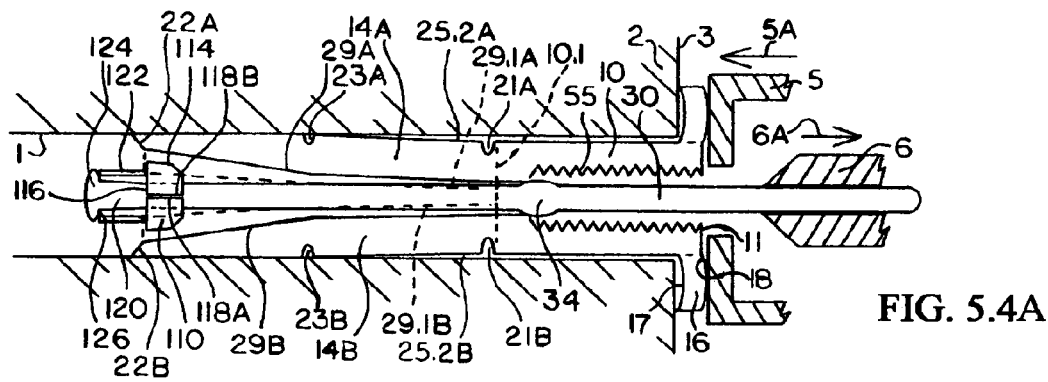
FIG. 5.4A
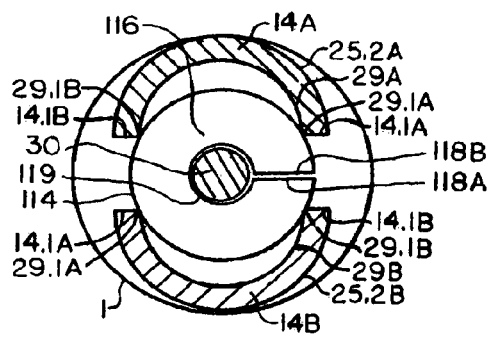
FIG. 5.4B
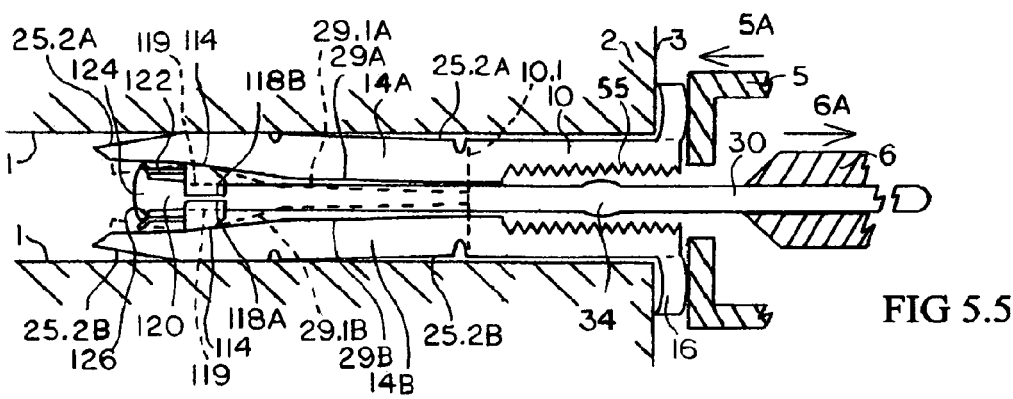
FIG 5.5
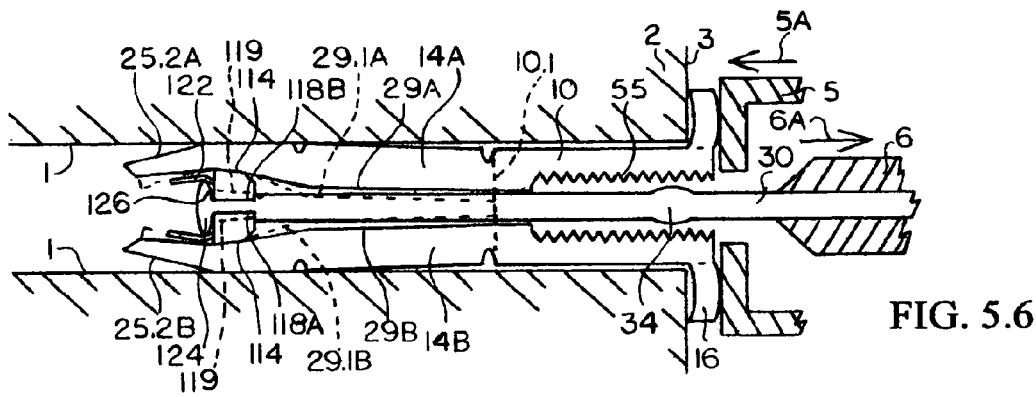
FIG. 5.6

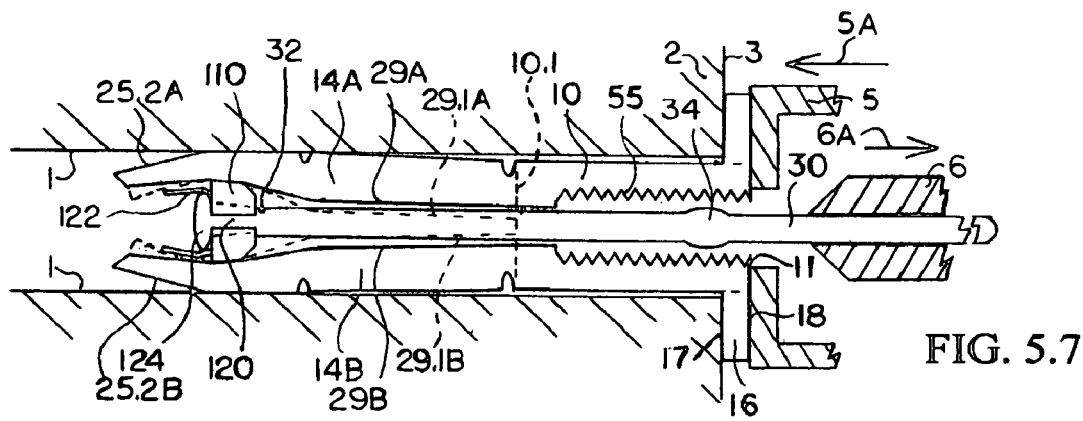
FIG. 5.7
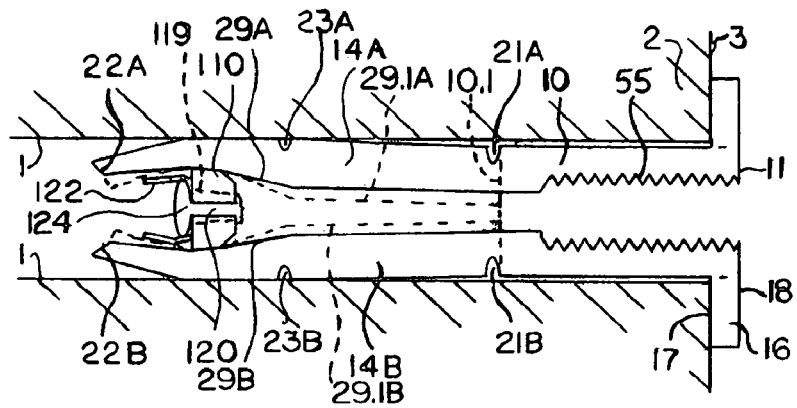
FIG. 5.8
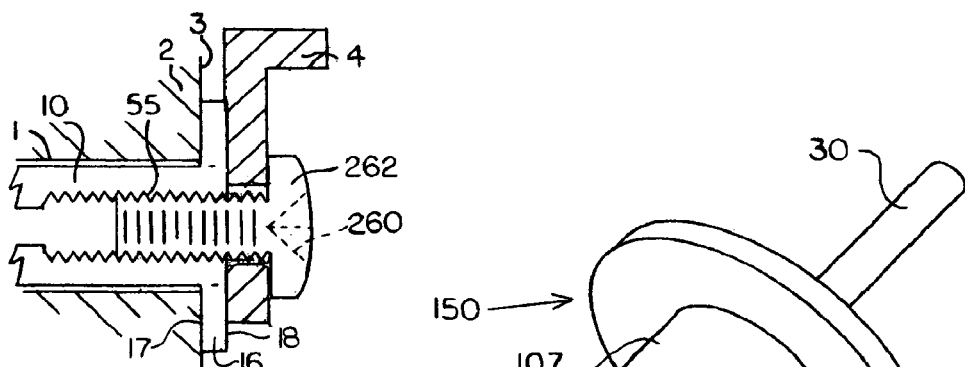
FIG. 5.9
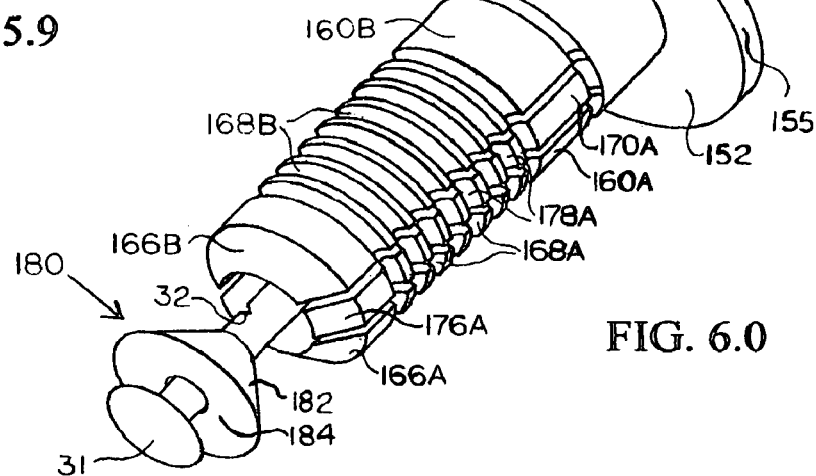
FIG. 6.0

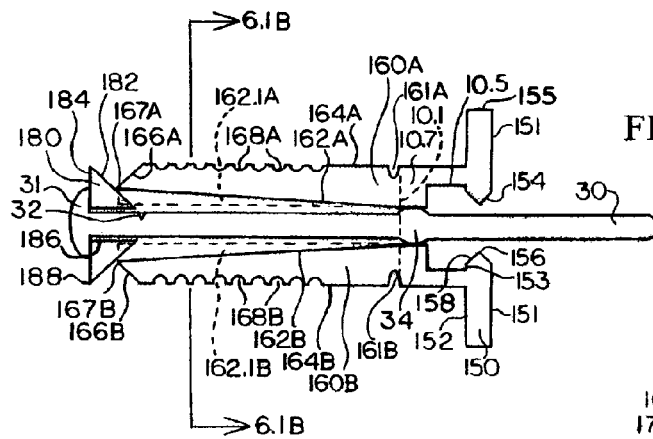
FIG. 6.1A
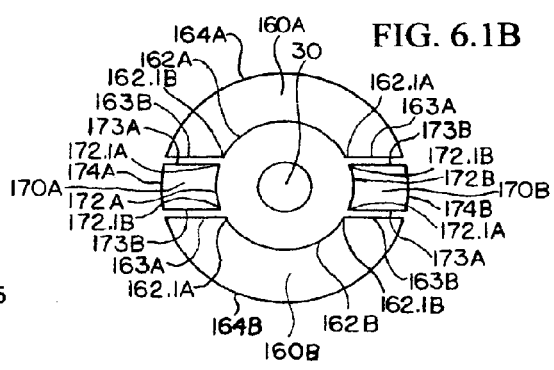
FIG. 6.1B
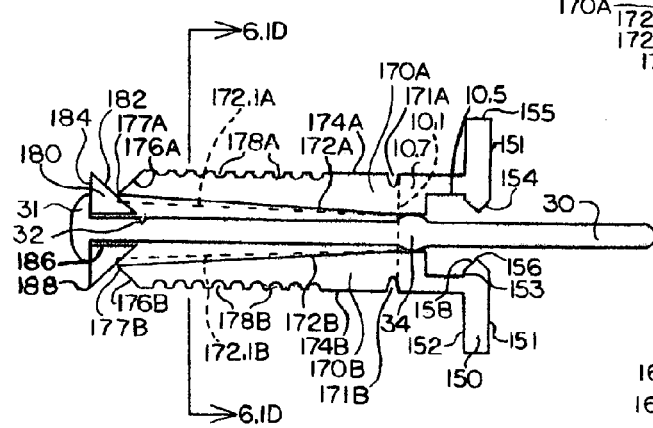
FIG. 6.1C
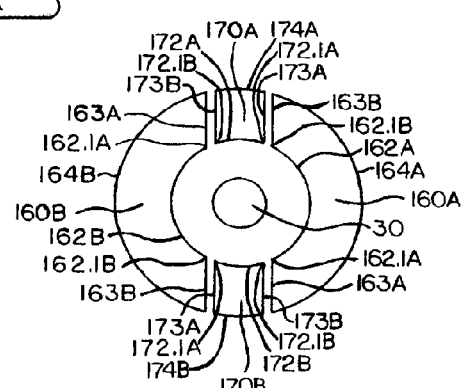
FIG. 6.1D
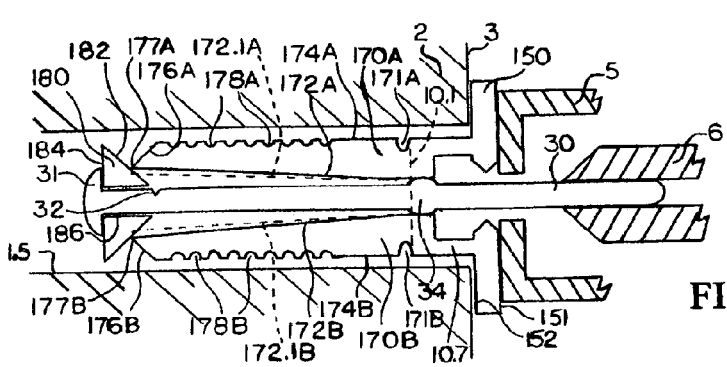
FIG. 6.2

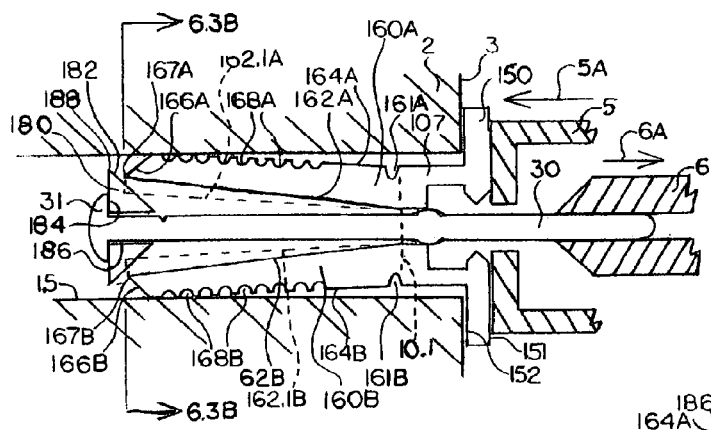
FIG. 6.3A
FIG. 6.3B
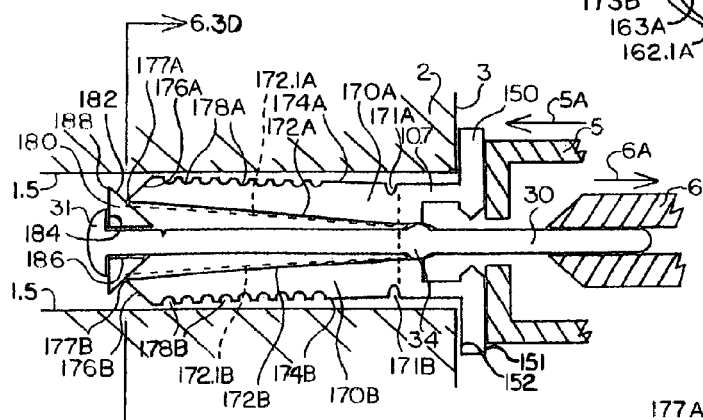
FIG. 6.3C
FIG. 6.3D
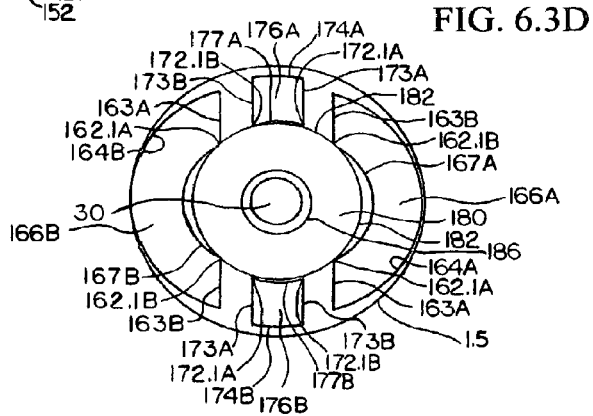

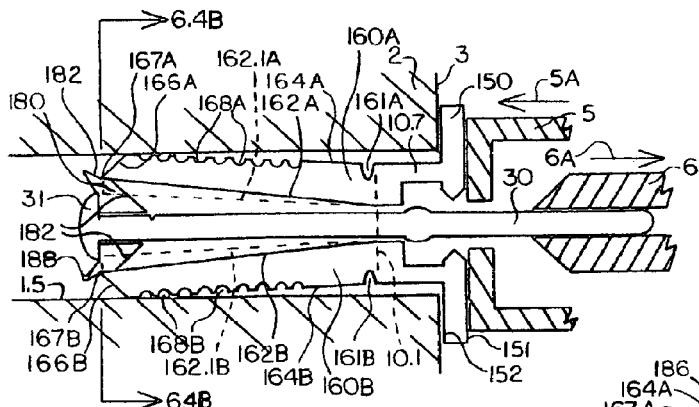
FIG. 6.4A
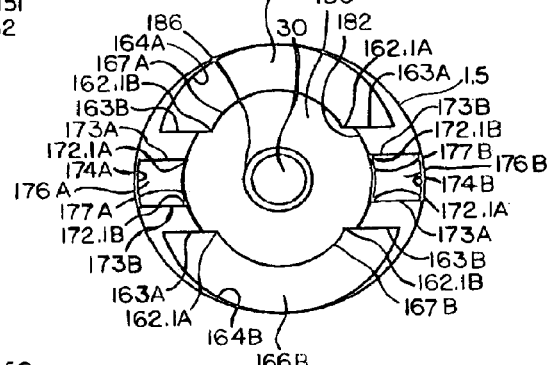
FIG. 6.4B
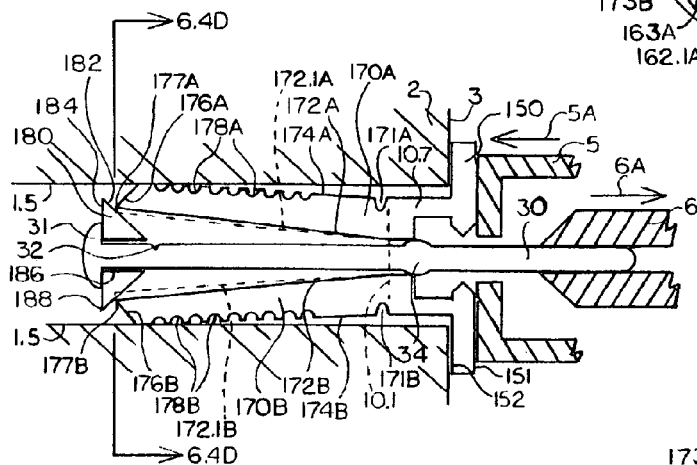
FIG. 6.4C
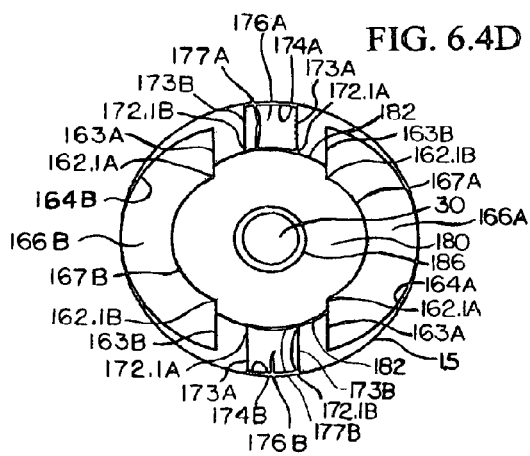
FIG. 6.4D

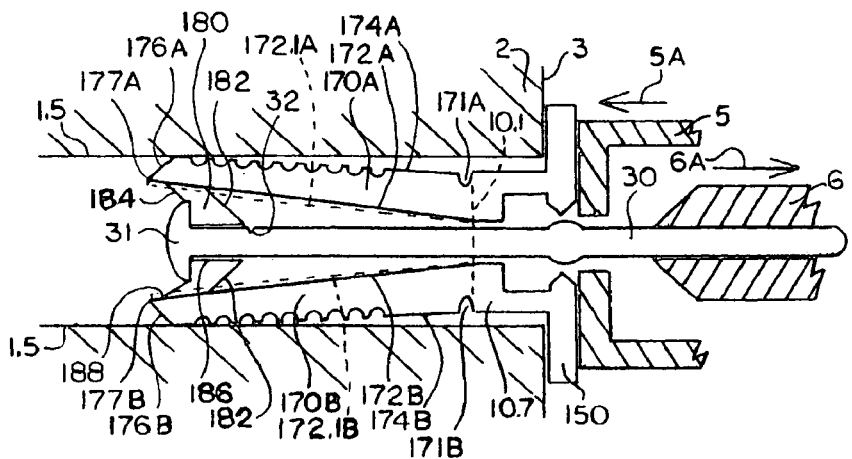
FIG. 6.5
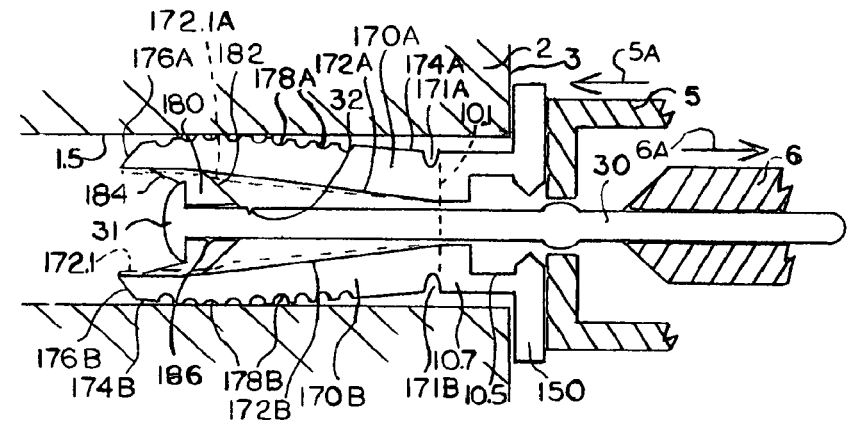
FIG 6.6
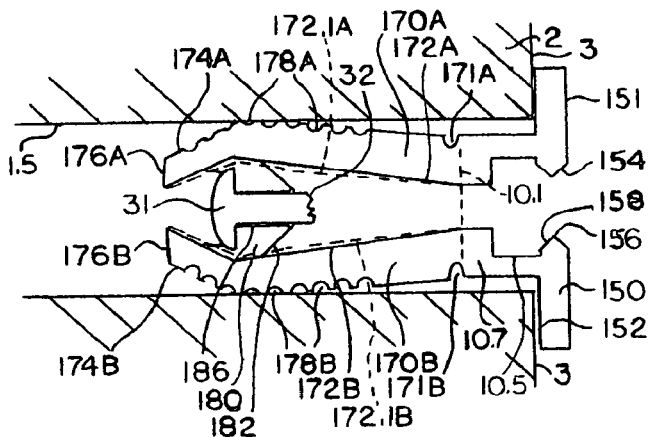
FIG. 6.7
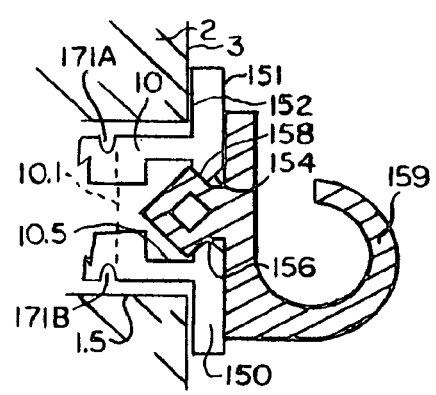
FIG. 6.8

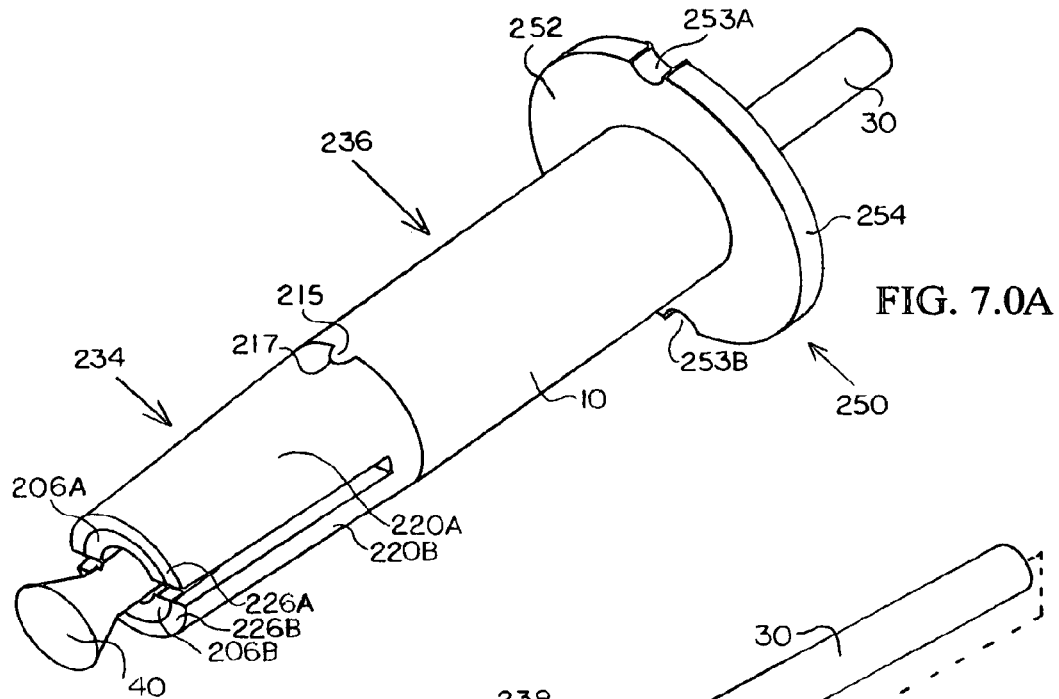
FIG. 7.0A
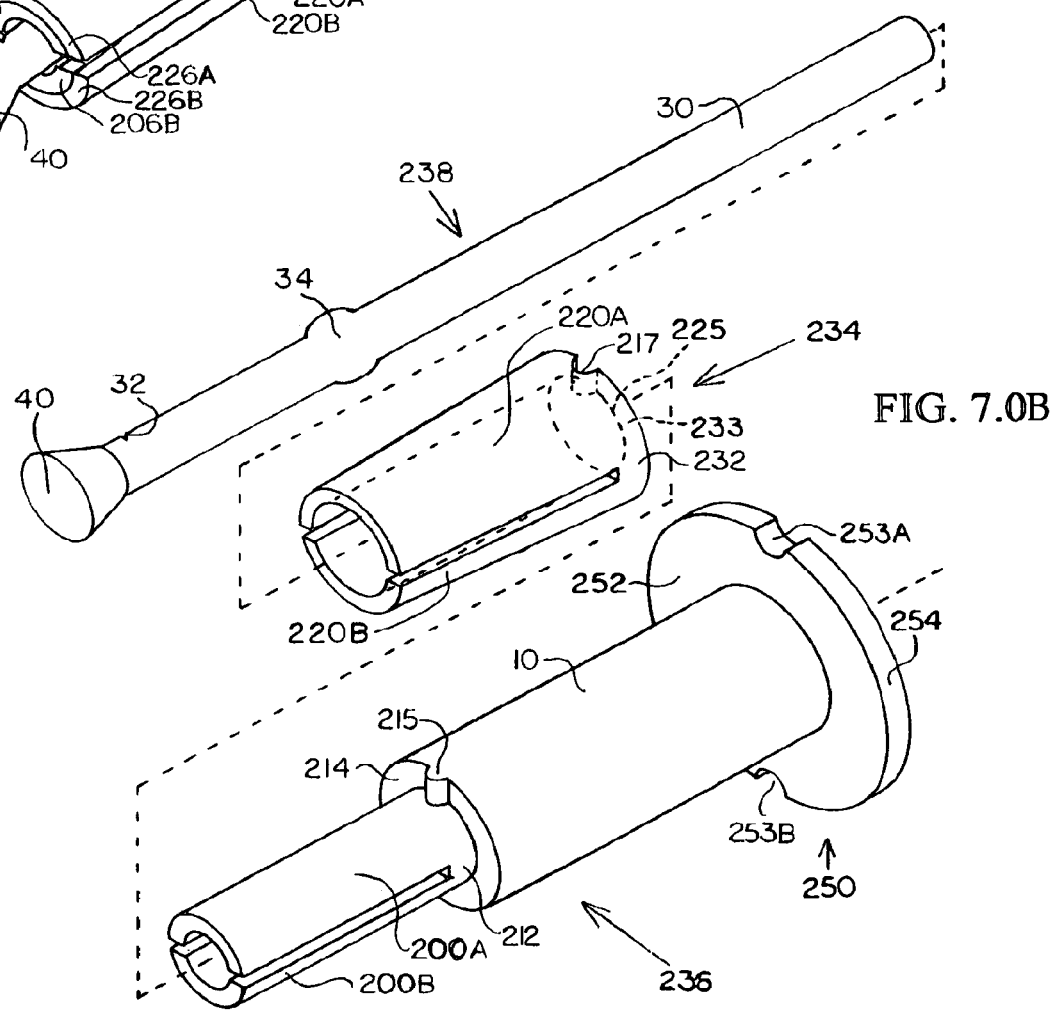
FIG. 7.0B

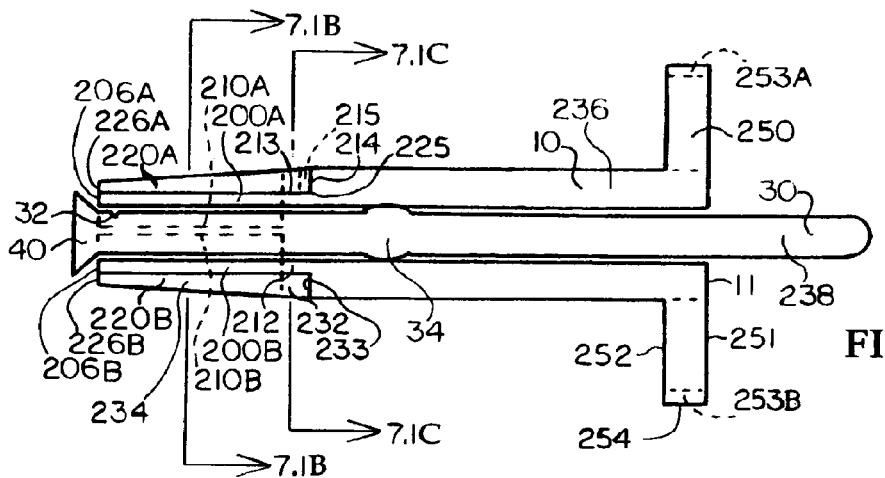
FIG. 7.1A
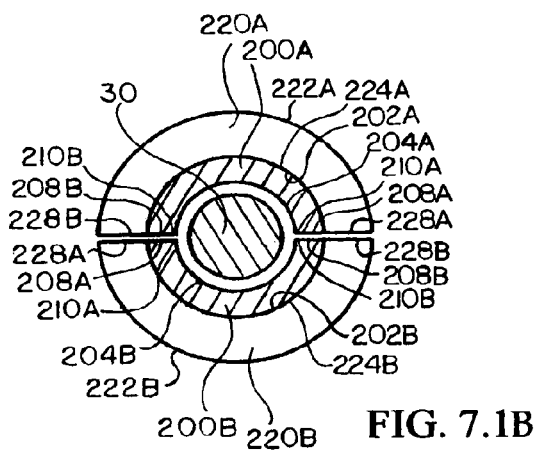
FIG. 7.1B
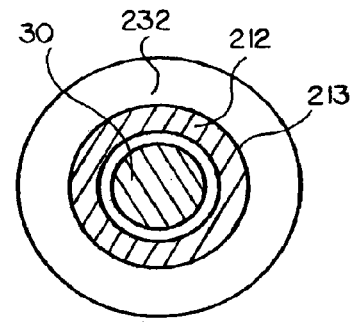
FIG. 7.1C
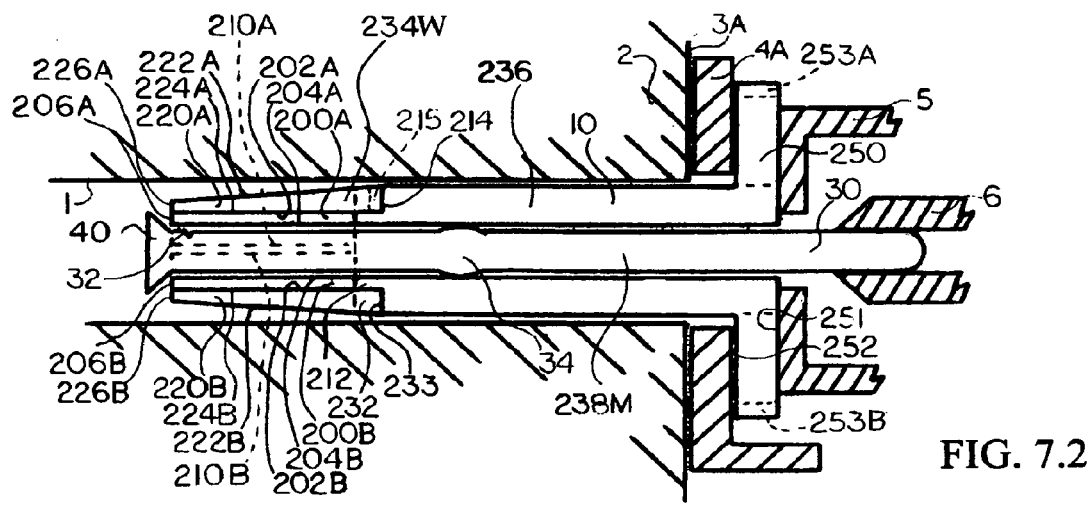
FIG. 7.2

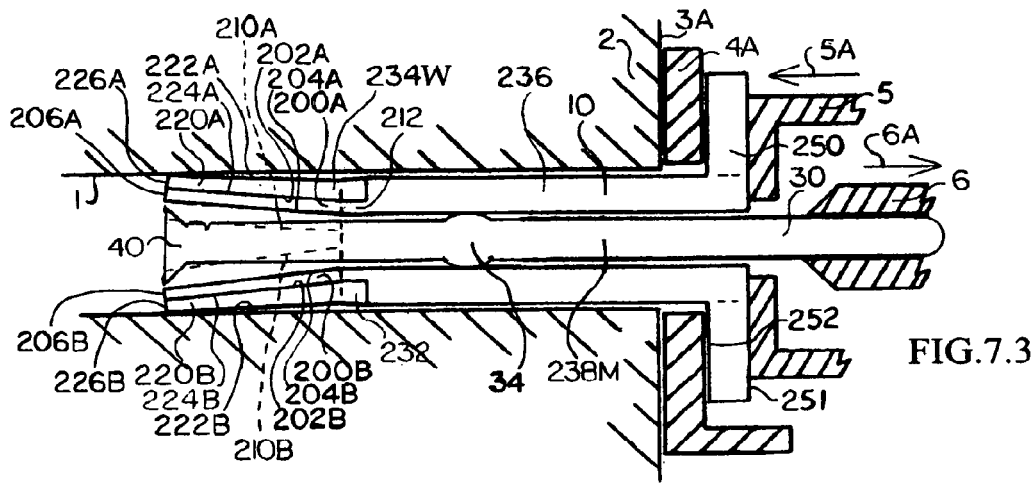
FIG. 7.3
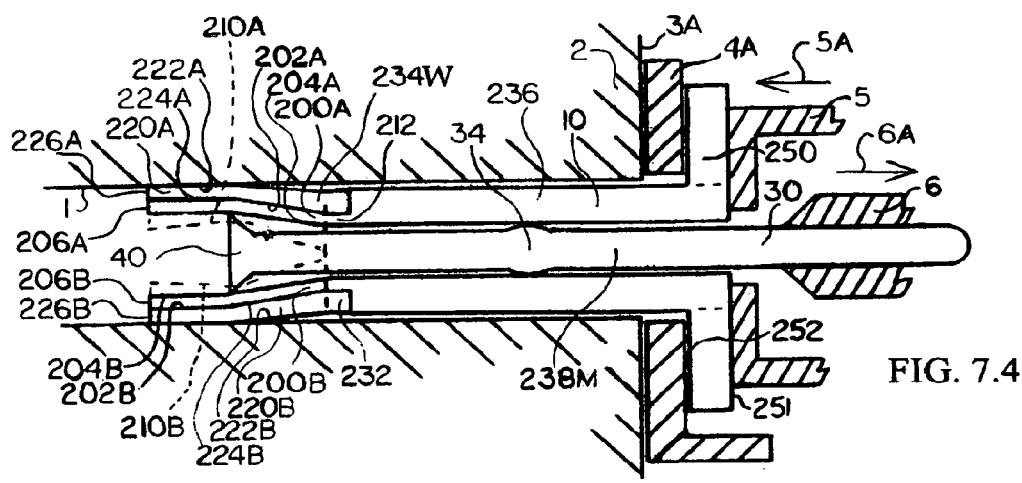
FIG. 7.4
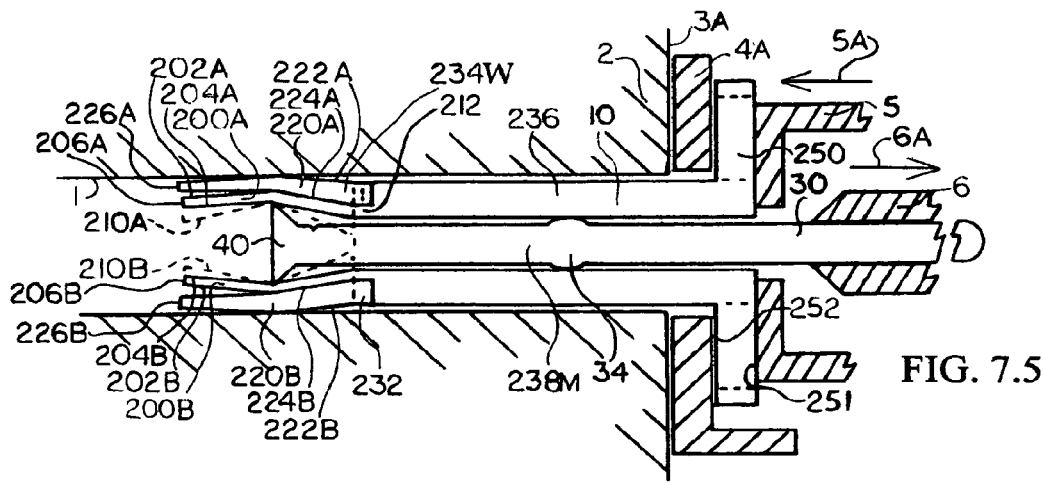
FIG. 7.5

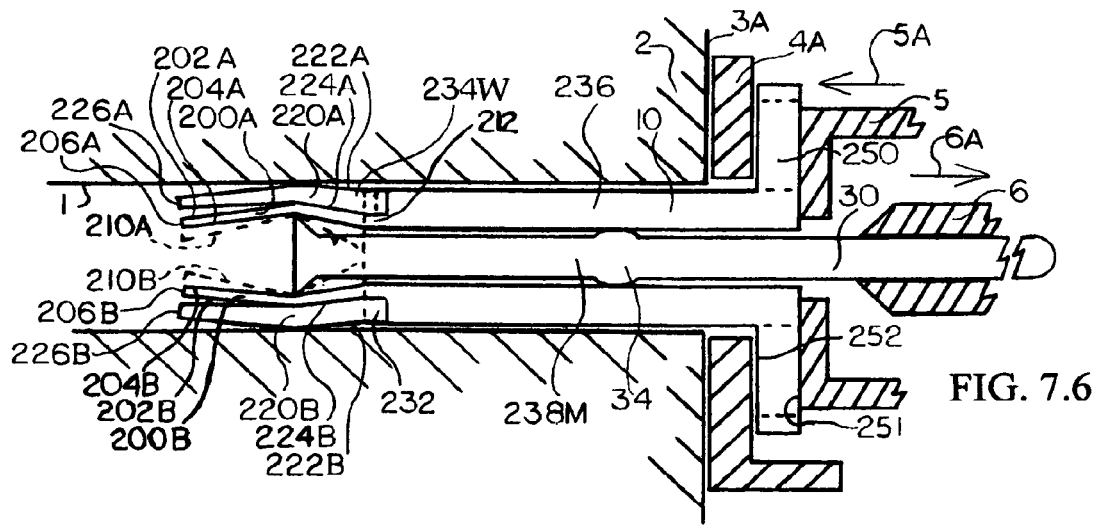
FIG. 7.6
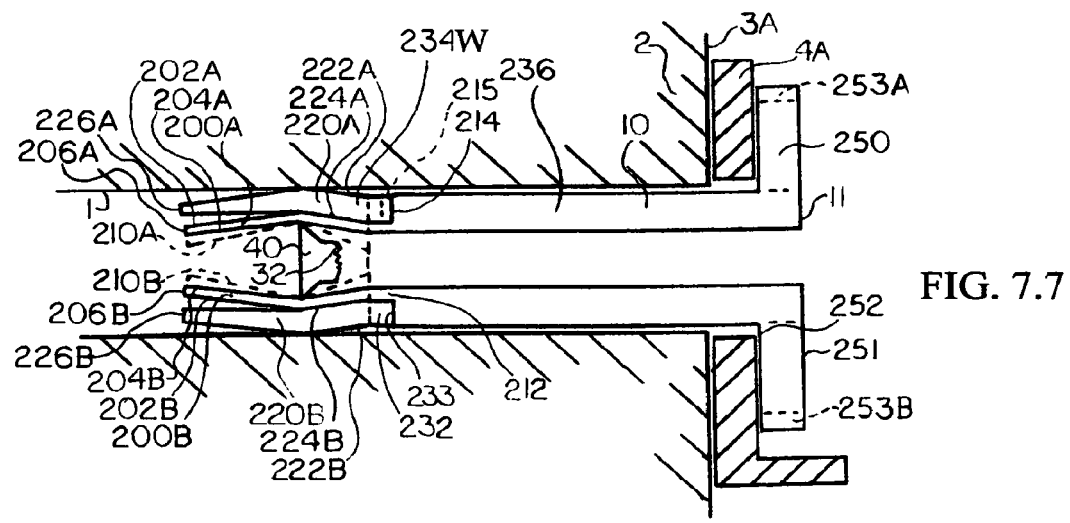
FIG. 7.7

ANCHOR STRUCTURE WITH BIDIRECTIONALLY DEFLECTABLE BORE GRIPPING FINGERS

RELATED APPLICATION/CLAIM OF PRIORITY

This application is a national stage application under 35 U.S.C. §371 of International Application No. PCT/US07/10047, filed 26 Apr. 2007, which claims priority from and is entitled to the benefit of U.S. Provisional Application No. 60/795,954 filed 29 Apr. 2006, both of which are herein incorporated by reference in their entireties.

FEDERALLY SPONSORED RESEARCH

Not Applicable

SEQUENCE LISTING OR PROGRAM

Not Applicable

BACKGROUND OF THE INVENTION

1. Field of Invention

The present invention relates to anchors or fastening devices for affixing articles to the outer surfaces of solid materials and especially masonry materials.

2. Prior Art

The present invention is a bore gripping or engaging anchor structure of the type which is actuated by use of a blind rivet installation tool and is generally related to prior art presented in the following patents; WO8606447, DE3341266, EP0124489, DE2524459, DE2535237.

There are numerous advantages demonstrated by linearly actuated bore gripping anchors and fasteners as a group. One advantage of these types of fasteners is that there is no rotary component involved in coupling the anchor structure with a bore. This makes this type of fastener particularly well suited to application to bores in masonry materials and especially so to softer, more friable masonry materials. Another advantage that these anchors and fasteners offer is their inherent simplicity, both in application and in manufacture. Yet despite these advantages no prior art has combined the characteristics necessary to distinguish itself as a reliable and widely applicable, thus widely utilized anchor structure.

One object of the present invention is to provide an anchor structure which is easily installed, is simple, and is economic to manufacture, but to be widely applicable and utilized requires more than just simplicity of application and economy of manufacture. In addition it has to operate reliably and consistently over a wide range of bore gripping conditions, and to be truly versatile it should incorporate or enable a variety of article attachment options or article attachment means. That is to say that in addition to engaging and coupling with the wall of a bore it should offer a number of different methods by which to secure articles to the outer surface of the material of the bore.

Article attachment options and attachment means is a factor which is addressed to differing degrees in the prior art and which helps to differentiate the present invention as novel and improved. Though some patents cite only a fixed head, that is to say a radially enlarged portion which is integrally formed with the body of the device, other patents cite separable article attachment means, i.e. threaded elements as attachment means, and in some instances combinations of the two. One important factor which is overlooked in the prior art with integrally fixed heads is the need for a fixed head of an anchor structure to apply a certain amount of force between the head of the device and the outer surface of the material of the bore so as to pinch or hold an article to said surface. Hence another object of the present invention is to provide an anchor structure which has improved and novel attachment means.

As reiterated in many patents related to anchors and fasteners intended for application to bores in masonry materials, bores and holes drilled in these materials commonly have diametral values which vary substantially within a range of values for a given drill bit diameter. This is due to a number of factors, but one significant cause is that most common methods of drilling masonry materials can be generally described as material removal by rotary scraping, which results in a relatively rapid reduction of the diameter of the drill bits, due to the highly abrasive nature of many masonry materials. This requires an anchor structure intended for application to a bore drilled with a drill bit of a specific diameter to be able to operate reliably over a significant range of bore diameters. Additionally, masonry materials are very diverse in composition and characteristics, including strength and friability, so that a versatile anchor structure should be configurable to address a wide variety of bore engagement requirements. Thus it is another object of the present invention to provide an anchor structure which will operate effectively and reliable when applied to bores in masonry materials.

OBJECTS AND ADVANTAGES

Therefore, in accord with the aforementioned, several additional objects and advantages of the present invention are:

(a) to provide an anchor structure which can be easily configured for application to either hard and rugged masonry materials or to soft and friable masonry materials such as stucco, slump block, and mortar.

(b) to provide an anchor structure which has a wide variety of article attachment means.

(c) to provide an anchor structure which is readily applicable to shallow bores in masonry materials.

(d) to provide an anchor structure which is easily configurable for application to masonry-like materials such as ceramic tile, glass, porcelain, cement roofing tile, terracotta, stone, stone tile, and such.

(e) to provide an anchor structure which can be easily configured to produce a precise amount of outwardly directed bore gripping force.

SUMMARY

The present invention is a bore gripping anchor structure with bidirectionally deflectable bore gripping fingers which are deflected outwards into engagement with the wall of a bore by a force applying portion of an actuator device, and then deflected inward to hold said force applying portion between said fingers, to couple the anchor structure with said bore.

DRAWINGS

List of Figures

There are twelve figures relating to the preferred embodiment.

FIGS. 1.0, 1.1A, and 1.1B depict structural details of the preferred embodiment.

FIG. 1.2 to FIG. 1.8 depict progressive intervals of the actuation of the preferred embodiment.

There are thirteen figures that relate to a first alternate embodiment.

FIGS. 2.0, 2.1A, 2.1B, and 2.1C depict structural details of a first alternate embodiment.

FIG. 2.2 to FIG. 2.9 depict progressive intervals of the actuation of the first alternate embodiment.

There are twelve figures that relate to a second alternate embodiment.

FIGS. 3.0, 3.1A, 3.1B, and 3.1C depict structural details of a second alternate embodiment FIG. 3.2 to FIG. 3.8 depict progressive intervals of the actuation of the second alternate embodiment.

There are twelve figures relating a third alternate embodiment.

FIGS. 4.0, 4.1A, 4.1B, and 4.1C depict structural details of a third alternate embodiment.

FIG. 4.2 to FIG. 4.8 depict progressive intervals of the actuation of the third embodiment.

There are thirteen figures that relate to a fourth alternate embodiment.

FIGS. 5.0, 5.1A, 5.1B, and 5.1C depict structural details of a fourth alternate embodiment.

FIGS. 5.2 to 5.9 depict progressive intervals of the actuation of the fourth alternate embodiment.

There are twenty three figures relating to a fifth alternate embodiment.

FIGS. 6.0, 6.1A, 6.1B, 6.1C, and 6.1D depict structural details of a fifth alternate embodiment.

FIG. 6.2 to FIG. 6.8 depict progressive intervals of the actuation of the fifth alternate embodiment.

There are eleven figures that relate to a sixth alternate embodiment.

FIGS. 7.0A, 7.0B, 7.1A, 7.1B, and 7.1C depict structural details of a sixth alternate embodiment.

FIGS. 7.2 to 7.7 depict progressive intervals of the actuation of the sixth alternate embodiment.

PREFERRED EMBODIMENT

The following description refers to FIG. 1.0, a perspective view, FIG. 1.1A, an axial cross-sectional view, and FIG. 1.1B, a radial cross sectional view, of the preferred embodiment of the anchor structure of the present invention, which is a basic form of the present invention and hence will be utilized to present the fundamental concepts of the invention and one method of implementing those concepts.

The preferred embodiment has externally tapered bidirectionally deflectable and doubly articulable bore gripping fingers, axially deformable attachment means in the form of a plastically deformable head, and an actuator device comprised of an actuator stem formed integrally with a substantially rigid force applying portion which is called an anvil. Additionally the present embodiment can be easily removed from a bore after actuation.

The anchor structures of the present invention are usually made of steel or stainless steel or aluminum or brass or alloys or combinations of these metals, but can be made of any metal or combination of metals or materials such as plastics which have the necessary characteristics to operate and function as complete anchor structures or portions thereof, and as subsequently described within the totality of this disclosure, and which are compatible with the intended application of the anchor structure.

Furthermore, when an anchor structure or portions thereof are comprised of metal, said metal may be hardened, annealed, tempered, normalized or combinations of the forgoing, to various extents either before or after fabrication.

Additionally, in the event that the material comprising an anchor structure could or would benefit from the application of some coating or treatment, such as paint, plating, galvanizing, anodizing, oxide coatings, lubricants and the like, intended to increase the functional life of said anchor structure or to improve the performance or function, or to allow said structure to be applied in a particular environment, then these coatings or treatments can be applied to said anchor structures, or to any individual portion or portions of said anchor structures.

With that said, the anchor component and actuator device of the preferred embodiment are made of mild steel, and are hardened only to whatever extent may be incidental to the processes utilized to form said component, and neither the anchor component nor the actuator device are coated or treated in any manner besides the specific manners disclosed in some subsequent embodiments.

As one object of this invention is to provide an anchor structure which supports or enables a wider variety of article attachment means than related prior art, it is germane to emphasize that the present invention presents two novel improvements in relation to axially deformable article attachment means, one improvement in the present embodiment and another improvement in the first alternate embodiment. And although these novel features will allow application of the present invention to numerous beneficial uses, it is the bidirectionally deflectable fingers of the anchor component which make this possible, by reliably and strongly couple the anchor structure with a bore in a manner which will allow the non-bore engaging portions of the anchor component to be configured to enable and support a wider array of article attachment means.

With this in mind, the following disclosures relating to both the preferred embodiment and subsequent alternate embodiments, address various types of article attachment means, anchor components, bidirectionally deflectable fingers, actuator devices, and force applying portions of the present invention, and how the nature and extent of the deflection of said fingers, and the nature and extent of the bore engagement characteristics of said fingers are determined by the configurations of said fingers and said actuator devices.

The bidirectionally deflectable and doubly articulable bore gripping fingers of the present embodiment are deflected outward by the force applying portion, or anvil, of an actuator device, which causes the fingers to articulate outward simultaneously at specific locations and engage the wall of a bore, and then the end portions of the fingers are deflected inward and articulated behind said anvil, so that the inwardly deflected end portions can engage the anvil in a manner which in effect locks the anvil in place between said fingers.

As will be shown, there are a number of differently configured force applying portions which can effectively interact with appropriately configured bidirectionally deflectable fingers of the present invention to cause said fingers to outwardly and then inwardly deflect. However, the inward deflections of the bidirectionally deflectable fingers of all embodiments of the present invention are caused by the application of one or more of four distinct inward deflection mechanisms. As the preferred embodiment utilizes all four inward deflection mechanisms, it will be utilized to demonstrate these mechanisms and to lay a foundation, if you will, for how said fingers and actuator devices can be configured to determine the nature and the extent of the deflection of said fingers, and the nature and the extent of the bore engagement characteristics of the anchor structure.

The present invention can be actuated within a bore by the use of a commercially available blind rivet installation tool, or it can be actuated by any number of other devices which are, or could be, configured appropriately to simultaneously push and pull upon the appropriate portions of the anchor structure, an example of such a tool is the tool used to actuate blind bolts.

Though obvious, it should be stated that the presentation of the present invention by use of segregated embodiments does not preclude the integration of any particular features or members portions or components or mechanisms or methods or processes presented in one embodiment from being combined appropriately with other features or members or portions or components or mechanisms or methods or processes of another embodiment or other embodiments to form another embodiment of the present invention.

Body 10

As can be seen by reference to FIGS. 1.0, 1.1A, and 1.B, generally, the anchor structure is shaped like a hollow tube with a radially enlarged head attached at one end and two tapered, symmetrically shaped fingers attached to the other end. The tubular member is designated body 10, the head is designated deformable head 16, and the tapered fingers are designated bidirectionally deflectable and doubly articulable fingers 20A and 20B.

Body 10 has a distal end 10.1 and a proximal end surface 11. Distal end 10.1 is the location at which body 10 is integrally joined to fingers 20A & B and proximal end 11 is surrounded by head 16. The inner diameter of body 10 is somewhat larger than the outer diameter of actuator stem 30. The outer diameter of body 10 is somewhat less than the smallest expected diameter of a bore, within the normally expected variations of masonry bores, to which it is intended to apply the anchor structure of the present embodiment.

Head 16

Head 16 is a radially enlarged member which is generally shaped like a slightly dished ring or curved washer and it is formed around the outer diameter of proximal end 11 of body 10. Head 16 has an inner radial surface 17 which is oriented toward body 10, and an outer radial surface 18 which is oriented away from body 10.

Outer surface 18 of head 16 is flush with or even with end surface 11 at the location at which they join. As head 16 extends outward radially from body 10, outer surface 18 and inner surface 17, first curve away from body 10 for some distance and then curve back towards body 10 for the same distance. The outwards and then inwards curves of head 16 cause inner surface 17 to be incurvate and simultaneously cause outer surface 18 to be excurvate. Excurvate outer surface 18 is the portion of head 16 which the pushing portion of a rivet installation tool will contact and bear upon during the actuation process of present embodiment. Incurvate surface 17 is the portion of head 16 which will contact an article which is being attached to the outer surface of the material of a bore.

Head 16 is configured such that when subjected to a predetermined amount of urging or pressure from the pushing portion of a rivet installation tool during actuation, the curved portions of head 16 can be plastically deformed in a direction and in such a manner which establishes an amount of axial tension between head 16 and the portions of the anchor structure which are engaged with the wall of the bore. The tensional force thus established will pinch or push against an article being affixed to the outer surface of the material of the bore so that said article is held in place with a predetermined amount of force.

Bidirectionally Deflectable and Doubly Articulable Fingers 20A & 20B

Located at and integrally attached to distal end 10.1 of body 10 are bidirectionally deflectable and doubly articulable prongs or tangs or fingers, 20A and 20B. Deflectable fingers 20A & B are axially and radially symmetrical, elongated members which are, for all practical purposes, identically shaped and are situated and positioned so as to be directly opposed to one another.

Fingers 20A & B each have an outer surface 26A or B, respectively, an end surface 22A or 22B, respectively, and an inner surface 24A or 24B, respectively. Additionally each finger has two edge surfaces which are designated 20.1A and 20.1B and two intersections or junctures designated 24.1A and 24.1B.

Starting at their respective junctures with body 10 at distal end 10.1 outer surfaces 26A & B of fingers 20A & B, respectively, taper or slope inward as they extend some distance to end surfaces 26A & B, respectively.

End surfaces 22A & B are generally semi-circular surfaces, which incline substantially toward body 10 as they extend from outer surfaces 26A &B, respectively, to inner surfaces 24A & B respectively. The angle or amount of inclination of end surfaces 22A & B, in relation to inner surfaces 24A & B, is configured such that end surfaces 22A & B will cooperate with anvil 40 in deflecting and urging end surfaces 22A & B of fingers 20A & B, respectively, outward, that is to say away from each other, during the initial steps of the actuation process.

Inner surfaces 24A & B of fingers 20A & B, respectively, are surfaces of semi-circular radial cross section, congruent in radial dimension with the internal radial dimension of body 10 and they extend axially from distal end 10.1 of body 10, to end surfaces 22A & B, respectively.

Edge surfaces 20.1A & B are planar or flat surfaces which extend axially from distal end 10.1 of body 10 to end surfaces 22A & B. Edge surfaces 20.1A & B extend radially from outer surfaces 26A & B to inner surfaces 24A & B.

Junctures 24.1A and 24.1B are the intersections of inner surfaces 24A & B with edge surfaces 20.1A & B.

As will become evident in the operational disclosure, the amount of taper or slope of outer surfaces 26A & B from body 10 to end surfaces 22A & B, respectively, will ultimately determine the majority of the angle at which inner surfaces 24A & B and junctures 24.1A & B of fingers 20A & B, respectively, will form an internally tapered wedge-like passage with which anvil 40 will interact as it is drawn or pulled in the direction out of a bore during the actuation process.

The angle at which anvil 40 first interacts with junctures 24.1A & B and then subsequently with inner surfaces 24A & B of fingers 20A & B, respectively, is calculated to result in the generation of a specific amount of outwardly directed force based on wedge mechanics. Adapted to this application and reduced to basic terms and ignoring friction, the formula for wedge mechanics states that the outwardly directed force generated by the interaction of anvil 40 with fingers 20A & B by way of junctures 24.1A & B and inner surfaces 24A & B, respectively, is equal to the pulling force applied to anvil 40, multiplied by the distance anvil 40 is drawn, divided by the distance that anvil 40 deflects fingers 20A & B outward.

To reiterate in brief, junctures 24.1A & B and inner surfaces 24A & B will form an internally tapered wedge-like passage with which anvil 40 will interact according to the principles of wedge mechanics. The amount of taper of wedge-like passage is determined in large part by the amount of taper of outer surfaces 26A & B.

Upon consideration of the specific interaction of anvil 40 with tapered fingers 20A & B by means junctures 24.1A & B and inner surfaces 24A & B in the aforementioned manner, it becomes evident that the forces generated are applied to or act upon fingers 20A & B and anvil 40 equally, that is to say that the application of force is reciprocal in nature, and that the forces act upon said fingers and deflect them outward, which in turn causes the outer surfaces 26A & B to be pressed or forced against the wall of a bore with whatever amount of force that is being applied to said fingers by said anvil as a result of the interaction of said fingers and said anvil, and that the application of force to said wall by said outer surfaces is reciprocal in nature, that is to say that by resisting the outwardly directed force, said wall in effect presses back upon said outer surfaces with an equal and opposite force.

Hence, to configure an anchor component to produce a large amount of outwardly directed force, perhaps for application to a bore in a strong and rugged material such as concrete, outer surfaces 26A & B would be tapered a small amount so that the internally tapered wedge-like passage formed by junctures 24.1A & B and inner surfaces 24A & B would have a correspondingly low wedge angle, which would interact with anvil 40 to produce a large amount of outwardly directed force.

Conversely, an anchor component configured to produce a smaller amount of outwardly directed force, perhaps for application to a bore in a softer masonry material such as mortar or application to a bore in a masonry-like material such as terracotta, outer surfaces 26A & B would be tapered a relatively large amount so that the internally tapered wedge-like passage formed by junctures 24.1A & B and inner surfaces 24A & B would have a correspondingly large wedge angle which would interact with anvil 40 to produce a low amount of outwardly directed force.

Obviously, by tapering outer surfaces 26A & B to different extents or amounts, the amount of outwardly directed force generated can be configured in such a manner that appropriately configured anchor structures of the present invention can be applied to bores in numerous materials, including, but not limited to, ceramics, ceramic tile, porcelain, porcelain tile, terracotta, terracotta tiles, roof tiles, brick, cinder block, slump block, natural stone and rock, concrete, ferro-cement, ferro-concrete, metals, plastics, laminates, hard woods and laminated woods, and numerous other materials including glass.

Though the outward and inward deflection of fingers 20A & B of the present embodiment will be clearly detailed in the following operational description, it is of some import to note the directional nature, or directionality, of the forces that fingers 20A & B will apply to the wall of a bore when actuated, as differentiated from the bidirectionally deflectable nature of fingers 20A & B themselves.

The directionality of the outward forces generated by the interaction of anvil 40 with fingers 20A & B is caused by the fact that when fingers 20A & 20B are deflected outward each finger is deflected in a specific direction and contacts the wall of a bore in a different location so that and each finger applies force in a particular direction. Because fingers 20A & B are symmetrically shaped and directly opposed to one another and are acted upon equally by anvil 40, the forces that they will apply to the wall of a bore are directed in generally opposite directions. Furthermore as these forces are the result of anvil 40 being pulled between inner surfaces 24A & B and junctures 24.1A & B of fingers 20A & B, respectively, while fingers 20A & B are held stationary in relation to the wall of a bore, the outwardly directed forces that are generated are applied to the wall of the bore in directions that are substantially perpendicular to the direction that the fingers are inserted into the bore. That is to say that the forces are applied in substantially radial directions as opposed to axial directions.

As a result, anchor structures of the present invention can be applied to shallow and very shallow bores in masonry materials with a greatly reduced chance of breaking the material of the bore, when compared to anchor structures which apply forces to the wall of a bore in axial directions or a combination of radial and axial directions.

Because the anchor structures of the present invention can be configured to apply bore gripping forces in specific and selected and predetermined directions they can be applied to bores which are located or situated in such a manner that application of bore gripping force to the wall of the bore in some directions could cause the material of the bore to be broken or cracked while application of the same amount of bore gripping force in other directions would not cause cracking or breakage. One example of such a situation would be a bore which is located near to an edge surface of the material of the bore. This characteristic of the present invention will be disclosed in more detail later in this application.

Though embodiments with two fingers demonstrate the directionality principle most clearly the present invention is not limited to two fingers, but rather may have three, four, or any number of fingers greater than one.

In addition to the directionality of force application, some configurations concentrate or focus the outward force generated more so than others. This focus or concentration of outwardly directed forces is most clearly demonstrated by embodiments which have externally tapered fingers, such as the present embodiment. This is because the radial dimensions of the portions of the tapered outer surfaces 26A & B of fingers 20A & B, which contact and engage the wall of a bore, are significantly smaller than the radial dimensions of the wall of the bore in which the anchor structure will be actuated, so that only a limited portion of the outer surfaces of the fingers contact the wall of the bore, specifically those portions of outer surfaces 26A & B which are located generally equidistantly from edge surfaces 20.1A & B of fingers 20A & B, respectively.

With further disclosure, it will be seen that bidirectionally deflectable fingers of the present invention can be configured in not only the externally tapered form of the present embodiment, but may also be configured in internally tapered forms and combinations of internally and externally tapered forms. Because the radial dimensions of the portions of the outer surfaces which can contact and engage the wall of a bore of each configuration are different, the amounts of the outer surfaces which will contact and engage the wall of a bore are different.

For instance, when the radial dimensions of the outer surfaces of a finger are much smaller than the radial dimensions of the wall of the bore which said outer surfaces are to contact, which can be the case with the present embodiment, only a smaller amount of the outer surface of the finger actually contacts and engages the wall of the bore. Conversely, when the radial dimensions of the outer surfaces of a finger are not much smaller than the radial dimensions of the wall of the bore which said fingers are to contact and engage, which can be the case with configurations of the present invention with internally tapered fingers, a much larger amount of the outer surfaces contacts the wall of the bore. And when the radial dimensions of the outer surfaces of the finger are some dimension between much smaller and not much smaller than the radial dimensions of the wall of the bore which they are to contact and engage, which can be the case with configurations of the present invention which are both internally and externally tapered, the amount of the outer surfaces which will contact the wall of the bore is some amount between the smaller and the larger amounts of the forgoing configurations.

As will be seen with further disclosure in subsequent alternate embodiments, in addition to being able to predetermine the amount of force applied by the bidirectional fingers and the amount of the outer surfaces of said fingers which will contact and apply that amount of force to engage the wall of a bore by configuring said fingers and other portions of the anchor structure appropriately, these basic components of the nature and extent of the engagement of said fingers and said wall, that is to say the amount of outward force and the amount of the outer surfaces of said fingers which engage said wall, can themselves be utilized to further predetermine the nature and extent of the engagement of said fingers with said wall.

As brief example, as various aspects of this subject will be detailed in reference to subsequent embodiments, by applying a certain amount of force to the outer surfaces of fingers configured in such a manner that the outer radial dimensions of the portions of said fingers which will contact the wall of a bore are much smaller than the radial dimensions of the wall of the bore which said outer surfaces will contact, said outer surfaces of said fingers can be caused to deform against the wall of the bore to various extents, and by doing so, the amount force necessary to pull said finger from said bore can be greatly increased.

While, in contrast, if the same certain amount of force is applied to the outer surfaces of fingers configured in such a manner that the outer radial dimensions of the portions which will contact the wall of a bore are not much smaller than the radial dimensions of the wall of the bore which said outer surfaces will contact, the outer surfaces of these finger may not be caused to deform against the wall of the bore to any significant extent.

Body 10, deformable head 16, and bidirectionally deflectable fingers 20A & B comprise the anchor component of the preferred embodiment of the present invention.

Actuator Stem 30, Upset Portion 34, Notch 32, and Anvil 40

Actuator stem 30 and anvil 40 are portions of the monolithic or one piece actuator device of the present embodiment; in fact they are normally formed from a single piece of suitable wire by an appropriate method such as cold heading or cold forming. Actuator stem 30 transfers tensional force from a blind rivet installation tool to anvil 40, which applies force to bidirectionally deflectable fingers 20A & B, which are then deflected outward to engage the wall of a bore and then inward to secure anvil 40 between said fingers.

Stem 30 is an elongated rod or pin of circular cross section which is slideably positioned within body 10 and fingers 20A & B, and which has a diameter that is slightly less than the inner diameter of body 10, and which has anvil 40 formed at one end. The length of stem 30 is such that when slideably positioned within body 10, and with anvil 40 in close proximity to finger end surfaces 22A & B, the end distant from anvil 40 will project out of end surface 11 of body 10, a sufficient distance to be engaged by the pulling portion of a blind rivet installation tool.

Located on stem 30 is upset portion 34. Upset portion 34 is situated on stem 30 in such a manner as to allow upset portion 34 to engage the inner diameter of body 10 in a slight or minimal interference fit in such a manner as to allow stem 30 to slide back and forth within body 10 by application of some slight urging.

Also located on stem 30, close to anvil 40, is notch or groove or otherwise intentionally weakened portion 32. Notch 32 is a portion of stem 30 which is intentionally weakened so as to form a location which will give way or break when a predetermined amount of tensional force is exceeded between actuator stem 30 and anvil 40. Notch 32 allows the application of a specific predetermined amount of tensional force to be applied to anvil 40 by the pulling portion of a blind rivet installation tool. Whereas it is the purpose of fingers 20A & B and anvil 40 to interact to multiply any tensional force applied to anvil 40 by actuator stem 30; it is the purpose of notch 32 to determine the maximum amount of force that can be applied to anvil 40, which is accomplished by notch 32 breaking when a predetermined amount of tensional force is exceeded between stem 30 and anvil 40.

Thus by configuring the amount of taper of outer surfaces 26A & B, which determines the rate or factor by which the interaction of anvil 40 and fingers 20A & B will multiply and redirect an amount of tensional force applied to stem 30, and then applying a specific amount of tensional force to anvil 40 by configuring notch 32 to break when a predetermined amount of force has been applied to anvil 40, the amount of outwardly directed force that an anchor structure will produce can be determined or predetermined.

Anvil 40 is a radially enlarged member, which is frustum shaped. The diameter of the small end of anvil 40 is the same as the diameter of stem 30 while the large end is dimensioned such that when it is positioned between fingers 20A & B, at or near to end surfaces 22A & B, so that junctures 24.1A & B of fingers 20A & B, respectively are in contact with the largest outer diameter of anvil 40, the radial dimension between the two most radially distant portions of end surfaces 22A & B will generally equal or be somewhat larger than the outer diameter of body 10.

The cone angle of frustum-shaped anvil 40 is somewhat greater than the combined angles of outer surfaces 26A and 26B in their relation to inner surfaces 24A and 24B, respectively, so that when anvil 40 is drawn between fingers 20A & B, it is the outer most diameter of anvil 40 and not the conical outer surface of anvil 40 which contacts junctures 24.1A & B. Additionally, the cone angle of anvil 40 is configured to cooperate with finger end surfaces 22A & B to deflect fingers 20A & B outward when anvil 40 is drawn against end surfaces 22A & B during the initial stages of actuation.

The outer most circumference of anvil 40 has a relatively sharp or well defined edge or at least one that is not very rounded. The sharp or well defined character of this outer most annulus will allow it to engage inner surfaces 24A & B and junctures 24.1A & B of fingers 20A & B, respectively, in such a manner as to allow anvil 40 to move relatively easily in the direction out of a bore during actuation of the anchor structure, but not to slide back easily at all in the direction into the bore. This interaction will be clarified during the operational disclosure of this embodiment.

It is notable that anvil 40 is a solid structure rather than being pierced through axially, as are a number of force applying portions which will be disclosed in other embodiments of the present invention. The solid nature of anvil 40 will be shown in the operational disclosure of this embodiment to facilitate the easy removal of the anchor structure of the present embodiment after its actuation inside a bore.

Furthermore anvil 40 is substantially rigid. That is to say that it is not significantly elastically deformable or significantly plastically deformable as a result of either design or composition. And though in practice and reality there are no perfectly ridged bodies, and as a result anvil 40 will exhibit some elastic and plastic properties, in this instance, the term "substantially ridged" is used to call attention to the fact that anvil 40 is not designed or configured in such a manner as to behave in a particularly elastic manner or in a particularly plastic manner, but rather is intended to function in a substantially ridged manner.

Operational Description of the Preferred Embodiment

The following operational description makes reference to FIG. 1.2 to FIG. 1.8, which are cross-sectional drawings of the preferred embodiment with the exception of radial cross-sectional drawing 1.4B. Note that in the axial cross-sectional views lines representing edge surfaces 20.1A & B of fingers 20A & B, respectively, are occluded by lines representing junctures 24.1A & B of fingers 20A & B, respectively. For clarification of the relative positions of edge surfaces 20.1A & B please reference FIG. 1.4B if necessary.

FIG. 1.2

FIG. 1.2 depicts the anchor structure having been passed through an appropriately sized and positioned hole in an article (article 4) and into an appropriate bore (bore 1) in a solid material (material 2) which has an outer surface (surface 3). Actuator stem 30 has been engaged by the pulling portion of a rivet installation tool (pulling portion 6) while the pushing portion of the same tool (pushing portion 5) is pressed against outer surface 18 of head 16. Inner surface 17 of head 16 is pressed against article 4 which is in turn pressed against surface 3.

Note that the amount of pressure or force which is applied to article 4 by inner surface 17 is an indeterminate amount which is dependant solely upon whatever amount may be applied to position the rivet tool and article 4 against surface 3. The anchor structure of the present embodiment is ready to be actuated within bore 1 and subsequently affix article 4 to surface 3.

FIG. 1.3

FIG. 1.3 depicts the initial step of actuation. While pushing portion 5 of the blind rivet tool is pressed against outer surface 18 of head 16, in the direction towards bore 1 (as indicated by arrow 5A), pulling portion 6 of the same tool pulls stem 30 in the direction out of bore 1, (as indicated by arrow 6A). Sufficient force is applied to overcome the small resistance between upset portion 34 and the lumen of body 10 and actuator stem 30 starts to slide in the direction out of bore 1, pulling anvil 40 against finger end surfaces 22A & B. End surfaces 22A & B, having been configured appropriately to cooperate with anvil 40 and vice versa, are deflected out towards the wall of bore 1, as the pulling force applied to stem 30 continues to draw anvil 40 firmly against them. Fingers 20A & B, being substantially identically shaped and being positioned so as to be directly opposed to each other and being acted upon equally by anvil 40 are deflected outward substantially simultaneously in opposite directions that are substantially perpendicular to the direction in which fingers 20A & B where inserted into bore 1. Furthermore, this initial deflection occurs at a relatively rapid rate. That is to say that the distance that fingers 20A & B are deflected outward is relatively large in comparison to the distance anvil 40 moves in the direction out of bore 1.

As the designed dimensions and the slope or taper of the conical outer surface of anvil 40 and of finger end surfaces 22A & B can vary, the specific mode of interaction between anvil 40 and end surfaces 22A & B can vary. For instance the junctures of end surfaces 22A & B with outer surfaces 26A & B, respectively, might contact the conical surface of anvil 40 and be deflected apart by it. In another instance, the junctures of inner surfaces 24A & B with end surfaces 22A & B, respectively, might contact the sloped surface of anvil 40 and be deflected outward by it. In another instance, end surfaces 22A & B might contact the sloped outer surface of anvil 40 and be deflected outward and apart by it. In each of these instances the result is to urge or force finger ends 22A & B apart, deflecting them in directions toward the wall of bore 1.

As end surfaces 22A & B and subsequently fingers 20A & B are pushed outward by the force of anvil 40 being drawn between end surfaces 22A & B, fingers 20A & B are forced to articulate or bend outward toward bore 1 at or very close to distal end 10.1 of body 10.

FIG. 1.4A and FIG. 1.4B

In FIG. 1.4A anvil 40 has been pulled past end surfaces 22A & B, as pulling force continues to be applied to stem 30 by pulling portion 6 and pushing force continues to be applied to head 16 by pushing portion 5. Anvil 40 is now located between fingers 20A & B which have been simultaneously deflected out toward bore 1 sufficiently to allow the outer most diameter of anvil 40 to be drawn between and in between junctures 24.1A & B.

FIG. 1.4B is a radial cross-section of the portions of deflectable fingers 20A & B in close proximity to the outer most diameter of anvil 40, at the same interval depicted in FIG. 1.4A. FIG. 1.4B shows the orientation of junctures 24.1A & B and inner surfaces 24A & B of fingers 20A & B, respectively, with the outer most diameter of anvil 40.

It is of note at this interval that due to the outward deflection of fingers 20A & B and the subsequent outward articulations of fingers 20A & B at or near to their junctions with body 10 at distal end 10.1, inner surfaces 24A & B and outer surfaces 26A & B of fingers 20A & B, respectively, have exchanged or interchanged their relative angles in relation to bore 1. Where as outer surfaces 26A and 26B were oriented at an angle with respect to bore 1, they are now generally nearly parallel to bore 1; and inner surfaces 24A and 24B which were generally parallel to bore 1 are now positioned at an angle in relation to bore 1. Furthermore, the angle at which inner surfaces 24A & B are now positioned in relation to bore 1 closely approximates the angle with which outside surfaces 26A and 26B were positioned in relation to bore 1 before the outward deflection and articulation of fingers 20A and 20B.

This exchange of the relative angles of outer surfaces 26A & B with the relative angles of inner surfaces 24A & B results in inner surfaces 24A & B and junctures 24.1A & B being oriented in relation to each other so as to form a tapered passage with anvil 40 located or positioned between the two tapered, wedge-like positioned surfaces. As anvil 40 continues to be drawn into this wedge-like passage, the interaction of anvil 40 with the tapered wedge-like passage formed by inner surfaces 24A & B and junctures 24.1A & B, results in the amount of tensional force or pulling force being applied to stem 30 by the pulling portion 6 of the rivet installation tool being multiplied and redirected into outwardly directed force.

The degree to which the tensional force applied to stem 30 is multiplied and then redirected into an outwardly directed force is determined by the amount of taper or slope of the wedge-like passage formed by junctures 24.1A & B and inner surfaces 24A & B of fingers 20A & B, respectively. Because the passage is shaped like a wedge, the interaction of anvil 40 with the passage can be described and analyzed by application of wedge mechanics. Simplified and ignoring friction, and adapted to this application, the formula for wedge mechanics states that for a specific distanced moved by anvil 40 in the direction out of bore 1, the amount of force generated between anvil 40 and fingers 20A & B will be increased by an amount, or will be multiplied by a factor, which is directly related to the amount of taper or slope of the wedge-like passage formed by junctures 24.1A & B and inner surfaces 24A & B of fingers 20A & B, respectively. The relationship between the deflection rate, that is to say the distance that the fingers are deflected outward compared to the distance the anvil moves, and the amount of force generated is such that the lower the deflection rate the larger the amount of increase in outwardly directed force. And conversely, the larger the deflection rate the smaller the amount of increase in outwardly directed force.

It is notable that the present embodiment and other embodiments yet presented utilizes two different deflection rates in sequence. A first and more rapid deflection rate during the initial outward deflection of fingers 20A & B caused by the interaction of anvil 40 with finger end surfaces 22A & B and then a second less rapid rate which is caused by the interaction of anvil 40 with junctures 24.1A & B. The utilization of the first rapid deflection rate causes fingers 20A & B to be deflected outward into proximity to the wall of a bore while anvil 40 moves a short distance and the second less rapid rate causes fingers 20A & B to engage the wall of the bore with a greatly increased amount of bore gripping force. This feature allows the overall length of the bore gripping portions of the anchor structure to be significantly shorter in axial dimensions without reducing the amount of outwardly directed force produced, which allows the axial dimensions or depth of the bore necessary to accommodate the anchor structure to be significantly reduced.

Because the degree of taper or slope, of the wedge-like passage formed by junctures 24.1A & B and inner surfaces 24A & B after the outward articulation of fingers 20A & B, determines the factor by which tensional force applied to stem 30 will be multiplied by and redirected into a outwardly directed force, it is easy to design and manufacture anchor structures of the present invention to produce a selected amount of outwardly directed force, in part, by varying the amount of taper of the wedge-like passage. To vary the degree of taper of the wedge-like passage formed by junctures 24.1A & B and inner surfaces 24A & B of fingers 20A & B, respectively, the degree of taper or slope of outer surfaces 26A & B of fingers 20A & B, respectively, is varied accordingly.

Although the amount or degree of taper or slope of junctures 24.1A & B and inner surfaces 24A & B of fingers 20A & B, respectively, determine in large part the factor by which tensional force applied to stem 30 will be multiplied and redirected into outwardly directed force, the maximum amount of force generated is controlled by limiting the predetermined amount of tensional force that actuator stem 30 can transfer from pulling portion 6 of a rivet installation tool to anvil 40 before breaking at notch 32 of stem 30.

FIG. 1.5

FIG. 1.5 depicts anvil 40 being pulled farther between fingers 20A & B and toward body 10. Up to this time and at this interval, inner surface 17 of head 16 is still held against article 4 with whatever amount of pressure is being applied to position the rivet installation tool and as yet none of the forces applied to stem 30 or head 16 as a result of the actuation process have come to bear upon article 4 or surface 3.

Anvil 40 bears against fingers 20A & B, by way of now tapered junctures 24.1A & B and said fingers are deflected farther out toward the wall of bore 1, at a second and less rapid deflection rate, which causes fingers 20A & B to articulate farther outward at or near to their junctions with body 10 at distal end 10.1. As fingers 20A & B are deflected and articulate outward, portions of outer surfaces 26A & B of said fingers, directly adjacent to end surfaces 22A & B of said fingers, are forced into contact with the wall of bore 1. Furthermore, the end portions of outer surfaces 26A & B in close proximity to end surfaces 22A & B, respectively, which contact the wall of bore 1 are the portions of said outer surfaces which are generally equidistant from edge surfaces 20.1A & B, and they make contact in locations which are generally diametrically opposed to one another and are directions which are substantially perpendicular to the direction that fingers 20A & B were inserted into bore 1.

At this time, only the portions of outer surfaces 26A & B of fingers 20A & B, respectively, which are in close proximity to finger end surfaces 22A & B contact the wall of bore 1. The remainder of outer surfaces 26A & B do not contact the wall of bore 1 as yet, but instead there is a gap or void between them and the wall of bore 1. Situated in these positions, fingers 20A & B might be described as beams or some other forcibly bendable members which are supported at one end by their junctures with body 10 at distal end 10.1, and which are supported at the other end by their contact with the wall of bore 1, very near to the junctures of outer surfaces 26A & B and end surfaces 22A & B, respectively, with anvil 40 beginning to apply outward force to the span of the beam.

FIG. 1.6

FIG. 1.6 depicts more forceful contact between anvil 40 and junctures 24.1A & B, as anvil 40 is strongly drawn farther toward body 10. The outward pressure generated by the interaction of anvil 40 with the wedge-like configuration of junctures 24.1A & B of fingers 20A & B, respectively, forces more of outer surfaces 26A & B of fingers 20A & B, respectively, through the void between outer surfaces 26A & B and the wall of bore 1 and into contact with the wall of bore 1. As fingers 20A & B are pressed through the void they continue to articulate at or near to the locations that they join body 10 at distal end 10.1. Additionally, as fingers 20A & B are bent outward they elastically and plastically deform in locations which are in contact with or in close proximity to anvil 40.

To continue the beam analogy, anvil 40 applies an increasing amount of force to junctures 24.1A & B and as a result the unsupported portions of beam-like situated fingers 20A & B located between end surfaces 22A & B and the junctures of said fingers with body 10 bend outward.

Portions of fingers 20A & B will continue to be deflected and articulate outward to some extent, at the junctures of fingers 20A & B and distal end 10.1 of body 10, as long as anvil 40 continues to be drawn farther and farther between them. This is because fingers 20A & B articulate outward at their junctures with distal end 10.1 of body 10, and the outer diameter of body 10 is some amount smaller than the diameter of bore 1. As a result, the portions of fingers 20A & B located between anvil 40 and distal end 10.1 of body 10 continue to be deflected outward toward the wall of bore 1 and continue to articulate outward at their junctures with distal end 10.1 of body 10, as long as anvil 40 continues to be drawn farther between fingers 20A & B.

As the diametral dimensions of bores in masonry materials vary to significant degrees, the actual amount that the portions of fingers 20A & B located between anvil 40 and distal end 10.1 continue to be deflected outward is dependent on the actual diameter of the bore in which the anchor structure is actuated.

The continued outward deflection and subsequent articulation of fingers 20A & B, whether inside a relatively large bore or a relatively small bore, is significant in that as long as fingers 20A & B continue to be deflected outward and to articulate outward at or very close to their junctures with distal end 10.1 of body 10, the amount of taper or slope of inner surfaces 24A & B of fingers 20A & B, respectively, in relation to each other continues to increase. As a result, because the amount of slope or taper of junctures 24.1A & B and inner surfaces 24 A & B determine the rate or factor by which the amount of force applied to anvil 40 by stem 30 will be multiplied and redirected outwardly, the force multiplication rate or factor is diminished to some extent the farther outward that fingers 20A & B are deflected and caused to articulate.

The outward bending of the unsupported portions of fingers 20A & B that is apparent at the interval depicted in FIG. 1.6 and the continued bending of said fingers which will result as anvil 40 is drawn progressively farther between said fingers, is the beginning of one of the four mechanisms applied to cause the end portions of fingers 20A & B to be deflected away from the wall of bore 1 and to deflect and articulate inwards behind anvil 40.

In the present embodiment there are four different mechanisms that act upon fingers 20A & B to deflect the portions of fingers 20A & B that are located between end surfaces 22A & B of fingers 20A & B, respectively, and anvil 40 to be deflected inward and behind anvil 40. The operation of each inward deflection mechanism will be described, as well as when it acts upon fingers 20A & B. It should be noted that the effects describe act upon both fingers 20A & B substantially simultaneously and affect both fingers substantially identically.

The first inward deflection mechanism to act upon fingers 20A & B is the outward bending of the fingers along their axial dimensions, that is to say bending outward like a beam which is supported or restrained at both ends, and the plastic deformation of the portions of said fingers in contact with or in close proximity to anvil 40 during, and as a result of, said bending. Because portions of outer surfaces 26A & B adjacent to end surfaces 22A & B, respectively, are in contact with the wall of bore 1 and can not be deflected or moved outwards any farther which prevents fingers 20A & B from deflecting outward as a whole, and the junctures of fingers 20A & B with distal end 10.1 of body 10 prevents the fingers from being deflected or moved outward, the force of anvil 40 interacting with junctures 24.1A & B causes fingers 20A & B to bend outward and plastically deform at locations in close proximity to anvil 40. As anvil 40 is drawn farther between the fingers it similarly bends and deforms the next portions of the fingers with which it interacts. As anvil 40 continues to be drawn farther between the fingers the outward bending and plastic deformation continues and progresses along at or in close proximity to the intersections of anvil 40 and fingers 20A & B. As each successive portion of fingers 20A & B is bent outward and plastically deformed in doing so, it is the inside of the bend which is oriented toward anvil 40. As a result, the portions of fingers 20A & B which have already been bent outward and plastically deformed and past which anvil 40 has been drawn are deflected away from the wall of bore 1 behind anvil 40 by the next portions of said fingers being bent outward and deformed by anvil 40, and so on, until anvil 40 stops moving in the direction out of bore 1.

In order to simplify and shorten subsequent descriptions of this first inward deflection mechanism it will be referred to as inward deflection caused by beam deformation. In this embodiment in which bidirectionally deflectable fingers 20A & B only articulate outward at a single location, that being the junctures of fingers 20A & B with body 10 at distal end 10.1, the inward deflection caused by beam deflection will continue to act upon the fingers until anvil 40 stops moving in the direction out of bore 1.

At or about the same time at which fingers 20A & B are acted upon by the beam deformation mechanism, a second inward deflection mechanism begins to act upon the fingers. The second inward deflection mechanism to act upon fingers 20A & B is the outward bending and plastic deformation of portions of fingers 20A & B in a generally radial manner.

As the outward forces generated by the interaction of anvil 40 with sloped junctures 24.1A & B bends fingers 20A & B outward and begins to cause an inward deflection of the end portions of fingers 20A & B by application of the previously described inward beam deformation mechanism, at some point or time the portions of outer surfaces 26A & B of fingers 20A & B, respectively, which are located generally equidistantly from edge surface 20.1A & B of fingers 20A & B, respectively, and which are in close proximity to anvil 40 are pressed against the wall of bore 1.

As anvil 40 continues to be drawn in the direction out of bore 1 and the outward force applied to fingers 20A & B by way of junctures 24.1A & B, respectively, continues to increases, the amount of force being applied to junctures 24.1A & B becomes large enough to cause the portions of junctures 24.1A & B in close proximity to anvil 40 to be forced radially outward and to be deformed in the direction of the wall of bore 1. Because the portions of outer surfaces 26A & B in close proximity to anvil 40 are already in contact with the wall of bore 1 and can not be deflected outward any farther, as the portions of junctures 24.1A & B in close proximity to anvil 40 are bent outward and deformed, the axial dimensions of junctures 24.1A & B and some portions of inner surfaces 24A & B are in effect reduced to some extent, while the axial dimensions of outer surfaces 26A & B are not. Because the axial dimensions of junctures 24.1A & B and some portions of inner surfaces 24A & B are in effect reduced while the axial dimensions of outer surfaces 26A & B are not in effect or otherwise shortened, causes the portions of inner surfaces 24.A & B and junctures 24.1A & B located between end surfaces 22A & B, respectively, and anvil 40 to exert a tensional force upon the portions of fingers 20A & B located between end surfaces 22A & B, respectively, and anvil 40 in such a manner as cause these portions to deflect inwardly away from the wall of bore 1, while articulating inward behind anvil 40.

As this outward radial bending or deformation process occurs in close proximity to the locations at which anvil 40 contacts junctures 24.1A & B, it progresses along with anvil 40 as the anvil continues to be drawn between fingers 20A & B, and the end portions of fingers 20A & B continue to be deflected inward and articulate behind anvil 40 more and more. This mechanism will continue to act upon fingers 20A & B until anvil 40 stops moving in the direction out of bore 1.

In order to simplify and shorten subsequent descriptions of this second inward deflection mechanism it will be referred to as inward deflection caused by localized radial deformation.

The object of the inward deflection of the finger end surfaces 22A & B and the portions of fingers 20A & B located between finger ends surfaces 22A & B and anvil 40, is so that the sharp or well defined outer most diameter of anvil 40 can engage the inwardly deflected portions of inner surfaces 24A & B and junctures 24.1A & B in a manner which prevents anvil 40 from moving in the direction back into bore 1, or back sliding, during the actuation process and after actuation is completed will securely retain anvil 40 in between fingers 20A & B.

FIG. 1.7

In FIG. 1.7 anvil 40 has been forcefully pulled somewhat farther between fingers 20A & B and the increased outward force generated by the interaction of anvil 40 with the sloped or tapered junctures 24.1A & B has increased the amount of outwardly directed force being applied to the wall of the bore by outer surfaces 26A & B and also increased the inward deflection of the end portions of the fingers due to both beam deformation and localized radial deformation.

At about this time or point in the actuation process, a significant transition also occurs. As the pressure continues to increase the outer most diameter of anvil 40 presses strongly against junctures 24.1A & B, and these junctures are forced outward toward the wall of bore 1, a point is reached at which the outer diameter of anvil 40 also contacts inner surfaces 24A & B of fingers 20A & B, respectively. Up to this point the full amount of outward force generated by anvil 40 bearing upon wedge-like-positioned junctures 24.1A & B of fingers 20A & B, has not been applied directly to the wall of bore 1, rather a portion has been expended to cause the first and second deflection mechanisms. From this point onward in the actuation process the outwardly directed force generated by anvil 40 bearing upon the wedge-like positioned inner surfaces 24A & B of fingers 20A & B, respectively, is transferred directly to the wall of bore 1. Thus a larger amount of outward force that is generated by the interaction of anvil 40 with the wedge-like passage formed by junctures 24.1A & B and inner surfaces 22A & B is applied to the wall of bore 1.

From about the time that anvil 40 begins to bear directly upon inner surfaces 24A & B in addition to junctures 24.1A & B a third inward deflection mechanism can cause farther inward deflection of the end portions of fingers 20A & B behind anvil 40.

In some instances, that is to say when fingers 20A & B and anvil 40 are configured appropriately, and the amount of tensional force applied is sufficient, the interaction of anvil 40 with the wedge-like passage formed between fingers 20A & B can generate enough outwardly directed force to cause portions of fingers 20A & B in close proximity to anvil 40 to be plastically deformed in a manner which reduces the radial dimensions of these portions radial cross sectional areas.

When anvil 40 bears forcefully upon portions of junctures 24.1A & B and inner surfaces 24A & B, and when the portions of outer surfaces 26A & B which directly radially correspond with the portions being born upon forcefully by anvil 40 are already in contact with the wall of bore 1, the portions of fingers 20A & B between anvil 40 and the wall of bore 1 can be deformed by anvil 40 pressing so forcefully outward against these portions that the radial dimensions of these portions are reduced in radial cross sectional area, or crushed, in other words, the thickness of these portions is reduced by crushing. When the radial dimensions of the radial cross sectional areas of portions of fingers 20A & B are reduced, or crushed by anvil 40 forcefully pressing said portions outwardly against the wall of bore 1, those portions of fingers 20A & B directly adjacent to the crushed portions, but which are not themselves crushed or not crushed as much, press upon the wall of bore 1 in such a manner as to cause the end portions of fingers 20A & B to deflect inward behind anvil 40 while articulating near to anvil 40. This mechanism will continue to act upon fingers 20A & B as long as anvil 40 continues to move in the direction out of bore 1.

In order to simplify and shorten the description of this third inward deflection mechanism it will be referred to as inward deflection caused by localized reduction of radial cross sectional area, or localized reduction of radial cross section for short.

Around the same time that the third inward deflection mechanism acts upon fingers 20A & B a forth inward deflection mechanism can also act upon the fingers to cause the end portions of the fingers to deflect inward. When the amount of force being applied to fingers 20A & B by anvil 40 is sufficiently large and anvil 40 continues to be drawn farther between the fingers, anvil 40 can apply an amount of dragging force, or shearing force, in the direction that anvil 40 is moving, to inner surfaces 24A & B and junctures 24.1A & B. As there is no corresponding force applied to outer surfaces 26A & B, the end portions of fingers 20A & B are caused to deflect inward while they articulate at locations behind anvil 40. As this mechanism is caused by the forceful movement of anvil 40 in the direction out of bore 1 it will continue to act upon fingers 20A & B until anvil 40 stops moving.

Again in order to simplify and shorten future descriptions of this fourth inward deflection mechanism it will be referred to as inward deflection caused by shear force.

At the interval depicted in FIG. 1.7 fingers 20A & B have been deflected outward with a sufficient amount of force that portions of said fingers in close proximity to anvil 40 are being deflected outward against the wall of bore 1 with an amount of force which is approaching the maximum designed amount for the anchor structure of the present embodiment. Furthermore anvil 40 is so forcefully engaged between fingers 20A & B so as to be practically jammed in its present location. At the same time the amount of force being applied to stem 30 by pulling portion 6 of the blind rivet installation tool continues to increase and is now approaching the predetermined amount necessary to cause stem 30 to break at notch 32.

FIG. 1.8

In FIG. 1.8, the pushing and pulling forces of pushing portion 5 and pulling portion 6, respectively, continue to increase and be applied appropriately in the directions indicated by arrows 5A and 6A, but anvil 40 has been drawn or pulled forcefully as far as practically possible in the direction out of bore 1 and is now wedged so forcefully between fingers 20A & B, that it is jammed, and can not be pulled any farther in the direction out of bore 1.

The end portions of fingers 20A & B, specifically those portions of fingers 20A & B located between end surfaces 22A & B and anvil 40, have been deflected inwardly to such an extent that the well defined outer diameter of anvil 40 is engaged by junctures 24.1A & B and inner surfaces 24A & B in such a manner as to prevent anvil 40 from moving in the direction back into bore 1. Because anvil 40 is jammed between fingers 20A & B so forcefully that it can no longer move in the direction out of bore 1, and is prevented from moving in the direction back into bore 1 by inwardly articulated portions of fingers 20A & B, anvil 40 is held or retained in its jammed or wedged position.

As the tensional force applied to stem 30 continues to increase, the pressure applied to head 16 by means of pushing portion 5 of installation tool, bearing upon portions of outer surface 18, increases to the predetermined amount necessary to plastically deform head 16. Pushing portion 5 of rivet installation tool bears strongly on outer surface 18 of head 16 and head 16 deforms and flattens in the direction towards surface 3. As head 16 deforms in the direction toward surface 3, inner surface 17 of head 16 is pressed firmly against article 4 which is in turn forced firmly against surface 3.

Because the deformation of head 16 is substantially plastic in nature and occurs because of the application of a specific and predetermined amount of force, a large and calculable portion of the pressure exerted against article 4 by inner surface 17 of head 16 will be sustained after the actuation process is complete and the pressure exerted against head 16, by pushing portion 5 as a result of the actuation process is discontinued, and hence article 4 will remain firmly pressed against surface 3 by a specific and predetermined amount of force.

FIG. 1.9

FIG. 1.9 depicts the anchor structure of the present embodiment situated within bore 1 after the final steps of the actuation process. The pulling pressure continued to be increased on stem 30 by pulling portion 6 of the rivet installation tool and pushing pressure continued to be applied to head 16 by pushing portion 5 of the same rivet installation tool, until the predetermined amount of force necessary to break actuation stem 30 at notch 32 was achieved, and stem 30 broke. The now spent stem 30, or portion there of, has been withdrawn from the inner diameter of body 10 and the portions 5 & 6 of the rivet installation tool have been removed.

The anchor structure of the present embodiment is strongly held and coupled within bore 1 by bidirectionally deflectable and doubly articulable fingers 20A and 20B, which have been simultaneously deflected outward in opposite directions by anvil 40 and caused to articulate outward, at or near to their junctions with body 10 at distal end 10.1, to engage the wall of bore 1 with an amount of force that has been generated by multiplying and redirecting the tensional force applied to stem 30 by the rivet installation tool by a factor which is determined to a large extent by the angles of the tapered portions of fingers 20A & B.

During the process of forcefully deflecting bidirectionally deflectable fingers 20A & B outward in a first direction and forcefully against the wall of bore 1, the interaction of anvil 40 with bidirectionally deflectable fingers 20A & B has caused a second and inward deflection of the end portions of fingers 20A & B located between end surfaces 22A & B and anvil 40. This inward deflection of the finger end portions has been accomplished by application of four different inward deflection mechanisms, namely; beam deformation, localized radial deformation, localized reduction of radial cross-sectional area, and shearing force. Additionally the inward deflection of the end portions of fingers 20A & B was effected generally simultaneously and with equal effect on both fingers to an extent that the outer diameter of anvil 40 is engaged by the inwardly deflected end portions of fingers 20A & B and is prevented from moving in the direction back into bore 1 or in the direction out of bore 1.

Head 16 has been plastically deformed in the direction toward surface 3, in such a manner as to firmly pinch article 4 between inner surface 17 of head 16 and surface 3 of material 2 with a specific and predetermined amount of force.

Though not depicted, removal of the actuated anchor structure, which is strongly coupled with the wall of bore 1, can be easily effected with little or no deleterious effects to material 2, by inserting the spent portion of actuator stem 30, or a suitable wire or rod, into the inner diameter of body 10 a sufficient distance so as to contact anvil 40, and then applying a sufficient amount of force, possibly by tapping or hammering upon the stem or wire, to drive anvil 40 in the direction back into bore 1, and out from between fingers 20A & B. When anvil 40 is forcibly dislodged and driven in the direction back into bore 1, the vast majority of outward directed bore griping force of the wedge-and-anvil configuration is relieved, and then the anchor component can be withdrawn from bore 1 by application of some small amount of effort.

In summation, as can be seen from the preceding description, the nature and the extent of the deflection of fingers 20A & B are the result of the specific configuration of said fingers and the specific configuration of the actuator device comprised of anvil 40, actuator stem 30, and notch 32. That is to say that the factors which determine the characteristics of how, when, where, why, and how much that fingers 20A & B are deflected, are determined by the specific configuration of fingers 20A & B and the specific configuration of the actuator device, and how they are configured in relation to each other.

Additionally, though the specific nature and extent of the engagement of outer surfaces 26A & B of fingers 20A & B, respectively, with the wall of bore 1, has not been commented upon to any great length, a substantial basis for further disclosure relating to the subject has been established.

Though it is clear that the nature and extent of the deflection of fingers 20A & B of the present embodiment are predetermined by the configuration of said fingers and said actuator device, it is germane to emphasize that the specific configuration of said fingers and said actuator device is not the only configuration that will cause the outward and then inward deflection of the end portions of the fingers in a specific and predetermined manner.

Furthermore, as will be demonstrated with further disclosure, the bidirectionally deflectable fingers and actuator devices of the present invention may be configured in many different ways to enhance or diminish a particular characteristic, or characteristics of the nature or the extent or the nature and the extent of the deflection of said fingers or a specific portion, or portions, thereof, and as a result of enhancing or diminishing certain characteristics of the deflections of said fingers, anchor structures of the present invention may be suitably, or more suitably, configured for application to a wider variety of bore anchoring requirements, or conversely may be configured in such manners as to limit their effective application to very specific bore anchoring requirements.

Detailed Description of a First Alternate Embodiment

The following exemplary embodiment of the present invention has externally tapered bidirectionally deflectable fingers which are triply articulable, inward deflection augmentation means embodied in the form of inward deflection grooves, integrally formed axially plastically deformable article attachment means embodied in a second form of plastically deformable head, an axially plastically compressible body, and an actuator device comprised of a separable stem and force applying portion.

As will be seen, the nature of the deflection of the bidirectionally deflectable fingers of the present embodiment, and the extent of said deflection, including the amount of outwardly directed force generated by the interaction of the force applying portion with said fingers in addition to what portions of that force generated are expended to cause or perform particular functions during the actuation process, and other characteristics, are significantly different from those of the preferred embodiment. As a result the present embodiment exhibits different operational and bore engagement characteristics which enable it to be applied to address different bore anchoring requirements than the preferred embodiment. Furthermore the different nature and extent of the deflection of the bidirectionally deflectable fingers of the present embodiment results from the specific configurations of said fingers and the actuator device of this embodiment.

The present embodiment utilizes three of the four inward deflection mechanisms detailed in the preferred embodiment. The inward deflection mechanism caused by beam deflection is not utilized because the fingers of the present embodiment are each articulated outward at two different location in such a manner that the bore engaging portions of said fingers are positioned parallel to the wall of a bore and in direct contact there to, regardless of the variance of a bores diameter within the expected norms for masonry bores. As a result the fingers are not situated in a manner that would cause the beam deflection mechanism to be applied.

One result of this configuration is that the anchor structure of the present embodiment expends less of the available tensional force applied to it deforming its bidirectionally deflectable fingers so that more force is available to couple the anchor component with the bore. Additionally the doubly articulated outward deflection of the anchor components fingers allow the anchor structure to be configured to produce more precise amounts of outwardly directed bore gripping force, and also allows the generation of a higher maximum amount of outwardly directed force than the singly outwardly articulated fingers of the preferred embodiment.

The present embodiment also introduces a multi-piece actuator device which is comprised of an actuator stem 30 with a radially enlarged head 31 located at one end, and a separable anvil or force applying portion 42. Additionally, after the anchor structure of the present embodiment has been coupled with a bore, the pierced nature of anvil 42 will be shown to make removal of said anchor structure difficult. A desirable quality in an anchor applied to security applications or other situations requiring a tamper resistant anchor structure.

The present embodiment also has an axially compressible body portion which increases the capacity of the anchor structure to apply a predetermined amount of force or pressure to hold an article to the outer surface of the material of the bore, even when the article may have a degree of inherent compressibility, such as wood.

Body 10 and Axially Compressible Head 50

The following detailed description makes reference to FIG. 2.0, a perspective view, FIG. 2.1A, an axial cross-sectional view, and FIGS. 2.1B and 2.1C, both of which are radial cross-sectional views of the locations indicated in FIG. 2.1A.

Head 50 is a slightly conically shaped ring or washer, formed or otherwise integrally attached to the outer diameter of end surface 11 of body 10. Head 50 has an inner surface 52 and an outer surface 51. Outer surface 51 of head 50 is positioned so as to be flush or even with end surface 11 of body 10 at the location at which they join. Outer surface 51 and inner surface 52 curve somewhat toward body 10 as they extend out radially from body 10.

The shape, dimensions, and composition of head 50 are configured to allow head 50 to plastically deform in an axial direction when subjected to a sufficient amount of axial force, so as to cooperate with axial compression zone 13 of body 10 during the actuation of the anchor structure. The object of the cooperative combination of deformable head 50 and axial compression zone 13, yet to be disclosed, is to apply a predetermined amount of axial force to pinch or hold an article to the outer surface of the material of a bore; much the same as the deformable head 16 of the preferred embodiment, but with a greatly increased range of axial compression.

Body 10 is generally a hollow cylinder with a proximal end surface 11 and a distal end 10.1. Head 50 is formed around proximal end 11 and bidirectionally deflectable fingers 19A & B are located at distal end 10.1. The outer diameter of body 10 is somewhat smaller than the bore in which it is to be inserted, and the inner diameter is a little larger than the outer diameter of actuator stem 30. Proximal end surface 11 is the location that the pushing portion of a blind rivet actuation tool will push upon during the actuation of the present embodiment. Positioned on the exterior surface of body 10 is axial compression zone 13.

Compression Grooves 12A, 12B, 12C, and Axial Compression Zone 13

Positioned at some location on the outer surface of body 10 between head 50 and distal end 10.1, is compression groove 12A. Compression groove 12A completely encircles body 50 and has significant width and depth. Groove 12A is wide enough and deep enough and configured such that if body 10 is subjected to sufficient axial compressive force, groove 12A will allow body 10 to plastically deform in the vicinity of groove 12A in a manner which axially shortens body 10.

Close to groove, 12A and located some small distance farther from head 50, is groove 12B. Groove 12B is dimensioned and configured in the same manner as groove 12A. Close to groove 12B and located some small distance farther from head 50 than groove 12B is groove 12C. Groove 12C is dimensioned and configured in the same manner as both groove 12A and groove 12B.

Grooves 12A, 12B, and 12C, form a region of body 10 that is more easily plastically deformable in a manner which reduces the axial dimensions of, or shortens the overall length of, body 10, than the portions of body 10 which do not have grooves. This more easily axially deformable region is designated axial compression zone 13.

Compression zone 13 is configured by virtue of the width and depth of the individual grooves 12A, B, and C, to be able to be axially compressed, when subjected to sufficient axial compression, to an extent which is at least somewhat greater than the axial distance that head 50 can be plastically deformed, and can be a much greater extent, if desired.

One purpose of axial compression zone 13 is to allow body 10 to axially compress in cooperation with deformable head 50 when a predetermined amount of axial force or pressure is applied during actuation of the anchor structure, so that head 50 can deform in a manner which causes head 50 to press inner surface 52 of head 50 towards and subsequently against an article positioned between inner surface 52 and the outer surface of the material of a bore. Another purpose of axial compression zone 13 is to allow head 50 to press against an article and in the event the article can be pushed some distance towards the material of the bore, to enable head 50 to do so, by zone 13 axially compressing and allowing head 50 to press the article towards, or into closer or stronger contact with, the surface of the material of the bore.

In the event that a relatively large amount of axial compression is desired, for instance, if the anchor structure is intended to be utilized to attach a flexible and/or somewhat compressible member to an uneven surface, as may be the case with attaching wood furring strips to a masonry wall, the three grooved compression zone 13 might well be extended by the addition of more grooves, or grooves 12A, B, and C, could be configured to allow body 10 to be axially compressed to a greater extent.

Axial compression grooves 12A, B, and C of compressible region 13 are only one method that could be utilized to allow a portion of body 10 to axially compress in a manner which reduces the overall axial dimension of body 10. In another embodiment axially compressible grooves 12A, B, and C of compressible zone 13 might be replaced with an accordion-like or bellows-like construct that would allow a portion of body 10 to be axially shortened or compressed in a manner similar to the axial compression facilitated by compression grooves 12A, B, and C. Alternately, in another embodiment, body 10 could be provided with means to be shortened in its axial dimension when subjected to an appropriate amount of axial compressive force, by reducing the radial thickness of the walls of body 10, or a portion of the walls of body 10, to an extent that would allow body 10 to be axially crushed or caused to collapse in a manner which would result in a reduction of the axial dimension of body 10 without deleteriously effecting the operation or application of the anchor structure to any significant extent.

Bidirectionally Deflectable and Triply Articulable Fingers 19A and 19B

Formed to or otherwise integrally attached to body 10 at distal end 10.1 are bidirectionally deflectable and triply articulable fingers 19A and 19B. Fingers 19A & B are practically identical to one another and are situated upon distal end 10.1 so as to be diametrically opposed to one another.

Fingers 19A & B, each have an outer surface, 25A and 25B, respectively, an end surface, 22A and 22B, respectively, an inner surface 24A and 24B, respectively, and each finger has two edge surfaces 19.1A and 19.1B.

Outer surfaces 25A & B of fingers 19A & B, respectively, have untapered portions which extend away from body 10 for a distance and then begin to taper inward and continue to extend while tapering to join with end surfaces 22A & B respectively.

Edge surfaces 19.1A & B are planar surfaces which extend axially from distal end 10.1 of body 10 to end surfaces 22A & B, and extend radially from outer surfaces 25A & B to inner surfaces 24A & B. The junctures of edge surfaces 19.1A & B with inner surfaces 24A & B are designated junctures 24.2A and 24.2B.

The length of the untapered portions of outer surfaces 25A & B is configured in conjunction with the length of the tapered portions of outer surfaces 25A & B in such a manner as to ensure that some portions of the untapered portions of outer surfaces 25A & B, in close proximity to second articulation grooves 23A & B of fingers 19A & B, respectively, when deflected outwardly will come into significant or substantial contact with the wall of a bore in which fingers 19A & B are actuated before any other portions of outer surfaces 25A & B do so.

Because the tapered portions of fingers 19A & B are exterior portions, fingers 19A & B have a highly focused and directional application of outwardly directed force, much the same as the fingers of the anchor component of the preferred embodiment.

First and Second Articulation Grooves 21A & B and 23A & B

At the locations that fingers 19A & B join body 10 at distal end 10.1 are first articulation grooves 21A and 21B. Grooves 21A & B are generally semi-circular in axial cross-section and encircle fingers 19A & B respectively. First articulation grooves 21A & B are areas formed, configured, and positioned in such a manner in relation to fingers 19A & B as to enable fingers 19A & B to articulate outward at these locations by the application of a reduced amount of outwardly directed force as opposed to the amount of outwardly directed force that would be necessary to cause fingers 19A & B to articulate outward without said grooves.

Additionally grooves 21A & B may be configured to limit or reduce or prevent any unwanted distortion of fingers 19A & B during their outward articulation at grooves 21A & B, and to localize any distortion which may be necessary or unavoidable.

Located around fingers 19A & B, at the locations at which they begin to taper from their greatest outer diameter are second articulation grooves 23A and 23B. As in the case of first grooves 21A & B these grooves are configured to facilitate the outward articulation of fingers 19A & B and to localize any distortion of fingers 19A & B associated with their outward articulation.

Articulation grooves 21A & B and articulation grooves 23A & B are configured in relation to each other and to fingers 19A & B in such a manner that, when deflected outward, fingers 19A & B will articulate first at or very near to first articulation grooves 21A & 21B and then, due to continued outward deflection and the engagement of portions of fingers 19A & B with the wall of a bore, fingers 19A & B will articulate outward a second time at or very near to second articulation grooves 23A & B.

Inward Deflection Grooves 27A and 27B

Inward deflection grooves 27A & B constitute a means to augment or increase the amount of inward deflection of the end portions of fingers 19A & B which is caused by the mechanism of localized reduction of radial cross section. To accomplish this, grooves 27A & B cooperate with said inward deflection mechanism by causing or allowing portions of outer surfaces 25A & B of said fingers, to be deformed or crushed in a manner which reduces the radial dimensions of the radial cross sectional areas of portions of fingers 19A & B by application of a reduced amount of outwardly directed force.

Phalanxes of inward deflection grooves 27A and 27B are axially positioned and situated on the tapered portions of outer surfaces 25A & B of said fingers, beginning near to finger end surfaces 22A & B and extending axially to near to articulation grooves 23A & B.

Each inward deflection groove 27A or B is shaped such that it is somewhat narrower in circumferential dimension at the end that is adjacent to end surface 22A or B, respectively, and somewhat wider in circumferential dimension at the end that is adjacent to articulation groove 23A or B, respectively, so that each groove 27A or B progressively and evenly tapers from one end to the other end. The amount of taper of each groove 27A or B is configured such that when grooves 27A & B are arranged in a close set manner so as to form a battery of grooves upon outer surfaces 25A & B, respectively, the edges or sides of one groove 27A or B are generally parallel with edges or sides of the groove 27A or B next to it. Additionally grooves 27A & B are set close or very close together so that the portions of outer surfaces 25A & B between grooves 27A & B, respectively, are quite narrow in circumferential dimension and often are narrower than deflection grooves 27A & B.

The relative dimensions and proportions of deflection grooves 27A & B, and the relative dimensions and proportions of the portions of outer surfaces 25A & B located between grooves 27A & B, generally depends upon a number of factors which may include the mechanical characteristics of the material used to form the fingers on which they are placed, the design of the fingers themselves, the amount of outwardly directed force the anchor structure is configured to produce, the intended material of the bore with which the fingers will be coupled, and the type, material, mechanical characteristics, shape, and mode of interaction of the anvil which will be utilized in conjunction with the fingers.

One important design factor in the formation of articulation grooves 27A & B in addition to the shape of said grooves, which of course determines the shapes of the portions of outer surfaces 25A & B located between said grooves, are the circumferential dimensions of the portions of outer surfaces 25A & B which are between said grooves. When grooves 27A & B are applied to outer surfaces 25A & B, in effect portions of said outer surface are removed, so that only portions of the original outer surface which could contact the wall of a bore remain, so when said surface is deflected outward into contact with said wall, only portions of the portions which could have contacted the wall of a bore actually contact said wall.

As a result, because the amount of outwardly directed force applied to said portions of the portions of outer surfaces 25A & B which could have contacted said wall, a is a certain predetermined amount and is unchanged by configuring fingers 19A & B with inward deflection grooves 27A & B, all the outward force that is applied to said wall is applied by a reduced amount of said outer surfaces, (the portions between said grooves of the portions of said outer surfaces which could contact said wall) with the result that the portions of said outer surfaces which do contact said wall, contact said wall with a correspondingly increased amount of force. As the application of the outward force is reciprocal in nature, the portions of said outer surfaces which do contact said wall are themselves subjected to a correspondingly increased amount of force, with the result that said portions of said outer surfaces can be plastically and/or elastically deformed, or crushed, by the application of the certain predetermined amount of force, whereas application of the same predetermined amount of force to outer surfaces 25A & which have not been configured with inward deflection grooves 27A & B would not result in any plastic and/or elastic deformation, or crushing of said outer surface.

When the portions of outer surfaces 25A & B between inward deflection grooves 27A & B which contact the wall of a bore are plastically and/or elastically deformed, or crushed, the radial dimensions of the radial cross-sectional areas, that is to say thickness, of these crushed portions is reduced. When the radial dimensions of the radial cross-sectional areas, or thickness of said areas is reduced, the portions said outer surfaces directly adjacent to the crushed portions, but not themselves crushed or not crushed as much, push upon the wall of the bore in such manners as to cause the end portions of fingers 19A & B to be deflected away from said wall.

Upon consideration of the specific aforementioned arraignment of said grooves upon said outer surfaces, it is evident that the resulting portions of said outer surfaces between said grooves have the same circumferential dimension over substantially the entirety of their axial dimensions. As a result, when said portions of said outer surfaces are deflected outward and the portions of said portions which can contact the wall of a bore, do contact said wall, the circumferential dimensions of the portions contacting said wall will be substantially the same when measured at any radial cross section over the entirety of the axial dimensions of the portions of said outer surfaces located between said grooves.

As a result, the amount of force necessary to cause any portions of outer surfaces 25A & B located between inward deflection grooves 27A & B to be plastically and/or elastically deformed is substantially the same amount of force, regardless of where the portions are located along the axial dimensions of the portions of said outer surfaces located between said grooves.

In other words, the configurations of outer surfaces 25A & B with inward deflection grooves 27A & B determine the specific amount of force necessary to crush the portions of said outer surfaces located between said grooves, and also determine that that same amount of force will crush said portions of the outer surfaces wherever said portions are located.

Thus when anvil 42 applies force to fingers 19A & B in a manner which deflects outer surfaces 25A & B against the wall of a bore, as anvil 42 is drawn between said fingers, the amount of force necessary to cause the portions of inward deflection grooves 27A & B in close proximity to anvil 42 to be crushed will be the same amount of force wherever anvil applies said force to said grooves.

For clarity, consider an alternate embodiment in which the circumferential dimensions of inward deflection grooves 27A & B and the circumferential dimensions of the portions of outer surfaces 25A & B defined by said grooves, are reversed, so that instead of said grooves being axially tapered, the portions of said outer surfaces between said grooves are axially tapered. Because the circumferential dimensions of the portions of said outer surfaces located between said grooves steadily and progressively increase from one end to the other, the amount of force necessary to crush the portions of increasing circumferential dimensions would increase commensurately.

It is of note that inward deflection grooves which are positioned in other than an axial manner could be utilized in place of grooves 19A & B. Grooves positioned radially or helically would function similarly as would combinations of axial and radial grooves, which if applied in combination to outer surfaces 25A & B would result in the portions of outer surfaces 25A & B between the combined radial and axial grooves forming a checkered pattern somewhat similar to chessboard or a checkerboard.

One significant reason that one might apply inward deflection grooves to outer surfaces 25A & B in various different orientations and/or patterns is that different patterns or arraignments of grooves result in different bore engagement characteristics, that is to say the nature and extent of the engagement, and the specific bore engagement characteristics resulting from one particular pattern may be more advantageously applied to one anchor structure configured in one particular manner for a particular purpose while another pattern, resulting in different specific bore engagement characteristics may be more advantageously applied to another anchor structure configured in another particular manner for a different particular purpose.

For instance, if an embodiment of the anchor structure of the present invention where to have a threadedly attached separable head or other threadedly attached portion, as do some embodiments yet to be disclosed, the axial orientation of deflection grooves 27A & B may be a preferable orientation. This is due to the fact that the axial engagement of the portions of outer surfaces 25A & B located between articulation grooves 27A & B, respectively, is such that it will tend to prevent fingers 19A & B from being turned or rotated within a bore, after actuation, when the threadedly attached portion is rotated or turned. In contrast, radially positioned inward deflection grooves may be preferred when applied to an anchor structure which has an integrally formed nondeformable head or an integrally formed deformable head; whereas a combination of radially and axially positioned grooves might be utilized with a general purpose anchor structure.

Deflection grooves 27A & B can also contribute to the bore engagement characteristics of bore gripping fingers 19A & B in another way. The fact that grooves 27A & B, in effect, render outer surfaces 25A & B of said fingers, more pliable or more easily deformed, by applying more outward force to smaller portions of said outer surfaces, can cause the portions which are deformed against the wall of a bore to be deformed or crushed to a greater extent so that the crushed portions conform to the wall and to any irregularities of said wall more thoroughly or intimately, and thus can significantly increases the bore gripping abilities of fingers 19A & B by increasing the coefficient of friction of said portions of the fingers and the material of the bore.

Body 10 with axial compression zone 13, plastically deformable head 50, and bidirectionally deflectable fingers 19A & B with outward articulation grooves 21A & B and 23A & B and inward deflection grooves 27A & B comprise the anchor component of the present embodiment.

Actuator Stem 30, Actuator Head 31, and Notch 32

Actuation stem 30, notch 32 and upset portion 34 are identical to their respective counter parts in the preferred embodiment. In the present embodiment stem 30 is integrally formed with a radially enlarged head, head 31, instead of a force applying portion. Actuator head 31 is a radially enlarged knob or disk or such, that is configured to engage anvil 42 when pulled by stem 30 in the direction out of a bore, in a manner which will transfer any tensional force imposed upon head 31 by actuator stem 30 to anvil 42.

Though spoken of here as individual components is important to note that stem 30 and head 31 are integrally connected, and in fact are often manufactured from a single piece of suitable material by a process such as cold heading or cold forging.

Upset Portion 34

Upset portion 34 is identical to its counter part in the preferred embodiment, however the function of upset portion 34 which is to prevent stem 30 from sliding inappropriately as a result of any incidental handling of the anchor structure after the intentional insertion of stem 30 into the lumen of body 10, might be effected by other means if desired.

One alternate method to restrict stem 30 from sliding back or forth too easily would be to reduce the inner diameter of some portion of the lumen of body 10 in such a manner as to lightly engage stem 30 in an interference fit. Another alternate method would be to apply a slight axial bend or kink or distortion to stem 30 that would result in stem 30 binding or rubbing slightly against the lumen of body 10 when inserted therein.

Pierced Anvil 42

Pierced anvil 42 has a frustum shaped exterior surface and a regular or untapered bore equal to or somewhat greater in diameter than the internal diameter of body 10. The outer diameter of the smaller end of anvil 42 is smaller than the outer radial dimensions of finger end surfaces 22A & B. The larger end of anvil 42 is dimensioned such that when anvil 42 is positioned between fingers 19A & B, at or near to finger end surfaces 22A & B, so as to be in contact with junctures 24.1A & B of fingers 19A & B, respectively, the combined radial dimensions of anvil 42 and fingers 19A & B will be equal to or somewhat greater than the outer diameter of body 10.

The length of anvil 42 is determined by and configured in relation to the radial dimensions of the smaller end of anvil 42 and the larger end of anvil 42, to result in the cone angle of frustum shaped anvil 42, being at least somewhat larger than the combined values of the angles of outer surfaces 25A & B in relation to inner surfaces 24A & B of fingers 19A & B, respectively. Anvil 42 is substantially rigid body, that is to say it is not configured in composition or design to exhibit substantially elastic or plastic properties.

When actuator stem 30 with integral head 31, notch 32 and upset portion 34 are assembled together with pierced anvil 42, the complete assembly comprises the actuator device of the present embodiment. Actuator stem 30 transfers tensional force from the pulling portion of a blind rivet installation tool to head 31, which in turn transfer the tensional force to anvil 42 which in turn applies the force to fingers 19A & B.

The separable nature of the actuator device of the present embodiment opens up a wide variety of applications. Separable anvils and actuator stems make it possible to utilize anvils composed of one material with actuator stems composed of another material, if so desired. The ramifications of being able to combine materials of similar, different or widely differing mechanical, chemical, electrical, thermal or other properties, by making an anvil of one material and then actuating that anvil by use of an actuator stem made of a different material, or the same material which may or may not have been modified by hardening or softening or other treatment or treatments to reduce or enhance a particular quality or qualities, are very profound and far reaching as will be made clearer in subsequent embodiments of the present invention. Actuator devices comprised of separable components allows for the application of, or utilization of, combinations of mechanical and physical properties that otherwise the characteristics of which would be extremely difficult, if not practically impossible, to duplicate with an integrally formed, or monolithic actuator device.

Furthermore, after the actuation of the anchor structure of the present embodiment is completed, the pierced nature of anvil 42 results in anvil 42 being difficult to intentionally dislodge from between fingers 19A & B. This is a very desirable feature to incorporate in anchor structures which may be utilized for the attachment of security bars, or other security devices, to doors and windows and such, in masonry structures. This feature will be disclosed in further detail in the operational description of this embodiment.

Description of Operation of a First Alternate Embodiment

The following description of operation makes reference to FIG. 2.2 through FIG. 2.9 all of which, with the exception of FIG. 2.4B, are axial cross-sectional views of the anchor structure of the present embodiment. FIG. 2.4B is a radial cross-sectional view, which depicts details of the anchor structure at the same interval depicted in FIG. 2.4A. Note that in axial cross-sectional views, lines which would represent edge surfaces 19.1A & B of fingers 19A & B, respectively, have been omitted as they would be occluded by lines representing junctures 24.2A & B of fingers 19A & B. For clarification of the relative positions of edge surfaces 19.1A & B please reference FIG. 2.4B if necessary.

FIG. 2.2

In FIG. 2.2 it is depicted that the anchor structure of the present embodiment has been inserted through an aperture in an article, article 4, and into a bore, bore 1, which is in a solid material, material 2, which has an outer surface 3, outer surface 3. The pushing portion of a rivet installation tool, pushing portion 5, is held firmly against proximal end surface 11 of body 10 which in turn pushes inner surface 52 of head 50 against article 4 which is in turn pressed against surface 3. Actuator stem 30 is engaged by the pulling portion, pulling portion 6, of the same rivet installation tool. The anchor structure of the present embodiment is ready to be actuated, and thus coupled with bore 1.

Note that the amount of force or pressure with which article 4 is being pressed to surface 3 by head 50 is whatever amount that is being applied to position and hold the blind rivet installation tool in place prior to actuation of the anchor structure. This is in contrast to the predetermined amount of force which will be applied to hold article 4 in place as a result of the actuation process.

FIG. 2.3

FIG. 2.3 shows the first stage of the actuation process. Pushing portion 5 of a rivet installation tool pushes proximal end 11 in the direction indicated by arrow 5A, while pulling portion 6 pulls stem 30 in the direction out of bore 1, as indicated by arrow 6A. The amount of force applied is sufficient to overcome the resistance of upset portion 34, which is lightly engaged with the lumen of body 10. Stem 30 pulls on actuator head 31, which in turn pushes anvil 42 in the direction out of bore 1. As anvil 42 is pushed in the direction out of bore 1, the smaller diameter end of anvil 42 is pushed against the sloped or angled end surfaces 22A & B of bidirectionally deflectable and triply articulable fingers 19A & B, respectively. Because the sloped end surfaces 22A & B of fingers 19A & B, respectively are shaped and configured appropriately, the force exerted against them by anvil 42 causes end surfaces 22A & B and fingers 19A & B to be deflected out toward the wall of bore 1. Fingers 19A & B being substantially identical and acted upon equally by anvil 42 are deflected outward simultaneously and in opposite directions. Furthermore, they are deflected outward at a first relatively rapid rate, and in directions which are substantially perpendicular to the direction in which said fingers were moved to be inserted into bore 1.

As fingers 19A & B are deflected apart, they articulate outward at or very near to first articulation grooves 21A & B. As anvil 42 continues to press against finger end surfaces 22A & B, fingers 19A & B continue to be deflected outward and continue to articulate outward at grooves 21A & B, until some portions of the untapered portions of outer surfaces 25A & B at or very closely adjacent to second articulation grooves 23A & B come into significant contact with the wall of bore 1, at which point fingers 19A & B can no longer articulate outward at grooves 21A & B.

FIG. 2.4A and FIG. 2.4B

In FIG. 2.4A anvil 42 has been pushed against end surfaces 22A & B with a sufficiency of force to cause end surfaces 22A & B to be deflected farther outward towards the wall of bore 1. As some portions of the untapered portions of outer surfaces 25A & B in close proximity to second articulation grooves 23A & B are already in contact with the wall of bore 1, fingers 19A & B are forced to articulate outward at second articulation grooves 23A & B. While fingers 19A & B articulate outward at grooves 23A & B, end surfaces 22A & B are deflected outward a sufficient distance to allow anvil 42 to be drawn between them and in between junctures 24.2A & B of fingers 19A & B, respectively.

FIG. 2.4B, a radial cross section, depicts the relative positions of the pertinent portions of fingers 19A & B and anvil 42 as just described. When anvil 42 passes in between fingers 19A & B and contacts and begins to interact with junctures 24.2A & B, respectively, the outward deflection of fingers 19A & B continues at a less rapid rate of deflection.

FIG. 2.5

In FIG. 2.5 it is depicted that anvil 42 has been pushed some distance farther, between junctures 24.2A & B of fingers 19A & B respectively, by actuator head 31, which has been pulled by actuator stem 30, which has been pulled by pulling portion 6 of the rivet installation tool. As anvil 42 was pushed between junctures 24.2A & B, fingers 19A & B were deflected outward, continuing to articulate outward at second articulation grooves 23A & B, with the result that portions of the tapered portions of outer surfaces 25A & B, including portions of inward deflection grooves 27A & B, have been driven outward and into contact with the wall of bore 1. The portions of the tapered portions of outer surfaces 25A & B which contact the wall of bore 1 are the portions which are generally equidistant from edge surfaces 19.1A &B. At this time, fingers 19A & B have been deflected outward as far as they can be.

It can now be seen that a tapered, wedge-like channel or passage has been formed between juncture 24.2 A and juncture 24.2B and also between inner surface 24A and inner surface 24B, of fingers 19A & B, respectively, with anvil 42 between the two sides of the wedge. The value or size of the wedge angle, that is to say the angle between junctures 24.2A and juncture 24.2B, or the angle between inner surface 24A and inner surface 24B, is the same as the value of the angle that previously existed between outer surface 25A and outer surface 25B, before the outward deflection of fingers 19A & B.

It is of note that in the case of triply articulable fingers 19A & B, the wedge angle, is established or fixed or set at its final value. This is in contrast to the wedge angle of doubly articulated fingers, such as fingers 20A & B of the anchor component of the preferred embodiment, which continues to increase to an extent, throughout the majority of the actuation process as fingers 20A & B continue to be deflected and pressed outward until the final stages of the actuation process.

The fixed nature of the wedge angle of the anchor component of the present embodiment, which is independent of the actual diameter of the bore in which the anchor structure is actuated, as long as the diameter of the bore is within the normal diametral range of bores expected for a bore which is drilled in a masonry material, has two major results. Firstly, it allows anchor structures of the present embodiment to produce a precise amount of outwardly directed force, regardless of variations in bore diameter. Secondly, it allows anchor structures of the present embodiment to produce a maximum amount of outwardly directed force regardless of variations in bore diameter.

Also of note at this stage is that the inward deflection mechanism caused by localized radial deformation begins to act upon fingers 19A & B. Now that fingers 19A & B have been deflected outward and caused to articulate outward twice in a manner which has forced the portions of the tapered portions of outer surfaces 25A & B which are generally equidistant from edge surfaces 19.1A & B into contact with the wall of bore 1, the increasing outwardly directed force generated by the interaction of anvil 42 with junctures 24.2A & B begins to drive the portions of junctures 24.2A & B in close proximity to anvil 42 outward toward the wall of bore 1, bending them outward and plastically deforming them. As the portions of junctures 24.2A & B in close proximity to anvil 42 are bent and deformed outward, the end portions of fingers 19A & B located between end surfaces 22A & B, respectively, and anvil 42 are caused to begin to deflect inward while they are caused to articulate close to and behind anvil 42.

It is of import to note that, unlike the preferred embodiment, the anchor structure of the present embodiment does not undergo inward deflection due to the beam deformation mechanism due to the fact that the doubly articulated outward deflection process has positioned the bidirectionally deflectable portions of fingers 19A & B in direct contact with the wall of bore 1.

FIG. 2.6

In FIG. 2.6, as anvil 42 continues to be driven farther between fingers 19A & B and into the tapered wedge-like passage formed by junctures 24.2A & B by the continued urging of actuator head 31, the outwardly directed pressure continues to increase, in accordance with wedge mechanics, continuing to press junctures 24.2A & B of fingers 19A & B, respectively, outward, which in turn press the tapered portions of outer surfaces 25A & B, including inward articulation grooves 27A & B, of fingers 19A & B, respectively, more forcefully against the wall of bore 1.

The increasing force exerted between anvil 42 and junctures 24.2A & B continues to cause the inward deflection of the end portions of fingers 19A & B due to radial deformation of the portions of said fingers in close proximity to or in contact with said anvil 42, and junctures 24.2A & B continue to be deformed outwardly until at some point anvil 42 contacts and comes to bear upon inner surfaces 24A & B of fingers 19A & B, respectively, in addition to bearing upon junctures 24.2A & B of fingers 19A & B, respectively.

As the force generated by the interaction of anvil 42 with the tapered wedge-like passage, now comprised of both junctures 24.2A & B and inner surfaces 24A & B, is now applied directly to said inner surfaces, the outward force generated and applied to and through fingers 19A & B to the wall of bore 1 by way of outer surfaces 25A & B, begins to mount more quickly.

At about this time the amount of force generated by the interaction of anvil 42 with the wedge-like positioned inner surfaces 24A & B and junctures 24.2A & B of fingers 19A & B, respectively, reached a sufficiency to cause inward deflection of the end portions of fingers 19A & B by the mechanism of localized reduction of radial cross-sectional areas.

When the predetermined amount of outwardly directed force necessary to crush the portions of outer surfaces 25A & B located between inward deflection grooves 27A & B, and which were in contact with the wall of bore 1, and which were in close proximity to anvil 42, was applied to said portions, said portions began to be plastically deformed or crushed so that the radial dimensions of the radial cross-sectional areas of these portions where reduced, while other portions directly adjacent to the crushed portions but not themselves crushed, or not crushed as much, pushed upon the wall of bore 1 in a manner which caused the end portions of fingers 19A & B to deflect inward and articulate close to and behind anvil 42.

Furthermore, the actual amount of the portions of outer surfaces 25A & B which where in contact with the wall of bore 1, was a reduced amount, as a result of said outer surfaces being configured with inward deflection grooves 27A & B, and so the predetermined amount of force necessary to deform the smaller amount of outer surfaces 25A & B was a commensurately smaller amount, then would be necessary to deform larger amounts of said outer surfaces in a like manner.

Additionally, as the specific configuration of inward deflection grooves 27A & B determines that all the portions of outer surfaces 25A & B located between said grooves can be crushed by application of the same specific amount of force, because anvil 42 is already applying a sufficient amount of force to crush said portions, and as anvil 42 is drawn farther between fingers 19A & B, an increasing amount of outwardly directed force is applied to said outer surfaces, the portions of said outer surfaces which are crushed are crushed to a greater extent than if the same amount of force was applied to fingers which were not configured with said grooves, with the result that the end portions of fingers 19A & B located between end surfaces 22A & B and anvil 42 are caused to deflect inward to a significantly greater extent than if said fingers were not configured with inward deflection grooves 27A & B.

FIG. 2.7

In FIG. 2.7, it is depicted that stem 30 has continued to exert a strong tensional force on actuator head 31, due to continued pulling of actuator stem 30 by pulling portion 6 of the rivet tool, while pushing portion 5 of the rivet tool has continued to push on distal end surface 11 of body 10.

Actuator head 31 continues to push hard on anvil 42, the outer diameter of which is in contact with both junctures 24.2A & B and inner surfaces 24A & B of fingers 19A & B, respectively. Anvil 42 has been driven farther into the tapered wedge-like passage between fingers 19A & B which is pressing portions of outer surfaces 25A & B and inward articulation grooves 27A & B, outward forcefully against the wall of bore 1.

The inward deflection and articulation of the end portions of fingers 19A & B continues, caused by both the localized radial deformation mechanism and the localized reduction of radial cross-sectional area mechanism. Additionally, as the outwardly directed force exerted by anvil 42 upon fingers 19A & B is driving or pressing said fingers against the wall of bore 1 with a large amount of force, as said anvil is drawn a little farther in between fingers 19A & B the inward deflection and articulation of the end portions of fingers 19A & B is contributed to by the shear force inward deflection mechanism.

As depicted, the combined inward deflection mechanisms have deflected and articulated inner surfaces 24A & B and junctures 24.1A & B of the end portions of fingers 19A & B located between end surfaces 22A & B and anvil 42 inward a sufficient amount to engage the outer diameter of anvil 42 in a manner which prevents it from moving in the direction back into bore 1.

Finally anvil 42 becomes jammed or lodged firmly between fingers 19A & B and can not move any farther in the direction out of bore 1, and because the inwardly deflected and articulated end portions of fingers 19A & B prevent anvil 42 from moving in the direction back into bore 1, anvil 42 is effectively retained in its present position, that is to say that anvil 42 is essentially locked between the outwardly and then inwardly deflected and articulated portions of fingers 19A & B.

FIG. 2.8

In FIG. 2.8 the force applied to stem 30 by pulling portion 6 of rivet tool continues to increase as pushing portion 5 of rivet tool continues to apply pressure to distal end 11, until the predetermined amount of pressure necessary to cause compression zone 13 to deform and allow body 10 to be shortened, or plastically compressed, and simultaneously deform head 50 is achieved. When a sufficiency of force is applied to end surface 11 of body 10 and compression zone 13 begins to compress, inner surface 52 of head 50 begins to push harder upon article 4, at which time any distance, that is to say slack if you will, that may be between article 4 and surface 3 is reduced or eliminated by the increasing pressure. As head 50 continues to flatten or deform against article 4, compression grooves 12A, B, and C allow their associated portions of body 10 to axially plastically compress in a manner which allows compression zone 13 to continue to be compressed a sufficient amount to allow head 50 to flatten to its maximum extent possible, and if necessary zone 13 is compressed somewhat more, either because of some distance that article 4 may have moved toward surface 3 due to the increased pressure upon it, or because article 4 itself may become compressed somewhat due to increased pressure upon it, or both.

Additionally as head 50 and compression zone 13 have been plastically deformed by application of a predetermined amount of axially directed force; inner surface 51 of head 50 will continue to press against article 4 with a certain amount of predetermined of force even after the force applied to head 50 by pushing portion 5 of the rivet tool is removed.

FIG. 2.9

In FIG. 2.9 the anchor structure of the present embodiment is depicted coupled with bore 1 after the final stage of actuation is completed. During the interval between FIGS. 2.8 and 2.9, the tensional force applied to stem 30 and the pushing force applied to distal surface 11 and portions of outer surface 51 of head 50 continued to increase until the predetermined amount necessary to break stem 30 at notch 32 was exceeded, and stem 30 has broken leaving anvil 42 lodged or jammed between fingers 19A & B and actuator head 31 inside the inwardly articulated portions of said fingers. The spent portion of actuator stem 30 has been removed along with portions 5 & 6 of the rivet installation tool, leaving the anchor structure of the present embodiment solidly coupled with the wall of bore 1 by bidirectionally deflectable and triply articulable fingers 19A & B.

Fingers 19A & B have been deflected outward and caused to articulate a first time at articulation grooves 21A & B and then a second time at articulation grooves 23A & B. During the forceful outward deflection of fingers 19A & B, the end portions of said fingers located between end surfaces 22A & B, respectively, and anvil 42, have been inwardly deflected and caused to articulate behind anvil 42 by the application of three distinct inward deflection mechanisms, namely localized radial deformation, localized reduction of radial cross-sectional areas, and shearing force, to such an extent that the inwardly deflected portions of junctures 24.2A & B and inner surfaces 24A & B of fingers 19A & B, respectively, are engaged with anvil 42 in such a manner as to prevent anvil 42 from moving in the direction back into bore 1, thus effectively holding or locking anvil 42 in place.

Furthermore, as a result of inward deflection grooves 27A & B, the end portions of fingers 19A & B which have been deflected inward, have been deflected inward to a greater extent, and by application of a lower amount of force and at an earlier time, than if outer surfaces 25A & B of fingers 19A & B had not been configured with inward deflection grooves 27A & B.

In addition the configuration of said outer surfaces with said grooves, has altered the bore engagement characteristics of said outer surfaces by allowing the portions of said outer surfaces located between said deflection grooves to be acted upon in such a manner that said portions have been deformed into more intimate contact with the wall of bore 1, which increases the amount of friction between said outer surfaces and said wall, which in turn increases the amount of force necessary to pull finger 19A & B out of said bore.

Axially plastically deformable head 50 has been deformed toward surface 3 and is forcefully holding object 4 to surface 3, while compression zone 13 of body 10 has been compressed a sufficient amount to allow inner surface 51 of head 50 to deform to its maximum extent, plus zone 13 has compressed an indeterminate additional amount to allow for a distance that object 4 might have moved in the direction toward surface 3, or an amount that article 4 may have compressed, or both.

It is notable at this point that pierced anvil 42 of the anchor structure of the present embodiment is not as easy to remove as anvil 40 of the anchor structure of the preferred embodiment.

Whereas anvil 40 of the preferred embodiment could be easily removed by driving it out from between fingers 20A & B by use of a stiff wire of appropriate dimensions or even the spent portion of an actuator stem 30 of the same anchor structure, anvil 42 of the present embodiment is more difficult to dislodge because a wire or rod inserted into the inner diameter of body 10 will pass through the bore which pierces anvil 42 with little or no effect upon said anvil.

Being difficult to remove is an auspicious characteristic to incorporate in an anchor structure intended to be utilized in the installation of security bars or such, over windows and doors in masonry walls or other applications in which anchors which are difficult to remove or are tamper resistant would be a benefit.

Furthermore, the nature and extent of the deflection of bidirectionally deflectable fingers 19A & B, along with other significant characteristics of the anchor structure as a whole, have been demonstrated to have been determined by the specific configurations of said fingers and the actuator device comprised of separably assembled actuator stem 30 and anvil 42. Since the actuator device of the present embodiment acts upon and applies force to fingers 19A & B in a manner which is substantially the same as the manner in which the actuator device of the preferred embodiment acted upon and applied force to fingers 20A & B of that embodiment, the majority of the differences in the nature and extent of the deflection of fingers 19A & B as compared to fingers 20A & B, are due to changes in the configurations of the fingers themselves. However, it should be noted that in an alternate embodiment a differently configured actuator device could be utilized in conjunction with fingers 19A & B to cause the nature and extent of the deflections of said fingers to be different than the nature and extent of the deflections of said fingers when interacting with the actuator device of the present embodiment.

A few specific and particularly salient examples of the direct relationship between the configurations of said fingers and actuator device, and the nature and the extent of the deflection of said fingers follow. One example is the partially tapered outer surfaces of fingers 19A & B, as opposed to the completely tapered outer surfaces of fingers 20A & B of the preferred embodiment. This small difference causes a large change in the nature of the outward deflection of said fingers. As previously detailed, the double outward articulation of the fingers at predetermined locations results in a selective application of the inward deflection mechanisms, a reduced expenditure of available force applied to deform the fingers, an increase in the force available to couple the anchor structure with the bore, and also allows for much more precise predetermination of the amount of outwardly directed force applied to the wall of a bore.

Additionally, along with introducing inward deflection means in the form of inward deflection grooves 27A & B, the present embodiment has also demonstrated, in part by use of the same, some of the ways in which the nature and the extent of the engagement of the bidirectionally deflectable fingers of the present embodiment can be predetermined by the configuration of said fingers.

And in conclusion a second and final example is inward deflection grooves 27A & B. As a result of the addition of these inward deflection augmentation means to the tapered portions of outer surfaces 25A & B, the extent to which the end portions of fingers 19A & B have been deflected inward has been increased and/or has been caused to occur by application of a reduced amount out outwardly directed force or to occur at an earlier point in time, some combination of the forgoing.

Detailed Description of a Second Alternate Embodiment

The following is a detailed description of an exemplary alternate embodiment which has internally and externally tapered bidirectionally deflectable and triply articulable bore gripping fingers, an actuator device with a separable elastically compressible force applying portion, separable article attachment means in the form of a threadedly attached head, and an alternate form of inward deflection augmentation means in the form of pliably coated inward deflection regions.

One object of the present embodiment is to demonstrate an anchor structure of the present invention which utilizes two of the four inward deflection mechanisms, along with bidirectionally deflectable fingers and an actuator device configured in manners so as to selectively apply said mechanisms, and the results of this particular configuration upon the nature and extent of the deflection of the fingers. One benefit which results from this configuration is that an increased amount of the force applied to actuate the anchor structure is utilized to couple the anchor structure with a bore.

The present embodiment also utilizes a different form or configuration of inward deflection means, which again not only contributes to the inward deflection mechanism of localized reduction of radial cross section, it also contributes to the predetermined nature and extent of the engagement of the bidirectionally deflectable fingers and the wall of a bore.

Additionally this embodiment stores an amount of force in an elastically compressible anvil which improves the anchor structures ability to remain substantially coupled with the wall of a bore in the event that the material of the bore were to crack or break in a non-catastrophic manner.

The following detailed disclosure makes reference to FIG. 3.0, a perspective view of the anchor structure of the present embodiment, FIG. 3.1A an axial cross section of the same, FIG. 3.1B, a perspective view of elastically compressible anvil 44, and FIG. 3.1C, a radial cross section of the location indicted in FIG. 3.1A.

Body 10.6 and Internally Threaded Portion 55

Body 10.6 is a hollow cylinder with a stepped bore, a proximal end surface 11, and a distal end 10.1. The portion of body 10.6 of larger inner diameter is adjacent to body end surface 11, is threaded internally and is designated internally threaded portion 55. The smaller inner diameter portion is a little larger than the outer diameter of stem 30.

Threaded portion 55 is configured in such a way as to cooperatively receive threaded shank 65 of threadedly attached head 60.

Head 60 and Threaded Shank 65

Head 60 is a radially enlarged disk or ring which has an integrally connected threaded shank 65. Shank 65 is dimensioned and configured to threadedly cooperate with internally threaded portion 55 of body 10.6. Head 60 and threaded shank 65 have an axially and concentrically located bore, designated bore 63, the diameter of which is such that upset portion 34 of stem 30 can pass through said bore either freely or by some amount of urging.

Head 60 has an inner radial surface 62 and an outer radial surface 61. Outer surface 61 of head 60 has a socket or recess 64, concentrically located so that bore 63 passes through the center of recess 64. Recess 64 is configured to accept the tip of a standard Phillips type screw driver in such a manner as to allow said driver to assist in rotating head 60, either clockwise or counter-clockwise, after the actuation of the anchor structure has been completed. Outer surface 61 of head 60 is the surface that the pushing portion of a blind rivet installation tool will press upon during the actuation of the present embodiment.

The specific configuration of head 60, with recess 64, so as to be engage-able by a Philips type screw driver is illustrative, furthermore, head 60 can be configured to be engaged by a number of appropriately configured tools.

Bidirectionally Deflectable and Triply Articulable Fingers 14A & B

Located at and integrally attached to distal end 10.1 of body 10.6 are bidirectionally deflectable and triply articulable fingers 14A and 14B.

Fingers 14A & B are primarily differentiated from fingers 19A & B of the first alternate embodiment, by the fact that fingers 14A & B are internally and externally tapered, whereas fingers 19A & B are not. Fingers 14A & B are practically identical in shape to each other and are situated upon distal end 10.1 so as to be diametrically opposed to one another.

Fingers 14A & B each have an outer surface, outer surfaces 25.1A and 25.1B, respectively, an end surface 22A & B, respectively, an inner surface 29A & B, respectively, and two edge surfaces 14.1A 7 B, and two junctures 29.1A & B.

Outer surfaces 25.1A & B originate at distal end 10.1 of body 10.6, and extend away from body 10.6 for some distance while maintaining the same circumferential dimensions as body 10.6, until at some distance outer surfaces 25.1A & B begin to taper inward. Outer surfaces 25.1A & B taper for some distance in the direction away from body 10.6 and then they terminate at finger end surfaces 22A and 22B, respectively.

The amount of taper of outer surfaces 25.1A & B is integral in the determination of the amount of outwardly directed bore griping force that the anchor structure will produce. In this embodiment the amount of taper or slope of outer surfaces 25.1A & B is minimized to the greatest extent possible while still insuring that when fingers 14A & B are deflected outward within a bore and are caused to articulate at first articulation grooves 21A & B, that some portions of the untapered portions of outer surfaces 25.1A & B, very near to or at second articulation grooves 23A & B will contact the wall of a bore in a manner which will allow the tapered portions of outer surfaces 25.1A & B of fingers 14A & B, respectively, to be farther deflected out toward the wall of the bore while articulating at or very near to second articulation grooves 23A & B.

Finger end surfaces 22A & B have been introduced in both previous embodiments, and are semicircular surfaces which slope or incline toward body 10.6 as they extend to and terminate at inner surfaces 29A & B. End surfaces 22A & B are configured to cooperate with anvil 44 to cause the initial and most rapid outward deflection of fingers 14A & B at the beginning of the actuation process. The inner semicircular edges of end surfaces 22A & B join to inner surfaces 29A and 29B, respectively.

Inner surfaces 29A &B of fingers 14A & B, respectively, are joined to end surfaces 22A & B, respectively, and taper inward as they extend in the direction toward body 10.6 for a distance approximately equal to the length of the tapered portions of outer surfaces 25.1A & B. At that point the radial dimensions of the tapered portions of inner surfaces 29A & B is equal to the radial dimensions of the smaller diameter bore of body 10.6, and maintaining those dimensions, they extend to terminate at distal end 10.1 of body 10.6.

Because portions of inner surfaces 29A & B and portions of outer surfaces 25.1A & B are tapered, to calculate or to configure the amount of outwardly directed force that anvil 44 will produce when interacting with fingers 14A & B, it is necessary to add the amounts of both the internal and external tapers together.

One characteristic which results from the tapered shape of inner surfaces 29A & B is that the radial profile of tapered inner surfaces 29A & B resembles or fits, if you will, outer surface 45 of elastically compressible anvil 44. That is to say that the tapered cone-like shape formed by tapered inner surfaces 29A & B is similar in shape and dimensions to the cone-like shape of outer surface 45 of anvil 44. Furthermore it is notable that the manner in which outer surface 45 of anvil 44 and inner surfaces 29A & B resemble one another, or fit together, applies to these members when anvil 44 is positioned between inner surfaces 29A & B near to end surfaces 22A & B and also when anvil 44 is drawn farther in between fingers 14A & B. That is to say, that the progressively diminishing cone-like shape of inner surfaces 29A & B, as they extend from end surfaces 22A & B, respectively, toward body 10.6, approximates the progressively diminishing cone-like shape of outer surface 45 of anvil 44, as anvil 44 is compressed by being driven between inner surfaces 29A & B during the actuation process. As a result, a significantly smaller amount of friction is generated between inner surfaces 29A & B and outer surface 45 of anvil 44 during the actuation process. This in turn results in a substantial reduction of the amount of available tensional force lost to friction and a corresponding reduction of the amount of inward deflection caused by the shearing force mechanism.

Edge surfaces 14.1A & B are planar surfaces which extend axially from the junctures of fingers 14A & B with body 10.6 at distal end 10.1, to finger end surfaces 22A & B. Planar edge surfaces 14.1A & B extend radially from outer surfaces 25.1A & B to inner surfaces 29A & B. The junctures of edge surfaces 14.1A & B and inner surfaces 29A & B are designated as junctures 29.1A and 29.1B.

These details are depicted in FIG. 3.1C, which is a radial cross-sectional view of the location indicated in FIG. 3.1A.

First Articulation Grooves 21A & B and, Second Articulation Grooves 23A & B

Located on outer surfaces 25.1A & B are first articulation grooves 21A & 21B and second articulation grooves 23A and 23B. Both said grooves 21A & B & 23A & B are positioned, configured and operate identically as their respective counter parts in the first alternate embodiment.

Pliably Coated Inward Deflection Regions 28A & 28B

Located on the tapered portions of outer surfaces 25.1A & B of fingers 14A & B, respectively, are pliably coated inward deflection regions 28A and 28B. Pliably coated inward deflection regions 28A & B are relatively thin coverings or coatings of some significant thickness which are permanently affixed to portions of the tapered portions of outer surfaces 25.1A & B. The thickness of said coatings may vary significantly, dependant upon many factors including the chemical and physical properties of coatings, the amount of augmentation of the inward deflection that is desired, and other factors such as the effects of the coatings upon the nature and extent of the engagement of said fingers with the wall of a bore, that is to say the bore engagement characteristics of said finger with said wall.

The coating or covering that comprise inward deflection regions 28A & B provide means to augment the amount of inward deflection of the end portions of fingers 14A & B caused by the inward deflection mechanism of localized reduction of radial cross section, by plastically and/or elastically deforming to a certain extent as a result of an application of less force than would be required to plastically and/or elastically deform fingers 14A & B themselves or outer surfaces 25.1A & B of said fingers, to the same extent.

While in fact, the more pliable coating or layer comprising regions 28A & B, may be made of any of a number of plastics and not just a material with plastic properties, it may also be comprised of metals that are more ductile or pliable than the material of which fingers 14A & B are composed. An example of this would be a coating or layer of aluminum, zinc, tin, or lead or another relatively soft and ductile metal or alloy affixed appropriately, possibly by vacuum or chemical deposition, or plating, to fingers made of mild steel. With this said, inward deflection regions 28A & B of the present embodiment are comprised of a polyurethane material.

In addition to contributing to the inward deflection of the end portions of fingers 14A & B due to the localized reduction of radial cross section mechanism during the actuation process, the application of the pliable layers or coatings which comprise inward deflection regions 28A & B can have the added benefit of improving the bore engagement characteristics of fingers 14A & B. Because the material or materials selected for application to form regions 28A & B are specifically selected because they are more pliable, or more ductile, than the material or materials which comprise fingers 14A & B, the portions of regions 28A & B which are pressed into forceful contact with the wall of a bore during the actuation process, not only deform more easily but also to a greater degree. That is to say, when the material of regions 28A & B deforms against the wall of a bore, it conforms to the surface and any irregularities of the surface of the wall of the bore more precisely, or in more detail, or more intimately, if you will. This can significantly increase the amount of friction between the wall of a bore and the portions of pliably coated regions 28A & B which are appressed to the wall, and thus substantially increase the amount of force that would be required to pull fingers 28A & B out of a bore.

In another alternate embodiment, the configurations of pliably coated inward deflection regions 28A & B could be configured to farther increase the extent of the engagement of said regions with the wall of a bore by adding particulate matter or grit, such grains as aluminum oxide sand, to the material comprising said regions in a manner which would further increase the amount of friction between said regions and the wall of a bore.

Body 10.6, head 60, shank 65, and fingers 14A & B with pliable regions 28A & B comprise the anchor component of the present embodiment.

Actuator Stem 30, Actuator Head 31, Notch 32, and Upset Portion 34

Actuator stem 30, actuator head 31, notch 32 and upset portion 34 are unchanged from their respective counterparts in the first alternate embodiment.

Elastically Compressible Anvil 44

As depicted in FIG. 3.1B, a perspective view of elastically compressible anvil 44, anvil 44 is generally shaped like a stubby truncated cone which is pierced through axially and has an axially positioned slot which extends from one end to the other end. Anvil 44 has an outer surface, 45, an inner surface, 46, a leading surface, 49, a trailing surface, 47, and two edge surfaces 48A & 48B.

Outer surface 45 of anvil 44 is generally shaped like a short truncated cone, while inner surface 46 is generally shaped like an untapered cylinder with an open slot extending from one end to the other end.

Leading surface 49 of anvil 44, is a generally ring shaped surface which joins perpendicularly with one end of inner surface 46 and extends outward radially and joins with outer surface 45 at an obtuse angle, while trailing surface 47 is a generally ring shaped surface which joins perpendicularly with the other end of inner surface 46 and extends outward radially and joins with outer surface 45 at an acute angle.

Edge surfaces 48A & B are planar surfaces which extend axially from leading surface 49 to trailing surface 47, and which extend radially from outer surface 45 to inner surface 46. Edge surface 48A and edge surface 48B form an axially oriented slot-shaped opening along one side of anvil 44.

Elastically compressible anvil 44 is made of a material which has a large degree of elasticity, such as tempered spring steel. That is to say that anvil 44 is substantially elastically deformable in both composition and design, as opposed to being substantially rigid.

Before anvil 44 is elastically compressed, there is a gap or distance between edge surface 48A and edge surface 48B. When anvil 44 is being elastically compressed, the gap between edge surfaces 48A & B is reduced. When anvil 44 is elastically compressed to the greatest practical extent, edge surfaces 48A & B are appressed together and there is no gap between them.

The inner dimensions of inner surface 46 of anvil 44 are such that when anvil 44 is elastically compressed to its maximum extent, stem 30 may pass through inner surface 46 freely.

The outer diameter of trailing end 47 of anvil 44, in its non-compressed state is configured such that when positioned between junctures 29.1A & B near to end surfaces 22A & B the largest radial dimension between outer surfaces 25.1A & B, near to end surfaces 22A & B, will be about the same as the outer diameter of body 10.6.

The axial dimension of anvil 44 is configured in relation to the outer diametral dimensions of leading surface 49 and trailing surface 47 in such a manner that the cone angle of frustum shaped outer surface 45 of anvil 44 is slightly greater than the combined values of the angles of the tapered portions of outer surfaces 25.1A & B in relation to the untapered portions of said outer surfaces, plus the angle of the tapered portions of inner surfaces 29A & B, in relation to the untapered portions of said inner surfaces. Furthermore, in addition to and in cooperation with the forgoing, anvil 44 and outer surface 45 of said anvil are generally shaped and configured to resemble the tapered passage formed between inner surfaces 29A & B of fingers 14A & B when said fingers are deflected outward into substantive contact with the wall of a bore.

Anvil 44 in combination with actuator stem 30, head 31, notch 32, and upset portion 34 comprise the actuator device of the present embodiment.

Detailed Operational Description of a Second Alternate Embodiment

The following detailed description of operation makes reference to FIG. 3.2 through FIG. 3.8, all of which are axial cross sections with the exception of FIG. 3.4B which is a radial cross section of the portions indicated in FIG. 3.4A. Note that in axial cross-sectional views that the line which would represent edge surfaces 14.1A & B of fingers 14A & B respectively, have been omitted, as they would be occluded by the lines representing junctures 29.1A & B of fingers 14A & B, respectively. For clarification of the relative positions of edge surfaces 14.1A & B please reference FIG. 3.4B as necessary.

FIG. 3.2

In FIG. 3.2 the anchor structure of the present embodiment is depicted having been situated in a bore, bore 1, in preparation for attaching an article, article 4, to the outer surface, outer surface 3, of a masonry or masonry-like material, material 2. Inner surface 62 of head 60 is adjacent to but not necessarily pressed with any large amount of force against article 4. The pushing portion, portion 5, of a blind rivet installation tool is appressed to outer surface 61 of head 60, while actuator stem 30 is engaged by the pulling portion, portion 6, of the same tool.

FIG. 3.3

FIG. 3.3 depicts that as stem 30 is pulled and head 60 is pushed, actuator head 31 pushes anvil 44 against end surfaces 22A & B. End surfaces 22A & B are deflected outward and fingers 14A & B articulate outward at first articulation grooves 21A & B until some portions of the un-tapered portions of outer surfaces 25.1A & B of fingers 14A & B, which are located very near to second articulation groves 23A & B, are forced into contact with the wall of bore 1.

Continued interaction between anvil 44 and end surfaces 22A & B causes fingers 14A & B to continue to deflect outwards and to articulate outward a second time at articulation grooves 23A & B.

At some point junctures 29.1A & B of fingers 14A & B are deflected far enough apart for anvil 44 to be drawn in between them so that anvil 44 bears upon junctures 29.1A & B. Before this point the outward deflection of fingers 14A & B has been at a relatively rapid rate due to the interaction of end surfaces 22A & B with anvil 44, after this point the outward deflection of the fingers will be at a significantly less rapid rate as anvil 44 interacts with junctures 29.1A & B and soon with inner surfaces 29A & B. Because fingers 14A & B are practically identical they are deflected outward and caused to articulate simultaneously, and because they are situated so as to be diametrically opposed to one another they are deflected outward in opposite directions which are generally perpendicular to the direction that said fingers where moved in to be inserted into bore 1.

FIG. 3.4A and FIG. 3.4B

In FIG. 3.4A it is depicted that as the pulling and pushing forces continue to be applied, anvil 44 has deflected portions of the tapered portions of outer surfaces 25.1A & B located between finger ends 22A & B and second articulation grooves 23A & B, including portions of pliably coated inward deflection regions 28A & B, outward and into contact with the wall of bore 1. Because the outer radial dimensions of said outer surface and said inward deflection regions are significantly smaller than the radial dimensions of bore 1, the portions of said outer surfaces and said regions which contact the wall of bore 1 are the portions which are generally located equidistantly from edge surfaces 14.1A & B.

The interval described above is depicted in FIG. 3.4B, a radial cross section of the location which corresponds to the location at which trailing surface 47 of anvil 44 is depicted in FIG. 3.4A.

At the interval depicted, as the amount of force required to deflect fingers 14A & B outward and cause fingers 14A & B to articulate at grooves 21A & B and 23A & B is minimal in comparison to the force necessary to compress elastic anvil 44, thus anvil 44 is not yet compressed to any significant degree.

FIG. 3.5

In FIG. 3.5 anvil 44 has been drawn a little farther in between fingers 14A & B and the increasing outwardly directed force generated by its interaction with junctures 29.1A & B has caused said junctures to begin to be radially bent outward and plastically deformed in such a manner that the inward deflection mechanism of localized radial deformation begins to act upon fingers 14A & B, causing the end portions of the fingers located between end surfaces 22A & B and anvil 44, to begin to deflect inward while articulating at locations close to and behind said anvil.

Due to the relative similarity of the outer radial dimensions and shape of anvil 44 and the inner radial dimensions and shape of inner surfaces 29A & B of fingers 14A & B, respectively, as the pressure increases, outer surface 45 of anvil 44 comes into contact with inner surfaces 29A & B in a very short time. As anvil 44 continues to be drawn farther in between fingers 14A & B, the amount of force generated increases rapidly to the point that anvil 44 begins to elastically compress and the radial outer dimensions of anvil 44 are reduced to some extent, and the gap between edge surfaces 48A and 48B of anvil 44 is decreased to some extent.

The increased pressure between anvil 44 and fingers 14A & B is also pushing portions of pliably coated inward deflection regions 28A & B, against the wall of bore 1 with sufficient force to cause those portions in close proximity to anvil 44 to begin to plastically and/or elastically deform. This results in the inward deflection of the end portions fingers 14A & B due to the localized reduction of radial cross-section mechanism acting upon them.

FIG. 3.6

In FIG. 3.6, it is depicted that as the pulling and pushing continue, anvil 44 has been pressed farther between fingers 14A & B and is exerting strong pressure upon fingers 14A & B by way of inner surfaces 29A & B. The amount of force generated by anvil 44 bearing upon inner surfaces 29A & B is sufficiently large to elastically compress anvil 44 to the maximum extent possible and the outer radial dimensions of anvil 44 are reduced to the point that the gap between edge surfaces 48A & 48B is reduced altogether and edge surfaces 48A & B of anvil 44 are pressed together.

At this point elastically deformable anvil 44 can not be compressed any further, and under further urging will behave as if it is a solid ring, rather than an elastic ring. It should be clarified that though anvil 44 might appear to be and might appear to behave as a solid ring, it is not. Anvil 44 is being held in this compressed condition by a large amount of force, and anvil 44 is at all times trying with great force to elastically return to its original radial dimensions.

As the tensional force applied to stem 30 continues to increase, anvil 44 is pressed somewhat farther in between inner surfaces 29A & B of fingers 14A & B, respectively. Because anvil 44 is already fully or maximally compressed, the factor by which the tensional force applied to stem 30 is multiplied and redirected outwardly by the interaction of anvil 44 and inner surfaces 29A & B and junctures 29.1A & B of fingers 14A & B, respectively, is at this time, equal to the factor which is determined by the amount of taper of the wedge-like passage formed by inner surfaces 29A & B and junctures 29.1A & B. Up to this time, a portion of the amount of force produced by the interaction of anvil 44 with the tapered passage of inner surfaces 29A & B and junctures 29.1A & B has been utilized to, or absorbed in, or stored by, elastically compressing anvil 44.

The strong force of anvil 44 bearing upon fingers 14A & B has also increased the amount of plastic and/or elastic deformation of the portions of inward deflection regions 28A & B in close proximity to anvil 44 and which are in contact with the wall of bore 1, to a much greater extent, with the result that finger end surfaces 22A & B and the portions of fingers 14A & B located between finger end surfaces 22A & B and anvil 44 have been deflected away from the wall of bore 1 and caused to articulate inward sufficiently for the outer edge of trailing surface 47 of anvil 44 to engage, or be engaged, by inner surfaces 29A & B of fingers 14A & B, respectively, in such a way as to prevent anvil 44 from moving in the direction back into bore 1.

Though it is possible that a third inward deflection mechanism, inward deflection by shear force has had some contributory effect, the amount has been negligible. This is in large part because the amount of friction between outer surface 45 of anvil 44 and inner surfaces 29A & B has been minimized to a large extent due to the similarity of the shape and dimensions of the frustum shaped outer surface 45 of anvil 44 and the taper shaped and dimensioned inner surfaces 29A & B of fingers 14A & B, respectively.

Anvil 44 is forcefully jammed or lodged between fingers 14A & B and can be driven no farther, so, as the pulling force on stem 30 continues to increase, the predetermined amount of force necessary to break stem 30 at notch 32 is exceeded and stem 30 breaks at notch 32.

FIG. 3.7

FIG. 3.7 depicts an interval after notch 32 has broken and shows detached actuator head 31 lying between the inwardly deflected and articulated end portions of fingers 14A & B. The spent portion of actuator stem 30 has been removed along with pulling portion 6 of the rivet installation tool and pushing portion 5 of the same tool.

Internally and externally tapered bidirectionally deflectable and triply articulable bore gripping fingers 14A & B have been deflected outward and into forceful contact with the wall of bore 1 and then portions of fingers 14A & B have been deflected back away from the wall of bore 1. Additionally fingers 14A & B have been articulated outward a first time at first articulation grooves 21A & B, and outward a second time at second articulation grooves 23A & B and have then been articulated inward behind anvil 44.

The end portions of fingers 14A & B located between end surfaces 22A & B and anvil 44 have been deflected inward predominately due to two inward deflection mechanisms, namely inward deflection due to localized radial deformation and inward deflection due to localized reduction of radial cross section. Furthermore, the extent to which said end portions have been inwardly deflected is a greater extent, or the inward deflection of said end portions has resulted from a reduced amount of outwardly directed force, or the inward deflection of said end portions has occurred at an early time, or a combination of the forgoing, than if outer surfaces 25.1A & B had not been configured with pliably coated inward deflection regions 28A & B. As a result the end portions of inner surfaces 29A & B of fingers 14A & B, respectively, are engaged with anvil 44 in such a manner as to prevent anvil 44 from moving in the direction back into bore 1, and since anvil 44 can not move in the direction out of bore 1, anvil 44 is effectively retained or locked in place.

Elastically compressible anvil 44 has been compressed and is wedged very forcefully between fingers 14A & B and is exerting a large amount of static force due to the anvil 44 being jammed between wedge-like fingers 14A & B and is in addition exerting a strong outward dynamic force due its elastically compressed condition.

The combined static and dynamic outwardly directed forces exerted by anvil 44 upon inner surfaces 29A & B and junctures 29.1A & B of fingers 14A & B, respectively, are very forcefully pressing portions of the outer surfaces 25.1A & B and portions of pliably coated inward deflection regions 28A & B of fingers 14A & B, respectively, against the wall of bore 1 so as to cause these portions to be forcefully engaged with the wall of bore 1 and thus couple the anchor structure with bore 1.

In addition if the wall of bore 1 were to develop a crack or should be caused to become weakened or slightly enlarged in some other non-catastrophic way, the dynamic elastic energy stored in compressed anvil 44 will, up to some point, compensate by continuing to push or force fingers 14A & B outward against the wall of bore 1, and thus cause the anchor structure to maintain a substantial engagement with bore 1.

Furthermore, the constant outward pressure exerted by elastically compressed anvil 44 also increases the ability of the anchor structure to resist becoming loosened if said anchor structure were to be subjected to dynamic stresses or forces such as vibration and/or sudden shock loads.

It should be noted that even though the anchor structure is strongly coupled with bore 1, that article 4 is not being pushed against surface 3 to any strong degree, as the anchor structure does not include a means for providing or applying an amount of holding or pinching force against article 4 as a result of and during the actuation process. Rather, it is provided with axial tensioning means which are applied as necessary, and to whatever extent desired, in a manual fashion after the actuation of the anchor structure is completed.

FIG. 3.8

In FIG. 3.8 the tip of a standard Phillips type screw driver 66, not of this invention, is depicted having been inserted into recess 64 of head 60. Recess 64 was specifically configured to accept the tip of a Phillips type screw driver in order that rotational leverage can be applied by the use of the tool to threadedly attached head 60, to rotate head 60 and attached threaded shank 65 in the direction necessary to increase the pressure holding article 4 to surface 3.

Conversely the Phillips screw driver could be used to turn head 60 and shank 65 in the direction necessary to reduce the pressure on article 4, or furthermore, to remove head 60 and shank 65 completely from internally threaded portion 55 of body 10.6 to allow the replacement of article 4 with a different article (not shown) or to allow the replacement of head 60 and shank 65 with a different screw (not shown and not of this invention) of appropriate dimension that has other qualities of profile or length or composition or color or such that are desired for a particular application.

In summation, as evident in the preceding passages of this embodiment, the nature and the extent of the deflection of bidirectionally deflectable fingers 14A & B has been determined by the specific configurations of said fingers and the actuator device comprised of anvil 44, actuator stem 30, head 31, and notch 32. More specifically, the doubly articulated outward deflection of said fingers resulted in the fingers being unaffected by beam deformation, and the similarity of the outer shape of anvil 44 and inner surfaces 29A & B has resulted in reducing the amount of available force utilized by the shear force deflection mechanism to a minimum, and an augmented or increased amount of inward deflection of the end portions of said fingers has occurred as a result of configuring the outer surfaces with pliably coated inward deflection regions 28A & B. Additionally, said regions have affected the nature and extent of the engagement of said finger with the wall of bore 1 by increasing the amount of friction, or more specifically the coefficient of friction of said fingers and said wall.

Detailed Description of a Third Alternate Embodiment

This third alternate embodiment is an exemplary anchor structure with four practically identical, externally tapered bidirectionally deflectable and triply articulable fingers which interact with a lobed anvil which is configured in conjunction with the fingers to generate outwardly directed force by interacting with only the inner surfaces of the fingers. As a result, the end portions of the fingers are deflected inward by the localized reduction of radial cross-sectional area and shear force mechanisms, and the distance that the anvil must travel between the fingers before the outwardly directed forces generated are applied directly to the wall of a bore is significantly reduced. Additionally, inward deflection augmentation means are provided in the form of transiently more pliable inward deflection regions, and separable article attachment means in the form of a threaded stud which is combined with a threaded nut to also provide selectable insertion depth.

The following detailed disclosure makes reference to FIG. 4.0, a perspective view of the present embodiment, FIG. 4.1A, an axial cross section which is oriented so as to show fingers 80A and 80C of the anchor structure, FIG. 4.1B a radial cross section of the locations indicated in FIG. 4.1A, and FIG. 4.1C, a perspective view of lobed anvil 90. As the fingers of this embodiment are symmetrically shaped and practically identical, intentional omission has been made of drawing matter which would only depict redundant aspects of this embodiment.

Body 10, Insertion Adjustment Stud 70, and Insertion Adjustment Nut 72

In the above mentioned figures it is shown that body 10 is a short tubular member with a distal end 10.1 and an externally threaded axially pierced stud attached to the opposite end. The externally threaded portion is designated insertion depth adjustment stud 70.

Adjustment stud 70 has an end surface 76 and its outer surface is covered by threads 74. Stud end surface 76 is the surface that the pushing portion of a blind rivet installation tool will contact and bear upon during the actuation process. Located on and threadedly engaged with insertion adjustment stud 70 is internally threaded insertion depth adjustment nut 72. Adjustment nut 72 can be rotated around adjustment stud 70 in an appropriate direction to cause adjustment nut 72 to be positioned at any selected location along the length of adjustment stud 70.

By positioning insertion depth adjustment nut 72 at a particular location upon stud 70, the distance into a bore, or the depth that fingers 80A, B, C, & D, body 10, and any portions of stud 70 located between body 10 and nut 72, can be inserted into a bore is limited by nut 72 contacting the outer surface of the material of the bore.

It is of note that when adjustment nut 72 is utilized to control the insertion depth of the bore gripping portions of the present embodiment it is simultaneously determining the dimension of the portion of stud 70 if any, which will project out of the bore in which the anchor structure is located. Thus the same combination of insertion depth adjustment stud 70 and insertion depth adjustment nut 72 can be used to configure the anchor structure as a stand off or mounting post with selectable axial dimensions.

Fingers 80A, B, C, & D

Located at and integrally attached to distal end 10.1 of body 10, are four bidirectionally deflectable and triply articulable fingers 80A, 80B, 80C, and 80D. Fingers 80A, B, C, & D, are congruent to each other in all meaningful dimensions to the extent that they can be considered practically identical in their form and function. In addition fingers 80A, B, C, & D are evenly and symmetrically distributed around distal end 10.1 of body 10 to which they are integrally connected.

Fingers 80A, B, C, & D each have an outer surface 82A, B, C, & D, respectively, an end surface 83A, B, C, & D, respectively, and an inner surface 81A, B, C, & D, respectively. Additionally each finger 80A, B, C, & D has two edge surfaces which are designated edge surfaces 86A and 86B.

Outer surfaces 82A, B, C, & D of fingers 80A, B, C, &D, respectively, have the same outer radial dimensions as body 10, at the locations that they join body 10 at distal end 10.1. Outer surfaces 82A, B, C, & D extend away from body 10 for some distance and then taper inwardly while extending to join finger end surfaces 83A, B, C, & D, respectively.

The amount of taper or slope of outer surfaces 82A, B, C, & D, is the taper or slope which will be imposed upon portions of inner surfaces 81A, B, C, & D, by the outward deflection of fingers 80A, B, C, & D, respectively, and is the amount of taper or slope with which anvil 90 will interact during the actuation process. So as to take full advantage of the specific mode of interaction between anvil 90 and fingers 80A, B, C, & D the amount of taper of outer surfaces 82A, B, C, & D is minimized, so as to produce a relatively large amount of outwardly directed force as the result of a relatively small amounts of outward deflection of said fingers.

Finger end surfaces 83A, B, C, & D are flat radial surfaces which extend from outer surfaces 82A, B, C, & D, respectively to join perpendicularly with inner surfaces 81A, B, C, & D, respectively.

Inner surfaces 81A, B, C, & D are equal in radial dimensions to the inner diameter of body 10 and extend from finger end surfaces 83A, B, C, & D, respectively, to terminate at their junctures with body 10 at distal end 10.1.

Finger edge surfaces 86A & B are planar surfaces which extend axially from distal end 10.1 of body 10 to end surfaces 83A, B, C, & D, and which extend radially from outer surfaces 82A, B, C, & D to inner surfaces 81A, B, C, & D. The junctures of edge surfaces 82A & B of fingers 80A, B, C, & D and inner surfaces 81A, B, C, & D, of fingers 80A, B, C, & D, respectively, are not given a specific designation in the present embodiment, as these junctures are not involved in the deflection process of the present embodiment.

As fingers 80A, B, C, & D are triply articulable, the specific dimensions, proportions, and operation of said fingers is similar to their functional counterparts as described in the first and second alternate embodiments.

First Outward Articulation Grooves 84A, B, C, & D, and Second Outward Articulation Grooves 85A, B, C, & D Located around outer surfaces 82A, B, C, & D of fingers 80A, B, C, & D, respectively, at the locations at which fingers 80A, B, C, & D, join body 10 at distal end 10.1, are first articulation grooves 84A, B, C, and D. Second articulation grooves 85A, B, C, & D are located around outer surfaces 82A, B, C, & D of fingers 80A, B, C, & D, respectively, at the locations at which outer surfaces 82A, B, C, & D, begin to taper inward from their largest outer diameter towards finger end surfaces 83A, B, C, & D, respectively. Grooves 84A, B, C, & D and 85A, B, C, & D are configured and proportioned to function in the same capacities as their respective counter parts of previous embodiments.

Transiently more Pliable Inward Deflection Regions 82.1A, B, C, and D

Transiently more pliable inward deflection regions 82.1A, B, C, and D are located on the tapered portions of outer surfaces 82A, B, C, & D, respectively, beginning at locations close to finger end surfaces 83A, B, C, & D, and extending toward body 10, to end at locations near to second articulation grooves 85A, B, C, & D, respectively. Regions 82.1A, B, C, & D are coatings or layers of materials which are strongly adhered to, or otherwise ruggedly and permanently affixed to fingers 80A, B, C, & D.

Transiently more pliable regions 82.1A, B, C, and D, are composed of a coating or layer of an elastomeric material that is preferably quite hard and rugged in its normal, or unaltered or un-softened state, but which can be, or the outer surface portions of which can be, rendered somewhat or much more pliable, for a limited and preferably relatively short period of time by the application of a softening agent to the material.

In this embodiment the material used to form transiently more pliable regions 82.1A, B, C, & D is poly-vinyl-chloride plastic (PVC plastic), and the softening agent used is acetone. Acetone has the benefits of not only softening PVC rapidly, it dissipates quickly, has little or no effect on masonry or common metals and is relatively economical.

The temporary softening of the material, or the outer surface of the material, which comprise transiently more pliable inward articulation regions 82.1A, B, C, and D, substantially improves the bore engagement characteristics, that is to say the nature and the extent of the engagement of fingers 80A, B, C, and D, by increasing the surface interaction between the outer surfaces of regions 82.1A, B, C, and D, and the walls of the bore against which they are pressed during actuation. And so said regions are another example of the configurations of the fingers of the present invention predetermining the nature and the extent of the engagement of said finger with the wall of a bore.

Furthermore, the amount that the material that comprise more pliable regions 82.1A, B, C, and D, is caused to be softened can be varied to configure the amount or degree of pliability of the material of regions 82.1A, B, C, and D, to be applicable to different bore engagement situations, possibly by using different length periods of time of emersion in the softening agent or possibly by application of larger or smaller amounts of the same.

This aspect of the feature of transiently more pliable regions may not be as applicable to the present embodiment as to anchor structures disclosed in other embodiments of the present invention, due to the fact that one of the outstanding characteristics of the anchor structure of the present embodiment is the extraordinarily high or very large amount of outwardly directed bore gripping force which it is designed to produce. Because of this very high bore gripping force, it is not particularly well configured for application to the types of bores in which the benefits which transiently more pliable inward articulation regions impart to an anchor structure of the present invention can best be demonstrated.

In the instance of the present embodiment, which is configured to produce a very high amount of outwardly directed bore gripping force and is generally intended for application to bores in cured concrete or other strong and rugged materials such as common metals, moderately or even minimally softened transiently more pliable regions 82.1A, B, C, & D can impart an added amount of bore engagement by allowing the outer surfaces of regions 82.1A, B, C, & D to conform to the walls of a bore much more intimately than they would otherwise.

However, the degree of improvement in bore engagement characteristics which can be achieved by the utilization of transiently more pliable regions 82.1A, B, C, & D is much better displayed, or is much more obvious, in an instance in which an anchor structure of the present invention which is configured with a low or lower amount of outwardly directed bore gripping force and which is intended for application in softer and more friable materials, such as slump block or mortar or stucco. In such an instance, transiently more pliable regions 82.1A, B, C, & D, may be softened to a degree, possibly even an extreme degree, to allow regions 82.1A, B, C, & D to conform intimately to the walls of a bore while being subjected to a relatively low amount of outwardly directed bore gripping force, such as an amount of force configured to not break or crack the material of a bore which may be a relatively soft and easily broken material such as terracotta or slump block or adobe.

Speaking in a general way, the anchor structures of the present invention, in all of its embodiments are coupled with a bore by basically two elements; force and friction. When a selected amount of outwardly directed force is applied to the wall of a bore by pressing deflectable fingers against it, the amount of force necessary to pull the fingers directly out of the bore is equal to the amount of outwardly directed force applied, multiplied by the coefficient of friction of the material of that the bore and the material that the fingers are made of. Thus, for a given amount of outwardly directed force, a larger amount of amount of friction results in a stronger engagement between the anchor structure and the bore.

One method to increase the friction between the fingers and the bore is to take advantage of the fact that bores or holes drilled in masonry substances have inner surfaces, or walls, that are quite irregular and rough. If the portions of the fingers in contact with the wall of a bore can be pressed against it hard enough, the portions in contact with the wall of the bore can be made to conform to the surface and surface irregularities to some extent. When the surface of the finger conforms to the surface and small irregularities of the surface of the bore the coefficient of friction can be increased substantially.

To take advantage of the irregularities and roughness of masonry bores, the portions of the fingers of an anchor structure configured to produce lower amounts of outwardly directed force which contact the wall of a bore have to conform intimately to the wall of the bore under the influence of substantially reduce amounts of outward force. One solution lies in taking advantage of hard, rugged plastics such as PVC and temporarily softening them to the point that they can easily conform to the wall and any surface irregularities of the wall of a bore, and then allowing the original characteristics of the plastic material to return.

The specific material, PVC, and the specific softening agent, acetone, are used for illustrative purposes. There are a broad selection of plastics available which may be applied as transiently more pliable coatings and many suitable softening agents which could be utilized to render these other plastic materials transiently more pliable.

Body 10, insertion adjustment stud 70 with nut 72, and fingers 80A, B, C, & D with transiently more pliable regions 82.1A, B, C, & D comprise the anchor component of the present embodiment.

Actuator Stem 30, Notch 32, and Upset Portion 34

Actuator stem 30, upset portion 34 and notch 32 are unchanged from previous embodiments and are dimensioned, positioned and operate identically to their respective counterparts. Actuator stem 30 is integrally connected to or formed with anvil 90, often being produced from a single piece of suitable wire which is shaped by cold forming or cold heading.

Direct Acting Anvil 90

Anvil 90 is configured to directly contact inner surfaces 81A, B, C, and D, of fingers 80A, B, C, and D, respectively, without contacting any other portion of the fingers 80A, B, C, and D, hence the designation "direct acting". Anvil 90 is a solid and substantially rigid body, meaning that it is not configured in composition or design to exhibit particularly elastic or plastic properties to any significant degree.

Arranged equidistantly and symmetrically around the solid center portion or core of anvil 90 are four slope-surfaced lobes 92A, B, C, & D, each of which has a sloped outer surface 94A, B, C, & D, respectively. Each sloped outer surface 94A, B, C, and D, originates at stem 30 on one end and extends, while sloping or tapering, to join end surface 93 of anvil 90.

As shown in FIG. 4.1C, outer surfaces 94A, B, C, & D have generally semicircular radial cross sections. The individual radial dimensions of outer surfaces 94A, B, C, and D are equal to the radial dimension of stem 30 and do not taper as they extend sloping from end surface 93 to stem 30, that is to say that they do not progressively diminish in radial dimension in relation to their own individual radial center lines, but rather they each diminish progressively in relation to the center line of stem 30. In other words, outer surfaces 94A, B, C, & D of lobes 92A, B, C, & D, respectively, and lobes 92A, B, C, & D, themselves, are not individually cone shaped, but rather each lobe is shaped like the smaller of two pieces that result from cutting a solid rod, several times its own diameter in length, from the center of one end to the edge at the far end. That is to say, each lobe resembles a wedge which has been cut out from, or made from, a rod or cylinder. If one were to arrange four of these rod-wedges concentrically around a central rod, of the same radial dimensions as said rod-wedges, the arrangement would generally approximate the shape of anvil 90.

Anvil 90 is configured in conjunction with inner surfaces 81A, B, C, & D of fingers 80A, B, C, & D, respectively, in such a manner that outer surfaces 94A, B, C, & D, of lobes 92A, B, C, & D, respectively, will contact inner surfaces 81A, B, C, & D while no other portion or portions of either fingers 80A, B, C, or D or the anvil 90 come into significant contact.

The radial distance between the most distant portions of any two directly opposed sloped outer surfaces 94A, B, C, and D, of anvil 90, is some small amount larger than the diameter of body 10 minus the combined radial dimensions of any two finger end surfaces 83A, B, C, and D. Furthermore, the specific radial distance between any two directly opposed outer surfaces 94A, B, C, & D of said anvil, is configured in relation to the radial dimensions of end surfaces 83A, B, C, & D of said fingers, in such a manner that when said end surfaces are deflected outward, and the outer most portions of outer surfaces 94A, B, C, & D of lobes 92A, B, C, & D, respectively, of said anvil contact inner surfaces 81A, B, C, & D of fingers 80A, B, C, & D, respectively, at locations which are in very close proximity to said end surfaces, that outer surfaces 82A, B, C, & D and transiently more pliable regions 82.1A, B, C, & D of fingers 80A, B, C, & D, respectively, will be positioned in locations which are in close proximity, or even very close proximity, to the wall of the bore in which the anchor component is being actuated.

Lobes 92A, B, C, & D of anvil 90 and anvil 90 are oriented in relation to inner surfaces 81A, B, C, & D in such a manner that when anvil 90 is drawn toward finger end surfaces 83A, B, C, & D that outer surfaces 94A, B, C, & D of lobes 92A, B, C, & D will contact and bear upon inner surfaces 81A, B, C, & D.

Note that the exemplary design of anvil 90, specifically being a solid piece or having a solid core is not intended to indicate that a pierced anvil which was configured properly could not be substituted for anvil 90, on the contrary, pierced direct bearing anvils can be utilized with anchor structures of the present embodiment.

Direct acting anvil 90 with integrally attached actuator stem 30, notch 32 and upset portion 34 comprise the actuator device of the present embodiment. Actuator stem 30 transfers tensional force from the pulling portion of a blind rivet installation tool to anvil 90, which in turn applies the force to the fingers.

Description of Operation of a Third Alternate Embodiment

The following detailed description of operation makes reference to FIG. 4.2 through FIG. 4.8, all of which are axial cross sections of present embodiment with the exception of FIG. 4.4B, which is a radial cross section of the portions of the anchor structure that are in close proximity to end surface 93 of anvil 90, at the same interval depicted in FIG. 4.4A.

The orientation of the anchor structure presented in these figures is such that finger 80A is located above finger 80C, and fingers 80A & C are viewed directly from the side. As a result, the lines that would be necessary to draw fingers 80B & D have been omitted to clarify the drawings.

FIG. 4.2

FIG. 4.2 depicts the anchor structure of the present embodiment situated in a bore, bore 1, which is in a material, material 2, which has an outer surface, outer surface 3. The anchor structure has been inserted into bore 1, to the point that insertion adjustment nut 72 has come into contact with outer surface 3 of material 2.

Insertion depth adjustment nut 72 has, prior to insertion of the anchor structure, been specifically positioned by being turned in one direction or the other, around insertion depth adjustment stud 70, until the present position was selected.

After the adjustment of nut 72 was complete, transiently more pliable regions 82.1A, B, C, and D, of fingers 80A, B, C, and D, respectively, were immersed in a softening agent or compound for a duration of time sufficient to cause only the outer surfaces of transiently more pliable regions 82.1A, B, C, and D, to become softened. After which time immersion was discontinued, and any excess softening compound was removed from regions 82.1A, B, C, and D, and the anchor structure was inserted into bore 1, with reasonable dispatch.

Actuator stem 30 was then engaged by the pulling portion, portion 6, of a blind rivet installation tool and the pushing portion, portion 5, of the same rivet tool was then positioned against end surface 76 of insertion adjustment stud 70. As depicted, the anchor structure is ready to be actuated within and subsequently coupled with bore 1.

FIG. 4.3

In FIG. 4.3 it is depicted that as pulling and pushing force are applied appropriately, in the directions indicated by directional arrows 5A & 6A, stem 30 pulls anvil 90 toward finger end surfaces 83A, B, C, and D, until the sloped outer surfaces 94A, B, C, & D of lobes 92A, B, C, & D, respectively, of lobed anvil 90, contact inner surfaces 81A, B, C, & D of fingers 80A, B, C, & D, respectively, at or very close to end surfaces 83A, B, C, and D. The sloped outer surfaces 94A, B, C, & D of anvil 90 push upon and deflect inner surfaces 81A, B, C, & D outward in the direction of the wall of bore 1, causing fingers 80A, B, C, & D to articulate outward at first articulation grooves 84A, B, C, & D, until portions of the untapered portions of outer surfaces 82A, B, C, & D of fingers 80A, B, C, & D, respectively, and which are in close proximity to second articulation grooves 85A, B, C, & D, are forced into contact with the wall of bore 1.

Note that in this embodiment this first relatively rapid outward deflection results from the interaction of the portions of inner surfaces 81A, B, C, & D that are in close proximity to end surfaces 83A, B, C, & D, respectively, with the sloped outer surfaces 94A, B, C, & D of lobes 92A, B, C, & D, respectively of anvil 90. This is in contrast to other embodiments in which the end surfaces of the fingers interact with the anvil to effect this first rapid outward deflection. Additionally because fingers 80A, B, C, & D are practically identical and are symmetrically situated in relation to one another and anvil 90 acts equally upon all fingers, the outward deflection of the fingers is simultaneous and in four separate directions which are substantially perpendicular to the insertion direction and which are substantially 90 degrees apart.

FIG. 4.4A and FIG. 4.4B

In FIG. 4.4A it is depicted as appropriately applied pulling and pushing continued that sloped outer surfaces 94A, B, C, & D, of lobes 92A, B, C, & D, respectively, of anvil 90, have deflected inner surfaces 81A, B, C, & D, of fingers 80A, B, C, & D, respectively, farther outward toward the wall of bore 1, and have caused the fingers to articulate outward at second articulation grooves 85A, B, C, and D.

At the interval depicted in FIG. 4.4 anvil 90 has been urged between fingers 80A, B, C, and D, to the point that inner surfaces 81A, B, C, & D are in contact with and bear upon the outer most portions of the junctures of outer surfaces 94A, B, C, & D of lobes 92A, B, C, & D, respectively, of anvil 90 and end surface 93 of said anvil. As a result the outward deflection continues at a significantly less rapid rate.

This interval is also depicted in FIG. 4.4B, a radial cross section that may help clarify the orientation of the portions just described.

FIG. 4.5

In FIG. 4.5 it is depicted that pulling portion 6 and pushing portion 5 of the rivet installation tool, continued to pull and push appropriately, and anvil 90 has been urged farther between fingers 80A, B, C, & D. The portions of fingers 80A, B, C, & D, located between end surfaces 83A, B, C, & D, and second outward articulation grooves 85A, B, C, & D, are deflected out toward the wall of bore 1, and fingers 80A, B, C, and D, are forced to articulate outward farther at second articulation grooves 85A, B, C, & D, until portions of outer surfaces 82A, B, C, & D, located between second articulation grooves 85A, B, C, and D, and finger end surfaces 83A, B, C, and D, respectively, including portions of transiently more pliable inward deflection regions 82.1A, B, C, & D, are urged into contact with the wall of bore 1. The portions of said outer surfaces and said transiently more pliable regions which are in contact with the wall of bore 1 are the portions which are located generally equidistantly between edge surfaces 86A & B of fingers 80A, B, C, & D.

At this point, both the first and the second outward articulations of the fingers are complete, and as a result inner surfaces 81A, B, C, & D are positioned so as to form the fixed and final form of the tapered, wedge-like passage with which anvil 90 interacts to translate and amplify, or redirect and multiply, the tensional force applied to stem 30 into outwardly directed bore gripping force. Additionally portions of outer surfaces 94A, B, C, & D of lobes 92A, B, C, & D, respectively, are in contact with and are bearing upon inner surfaces 81A, B, C, & D of fingers 80A, B, C, & D, respectively, while portions of outer surfaces 82A, B, C, & D of the fingers are in contact with the wall of bore 1. From this time onward the outward force generated by the interaction of anvil 90 with said fingers will be transferred directly to the wall of bore 1.

Note that because the axial movement of anvil 90 in the direction out of bore 1 has not been utilized to cause the inward deflection of the end portions of fingers 80 by application of either the beam deflection mechanism or the localized radial deformation mechanism, the distance that anvil 90 has moved to effect the present positioning of the anchor component's bore engaging portions is significantly less than would have been required if said inward deflection mechanisms where employed. Additionally, the total distance that anvil 90 must travel, or be drawn, in between fingers 80A, B, C, & D, to cause the anchor structure to be actuated within and coupled with the wall of bore 1, is reduced to a significant extent. This reduction in the axial distance that anvil 90 is moved to actuate the anchor structure allows the amount of taper or wedge angle of the tapered wedge-like passage formed by inner surfaces 81A, B, C, & D with which said anvil interacts, to be reduced to a relatively low amount, or low wedge angle, which in turn causes the interaction of the anvil and fingers to generate a commensurately large amount of outwardly directed force.

FIG. 4.6

In FIG. 4.6 anvil 90 has been pulled a short distance farther between fingers 80A, B, C, & D, and because of the outer most portions of outer surfaces 94A, B, C, & D, of lobes 92A, B, C, & D, respectively, of anvil 90, directly contacting inner surfaces 81A, B, C, & D, of fingers 80A, B, C, & D, respectively, the amount of pressure being generated and then directed outwardly to outer surfaces 82A, B, C, & D, and transiently more pliable inward deflection regions 82.1A, B, C, & D, to the wall of bore 1 has already increased to an amount at which those portions of said inward deflection regions in close proximity to anvil 90 and in contact with the wall of bore 1 begin to be plastically and elastically deformed, or crushed in manners which reduce their radial cross-sectional areas, so that the end portions of said fingers begin to deflect inward in accord with the reduction of radial cross section mechanism, and as the end portions of fingers 80A, B, C, & D deflect away from the wall of bore 1, they are caused to articulate inward at locations directly behind and adjacent to anvil 90.

At about this time the amount of outwardly directed force applied to fingers 80A, B, C, & D by anvil 90 is sufficiently great that as anvil 90 is drawn a little farther between the fingers, the end portions of the fingers can be deflected inward somewhat more by the shear force mechanism.

Because the outer surfaces of regions 82.1A, B, C, & D, are still in a temporarily slightly softened state, due to the prior application of a softening agent or compound, the amount that regions 82.1A, B, C, & D, are reduced in thickness may be somewhat greater and may have occurred and may continue to occur at a slightly lower level or amount of outwardly directed force, as transiently more pliable regions were only rendered slightly more pliable in preparation to actuate the anchor structure within bore 1.

However, the limited amount of softening, or limited increase in pliability which was applied to, or caused to, transiently more pliable inward deflection regions 82.1A, B, C, & D, has resulted in transiently more pliable regions 82.1A, B, C, & D, conforming to the wall of bore 1 to a much more intimate or thorough degree than if transiently more pliable regions 82.1A, B, C, & D, had not been rendered transiently more pliable by the application of a softening agent prior to the actuation process.

At the interval depicted in FIG. 4.6, the end portions of fingers 80A, B, C, & D, have been deflected inward, away from the wall of bore 1, a sufficient amount to cause the portions of inner surfaces 81A, B, C, & D, located between finger end surfaces 83A, B, C, & D, and anvil 90 and in close proximity to anvil 90, to engage anvil 90 in such a manner as to deter or prevent anvil 90 from moving in the direction back into bore 1.

At some point the amount of tensional force necessary to continue to move anvil in the direction out of bore 1 and farther in between inner surfaces 81A, B, C, D, of fingers 80A, B, C, & D, respectively, increases to a level very close to an amount necessary to cause stem 30 to break at notch 32. At this point anvil 90 can practically be drawn no farther and is effectively wedged in between outwardly and then inwardly deflected portions of fingers 80A, B, C, & D.

FIG. 4.7

In FIG. 4.7 it is depicted that as anvil 90 was jammed so forcefully in place between fingers 80A, B, C, & D, that it could not be moved any farther in the direction out of bore 1, and as the pulling force exerted on stem 30 by pulling portion 6 of the rivet installation tool continued to increase, the amount of tensional force necessary to break stem 30 at notch 32 was exceeded and stem 30 broke at notch 32. The spent portion of stem 30 has been withdrawn from the lumen of body 10 along with the pushing and pulling portions, 5 & 6, of the rivet installation tool.

Bidirectionally deflectable and triply articulable fingers 80A, B, C, & D have been deflected outward and into extremely forceful contact with the wall of bore 1, and the end portions of fingers 80A, B, C, & D have been deflected inward, away from the wall of bore 1. Fingers 80A, B, C, & D have been articulated outward twice during the outward deflection process and have been articulated in the inward direction as a result of the inward deflection of the end portions of fingers 80A, B, C, & D behind anvil as a result of the localized reduction of radial cross section and the shear force mechanisms. The end portions of inner surfaces 81A, B, C, & D of the fingers have been deflected inward and caused to articulate inward a sufficient amount to engage the portions of anvil 90 located close to the junctures of outer surfaces 94A, B, C, & D of lobes 92A, B, C, & D, respectively, in such a manner as to prevent the anvil from moving in the direction back into bore 1.

Furthermore the inward deflection mechanism of localized reduction of radial cross section has effected the inward deflection of the end portions of the fingers to a greater extent and at a lower amount of outwardly directed force due to the temporarily increased pliability of transiently more pliable regions 82.1A, B, C, & D, portions of which where deformed or crushed by application of a reduced amount of force as compared to the amount of force necessary to deform or crush the same regions if not rendered temporarily more pliable.

Also due to the temporarily more pliable state of transiently more pliable regions 82.1A, B, C, & D, portions of the outer surfaces of said regions have established a more intimate and detailed degree of conformity to the wall of bore 1 than the same surfaces would without being transiently rendered more pliable. As a result, the strength of the coupling of the anchor structure of the present embodiment with the wall of bore 1 is substantially increased.

Note that at this interval, only a relatively short period of time has transpired since the initiation of the actuation process. From the time that transiently more pliable regions 82.1A, B, C, & D were briefly immersed in or otherwise treated with a transient region softening agent or compound, to the point that stem 30 snapped or broke at notch 32, no more than several seconds may have passed.

FIG. 4.8

In FIG. 4.8 it is depicted that after a sufficient period has elapsed to allow transiently more pliable regions 82.1A, B, C, & D, to regain a measure of their original characteristics, as the softening agent dissipates to some degree, insertion depth adjustment nut 72 is rotated around insertion depth adjustment stud 70 in the direction necessary to cause it to be able to be removed until nut 72 is detached from stud 70. Article 4 is positioned around stud 70 and against surface 3 and nut 72 is reattached, being appropriately rotated around stud 70 until nut 72 contacts article 4 and presses it against surface 3 with whatever amount of axial tensional force is desired within the limits of the anchor structure.

It is of note that the portion of stud 70 which is projecting out of bore 1 could also be utilized as a stand-off, by positioning nut 72 at a selected location on stud 70, with nut 72 contacting or not contacting surface 3, positioning an appropriately sized article 4 or other article or fixture, which has an appropriately sized and located aperture, upon or around stud 70 and then retaining the article or fixture by application of an appropriately selected nut (not of this invention and not shown) to stud 70.

In summation, by consideration of the specific configurations of bidirectionally deflectable fingers 80A, B, C, & D and the actuator device comprised of lobed direct bearing anvil 90, stem 30, and notch 32 and the interactions of said fingers and said actuator device as described in the forgoing disclosure, it can be seen that the nature and extent of the deflections of said fingers have been predetermined by said configurations.

More specifically, the specific configurations of fingers 80A, B, C, & D and the actuator device of the present embodiment have changed the predetermined nature and extent of the deflection of said fingers in comparison to the previously disclosed embodiments of the present invention in at least the following ways: The direct bearing nature of the interaction of said fingers with said actuator device has allowed the configurations of said fingers to produce an increased amount of outwardly directed force, while at the same time producing said force with a reduced amount of anvil movement in the direction out of bore 1; and the extent to which the inwardly deflected end portions of said fingers have been deflected is to a significantly greater extent due in part to transiently more pliable regions 82.1A, B, C, & D.

Furthermore, transiently more pliable regions 82.1A, B, C, & D have additionally been shown to not only affect the nature and extent of the deflection of fingers 80A, B, C, & D, but to also affect the nature and extent of the engagement of said fingers with the wall of bore 1, as said regions have substantially increased the level of conformity between said regions and said wall and any irregularities of said wall, so that the amount of force necessary to pull said finger out of said bore has been increased to some large extent.

In conclusion, in addition to the specific instance described therein, in which said actuator device and said fingers are configured to interact in such a manner as to cause the deflection of the fingers by application of force to only inner surface 81A, B, C, & d of said fingers, it is important to note that differently configured bidirectionally deflectable fingers in conjunction with a differently configured actuator device can interact in a manner which would result in the application of force to other selected portions of the differently configured fingers, rather than the inner surfaces of the differently configured fingers.

For example, in another alternate embodiment the actuator device and the bidirectionally deflectable fingers could be configured in such manners that the interaction between said fingers and actuator device would be limited to contact between the edge surfaces of said fingers and the anvil portion of the actuator device. This could be accomplished, in part, by use of an anvil portion of an actuator device shaped similarly to a flat surfaced wedge which would contact and bear upon the edge surfaces of the fingers as opposed to contacting the inner surfaces of said fingers.

Detailed Description of a Fourth Alternate Embodiment

The following is a detailed description of an exemplary alternate embodiment which has internally and externally tapered bidirectionally deflectable and triply articulable bore gripping fingers, a two stage actuator device which has a separable expansive force applying portion and an integrally formed force applying portion and actuator stem, axially deformable article attachment means in addition to ancillary separable attachment means. Furthermore, the fingers and actuator device of the present embodiment are configured to determine the nature and extent of the deflection of said fingers while utilizing two inward deflection mechanisms.

In previous embodiments by configuring the bidirectionally deflectable fingers and actuator devices appropriately, two distinct deflection rates have been sequentially imposed upon the fingers of the various anchor structures presented; a first and relatively rapid deflection rate and then a second and relatively less rapid deflection rate. The reasoning for this two step approach is that because the outward deflection of the fingers is caused by an anvil interacting with the fingers in a wedge-like relationship, the amount of outwardly directed force generated by the interaction of the anvil with the fingers is inversely proportional to the deflection rate. That is to say that when the deflection rate is high, the outward force generated is low, and vice versa.

This means that if the fingers of an anchor structure are to engage the wall of a bore in a relatively forceful manner, then the wedge angle with which the anvil of the anchor structure is to interact must be relatively low. If the wedge angle is relatively low, then the anvil will have to be drawn a relatively long distance between the fingers to cause the fingers to deflect outward any substantial distance to engage the wall of the bore. If the anvil must be drawn a relatively long distance between the fingers, then the fingers themselves must be relatively long. If the fingers themselves are relatively long, then the bore into which they are to be inserted must be correspondingly long or deep. Obviously this would severely restrict the applicability of such an anchor structure, which is clearly not acceptable.

Thus to restrict the overall length of the bore gripping portions of an anchor structure and reduce the depth of the bore necessary to accommodate the anchor structure, the fingers of previous embodiments are deflected outward at a first relatively high and less forceful deflection rate to position them in proximity to the wall of a bore and, then are deflected outward at a second less rapid and more forceful rate so as to strongly engage the wall of a bore.

There are situations where an alternate embodiment of an anchor structure of the present invention might be configured with only one outward deflection rate. One instance would be if the anchor structure is intended for application to bores that do not exhibit significant diametral variations from one bore to the next, as is commonly the case with bores drilled in metals and plastics and many other materials in which holes are commonly drilled by use of a chip formation process rather than an abrasive or rotary scraping process, and if the anchor component is configured with internally tapered bidirectionally deflectable fingers, as is the anchor component of the fifth alternate embodiment which will be disclosed subsequently. In such instances the distances outward that the fingers of the anchor component would have to be deflected before contacting the wall of a bore can be minimized by configuring the outer diameter of the anchor component to be only a very little amount smaller than the diameter of the bore to which the anchor structure is to be applied, thus negating the need for a first rapid deflection rate to position the fingers within close proximity to the wall of the bore, and hence allowing the application of an anchor structure with a single less rapid and commensurately strong deflection rate to the bore. Another instance might be if the anchor structure of the present invention, again configured with internally tapered fingers, is configured with a relatively rapid deflection rate and the resulting lower amounts of outward force are acceptable for the intended application.

In the event that it is desired to configure an anchor structure of the present invention which is deflected outward at single deflection rate, one method would be to configure the bidirectionally deflectable fingers with internal tapers and configure the actuator device in such a manner that the anvil portion of said actuator device would contact and apply force to only the tapered inner surfaces of said fingers.

The two deflection rate approach is applicable to a very large number of possible applications, but in the event that it is necessary to increase the amount of outwardly deflected force to extremely high or large amounts, the two deflection rate design may not provide the necessary amounts of outward deflection and the desired amount of outwardly directed force.

The present embodiment employs an expansible anvil to deflect the fingers outward at three separate sequential and progressively less rapid deflection rates. This three deflection rate approach is achieved by use of bidirectionally deflectable fingers that are deflected outward at a first and most rapid rate and then a second and less rapid rate by an expansible primary or first anvil which is subsequently expanded by a secondary or second anvil to drive the fingers outward at a third least rapid and most powerful rate.

Additionally the present embodiment is another example of an anchor structure which utilizes two inward deflection mechanisms, namely localized radial deformation and localized reduction of radial cross section.

It is of some note that, though the primary design criteria sought in the development of the anchor structure of the present embodiment was extraordinarily large amounts of outwardly directed bore gripping force, the design concept is well suited to configurations in which an extraordinarily large amount of outward deflection is a primary criteria, as is the case when designing anchor structures of the present invention for application to oversized bores. That is to say, bores the diameters of which are larger than the largest diameters expected within the normal range of bores for bores drilled in masonry materials.

The following detailed description makes reference to FIG. 5.0, a perspective view and FIG. 5.1A, an axial cross-sectional view, of the present embodiment; FIG. 5.1B, a perspective view of first anvil 110, and FIG. 5.1C, a radial cross section of the present embodiment at the location indicated in FIG. 5.1A.

Many of the components and members of the present embodiment have been introduced and applied in previous embodiments of the present invention. In the interests of brevity I will cite all of the previously introduced items briefly.

Body 10, internally threaded portion 55 of body 10, distal end 10.1, end surface 11 of body 10, first articulation grooves 21A & B, second articulation grooves 23A & B, finger end surfaces 22A & B, fingers 14A & B, inner surfaces 29A & B, junctures 29.1A & B, edge surfaces 14.1A & B, stem 30, upset portion 34 of stem 30, and notch 32 are all described in the second alternate embodiment.

I include fingers 14A & B in this list because they are identical to the fingers 14A & B of the second alternate embodiment of the present invention, with one exception. Outer surfaces 25.2A & B of the present embodiment do not have articulation regions, where as outer surfaces 25.1A & B of the second alternate embodiment have articulation regions 28A & B.

Head 16, inner surface 17 of head 16, and outer surface 18 of head 16, all appear in the preferred embodiment.

Body 10 with head 16 and fingers 14A & B comprise the anchor component of the present embodiment.

Second Anvil 120 and Actuator Head 124

Integrally attached to or formed with actuator stem 30 at or very near to notch 32 is second anvil 120, which extends away from stem 30 for some distance slowly and progressively increasing in outer diameter to form a slim or narrow frustum shape which ends at leading surface 126 of actuator head 124. The cone angle or taper of second anvil 120 is relatively very small or slight in comparison to the cone angle of the tapered or sloped wedge-like passage formed by inner portions of fingers 14A & B, with which first anvil 110 will interact during the actuation process. The designation second anvil is applied to second anvil 120 because it is the second of two anvils to be utilized in sequence to deflect the bidirectionally deflectable and triply articulable fingers 14A & B outward and then back inward during the actuation process. Second anvil 120, is a substantially rigid body, which is to say that it is configured in neither form nor composition to exhibit substantially plastic or elastic properties.

Integrally formed to the larger end of anvil 120 is actuator head 124. Actuator head 124 is a radially enlarged disk or knob, and the portion of the disk which is closest to anvil 120 is designated leading surface 126. Actuator head 124, the outer most diameter of head 124, and leading surface 126 are all configured in relation to each other and in conjunction with deformable actuator sleeve 122, to engage deformable actuator sleeve 122 in such a manner as to be able to push upon sleeve 122 and cause it to bear upon anvil 110 strongly, while at the same time being configured to deform or swage sleeve 122 outward in a manner which will allow head 124 to enter or pass within sleeve 122, when a certain predetermined amount of force is applied by actuator head 124 to sleeve 122 while sleeve 122 is pressed against anvil 110.

When head 124 is drawn into sleeve 122, second anvil 120 is drawn into inner surface 119 of first anvil 110. When the slightly tapered second anvil 120 is drawn into inner surface 119, first anvil 110 is very forcefully expanded outward. Because second anvil 120 is tapered, the interaction with inner surface 119 is based upon wedge mechanics, and since second anvil 120 is slightly tapered, that is to say that it has a very low wedge angle, the amount of force with which first anvil 110 is expanded outward is very large.

Second anvil 120, actuator head 124, and stem 30 with notch 32 and upset portion 34 are all integral portions of a single device, often formed from a single piece of wire by cold heading or cold forging.

Deformable Sleeve 122

Deformable sleeve 122 is a hollow tube a little longer than the length of anvil 120. Sleeve 122 is configured to be able to engage both leading surface 126 of actuator head 124 and trailing surface 116 of anvil 110, in a manner which allows sleeve 122 to transfer or transmit a sufficiency of pushing force from actuator head 124 to anvil 110 to cause anvil 110 to deflect fingers 14A & B outward and into strong contact with the wall of a bore and then, when a predetermined amount of force is exceeded, sleeve 122 allows actuator head 124 and leading surface 126 of head 124 to swage or otherwise plastically and/or elastically deform sleeve 122 outward in a manner which allows leading surface 126 and actuator head 124 to be drawn into or pass within deformable sleeve 122.

First Anvil 110

First anvil 110, so called because it acts upon fingers 14A & B first during the actuation process, is shaped like a hollow truncated cone with an additional sloped surface on the small end of the frustum. First anvil 110 has a leading surface 111, a trailing surface 116, an inner surface 119, an outer surface 114, and a leading outer surface 112. Additionally first anvil 110 has two edge surfaces 118A & 118B.

Inner surface 119 is generally shaped like a regular bore, in that it does not taper, with a diameter that is only slightly larger than the diameter of stem 30 when edge surfaces 118A & B of anvil 110 are pressed together. Inner surface 119 extends from leading surface 111 to trailing surface 116 and is interrupted axially by edge surfaces 118A & B. Leading surface 111 is perpendicular to inner surface 119 and extends out radially for a short distance to end at and join with leading outer surface 112. Leading outer surface 112 tapers or slopes somewhat sharply, toward trailing surface 116 as it extends outward radially for a distance to end at and join with outer surface 114.

Leading outer surface 112 is the surface of anvil 110 which will contact and bear upon finger end surfaces 22A & B to cause said fingers to deflect outward at a first, most rapid and least forceful deflection rate. The slope or inclination of leading outer surface 112 is configured such that, when it is pushed into contact with finger end surfaces 22A & B of fingers 14A & B, respectively, it cooperates with end surfaces 22A & B in such a way as to deflect end surfaces 22A & B outward.

Outer surface 114 of anvil 110 progressively increases in outer diameter as it extends from outer leading surface 112 to join with trailing surface 116. The amount of taper or slope of outer surface 114 is somewhat greater than the angle that will exist between the tapered portions of inner surfaces 29A & B, when the tapered portions of outer surfaces 25.2A & B have been deflected outward and into contact with the wall of bore 1. Trailing surface 116 is perpendicular to inner surface 119 and extends from its juncture with outer surface 114 radially to inner surface 119.

Outer surface 114, is the surface of first anvil 110 which will contact and interact with junctures 29.1A & B and inner surfaces 29A & B, of fingers 14A & B, respectively, to cause said fingers to deflect outward at a second, less rapid and more forceful deflection rate.

The outer diameter of trailing surface 116, that is to say the diameter of the juncture of trailing surface 116 with outer surface 114, is configured in conjunction with fingers 14A & B such that when edge surfaces 118A & B of anvil 110 are pressed together and trailing surface 116 is positioned between and is in contact with junctures 29.1A & B of said fingers, and is in close proximity to end surfaces 22A & B of said, that the radial distance between the two most distant and diametrically opposed portions of outer surfaces 25.2A & B, at or very near to the junctions of outer surfaces 25.2A & B and end surfaces 22A & B, respectively, is generally equal to or somewhat larger than the outer diameter of body 10.

Edge surfaces 118A & B are planar surfaces that extend axially from leading surface 111 to trailing surface 116. Edge surfaces 118A & B extend radially from inner surface 119 to intersect with join with leading outer surface 112 and outer surface 114. Edge surfaces 118A & B are generally parallel to each other.

In FIG. 5.0, FIG. 5.1A, and FIG. 5.1B, edge surfaces 118A & B of anvil 110 are depicted at a significant distance from each other for purposes of graphic clarity only, in practice, edge surfaces 118A & B should be in relatively close proximity to each other or even in contact with each other, when anvil 110 is positioned around actuator stem 30 and leading outer surface 112 of anvil 110 is in contact with end surfaces 22A & B of fingers 14A & B, respectively, that is to say, when positioned as necessary so as to be ready for the actuation of the anchor structure to commence.

Anvil 110 is generally configured in composition, dimensions and geometry and in relation to fingers 14A & B and second anvil 120 to be a mostly rigid body, not configured to be particularly elastically or plastically deformable and yet to be outwardly expansible when a sufficient amount of outward force is applied to inner surface 119 by the insertion of slightly tapered second anvil 120 therein.

First anvil 110 is made of an appropriately strong and rugged material, at least as hard as the material selected for fingers 14A & B and preferably somewhat harder, while at the same time it is best if it is not as hard as the material selected for second anvil 120. As an example only, good success has been had by using an alloy of aluminum to fabricate fingers 14A & B and body 10, mild unhardened steel for anvil 110, and somewhat work-hardened mild steel for anvil 120.

First anvil 110 when assembled together with deformable sleeve 122 and with integrally formed second anvil 120, actuator head 124, stem 30, notch 32, and upset portion 34 comprise the two stage actuator device of the present embodiment. Stem 30 first transfers tensional force from the pulling portion of a blind rivet tool to actuator head 124 which pushes sleeve 122 against first anvil 110 which in turn applies force to fingers 14A & B, when a predetermined amount of force applied to sleeve 122 is exceeded, sleeve 122 is deformed in a manner which allows second anvil 120 to expand first anvil 110 outward against fingers 14A & B with an extremely large amount of outwardly directed force.

Description of Operation of a Fourth Alternate Embodiment

The following operational disclosure makes reference to FIG. 5.2 through FIG. 5.9, all of which are cross-sectional views with the exception of FIG. 5.4B which is a radial cross section detailing the portions of the anchor structure that are in close proximity to the location at which trailing surface 116 of anvil 110 contacts junctures 29.1A & B of fingers 14A & B, depicted at the same interval as in FIG. 5.4A.

FIG. 5.2

In FIG. 5.2 the anchor structure of the present embodiment is depicted having been inserted into a bore, bore 1, in a solid material, material 2, which has an outer surface, surface 3. Stem 30 is gripped firmly by the pulling portion, pulling portion 6, of a blind rivet installation tool, while the pushing portion, pushing portion 5, of the same tool is firmly pressed to outer surface 18 of head 16, and inner surface 17 of head 16 is pressed against surface 3. The anchor structure of the present embodiment is ready to be actuated and coupled with the wall of bore 1.

FIG. 5.3

FIG. 5.3 depicts the initiation of actuation as pulling portion 6 of the blind rivet installation tool and pushing portion 5 of the same tool applying, oppositely directed forces to the appropriate portions of the anchor structure, in the directions indicated by arrow 6A and arrow 5A, respectively. As actuator stem 30 overcomes the slight drag of upset portion 34 against the inner surface of body 10, and pulls leading surface 126 of actuator head 124 against deformable sleeve 122 which in turn pushes on first anvil 110 by way of trailing surface 116. Outer leading surface 112 of first anvil 110 is pushed against and begins to deflect end surfaces 22A & B of fingers 14A & B, respectively, out towards the wall of bore 1. As fingers 14A & B are practically identical to each other and are positioned so as to be directly opposed to one another and first anvil 110 acts equally upon them their outward deflection is substantially simultaneous and in opposite directions. Furthermore the directions in which they deflect are substantially perpendicular to the direction in which fingers 14A & B where inserted into bore 1.

This first outward deflection of fingers 14A & B is at a rapid rate of deflection, has a relatively low amount of outwardly directed force, and is utilized to deflect fingers 14A & B into positions at or from said fingers can be deflected farther outward at the second less rapid and more forceful outward deflection rate.

As sloped leading surface 112 of anvil 110 bears upon end surfaces 22A & B of fingers 14A & B, respectively, and they are deflected outward and pushed apart and toward the wall of bore 1, fingers 14A & B are forced to articulate outward at first articulation grooves 21A & B, until some portions of the untapered portions of outer surfaces 25.2A & B of said fingers, near to second articulation grooves 23A & B contact the wall of bore 1.

Note that if edge surfaces 118A & B of anvil 110 were not in contact with each other before the initiation of actuation, the forces exerted between anvil 110 and finger ends 22A & B and subsequently junctures 29.1A & B will tend to force edge surfaces 118A & B into close proximity, if not direct contact.

FIG. 5.4A and FIG. 5.4B

In FIG. 5.4A, first anvil 110 has been pushed past finger end surfaces 22A & B and is depicted in between fingers 14A & B and in contact with junctures 29.1A & B, which now bear upon the outer most portion of outer surface 114, of anvil 110.

FIG. 5.4B is a radial cross-sectional view which depicts the portions of the present embodiment at the location that junctures 29.1A & B contact the outer most diameter of trailing surface 116 of anvil 110, at the same interval depicted in FIG. 5.4A.

During the interval between that depicted in FIG. 5.3 and that depicted in FIG. 5.4, as the pulling and pushing forces applied to the appropriate portions of the anchor structure continued, leading outer surface 112 continued to bear upon finger end surfaces 22A & B, and caused said end surfaces to be deflected outward at a rapid rate, until at some specific moment, leading surface 112 was pulled past end surfaces 22A & B and in between junctures 29.1A & B of fingers 14A & B, respectively. Because portions of the untapered portions of fingers 14A & B in close proximity to second articulation grooves 23A & B are already pressed against the wall of bore 1, the outward deflection of finger end surfaces 22A & B has caused fingers 14A & B to articulate outward at second articulation grooves 23A & B, respectively.

Anvil 110 has been driven in between junctures 29.1A & B, with the result that the end portions of fingers 14A & B are deflected farther outward, but at a reduced deflection rate and with more power, as the outward deflection is caused by the interaction of junctures 29.1A & B with anvil 110. Fingers 14A & B continue to be deflected outward and continue to articulate outward at second articulation grooves 23A & B, respectively, until portions of the tapered portions of outer surfaces 25.2A & B of fingers 14A & B contact the wall of bore 1.

Up to this point, the amount of force being transferred from actuator head 124 to anvil 110 by way of formable sleeve 122 has been enough to facilitate the outward deflection and outward articulation of fingers 14A & B, but not enough to deform deformable sleeve 122.

FIG. 5.5

In FIG. 5.5 anvil 110 has been pushed farther in between fingers 14A & B and has born upon junctures 29.1A & B with a sufficient amount of force to push said junctures radially outward and to begin the inward deflection of the end portions of fingers 14A & B due to localized radial deformation. Furthermore, junctures 29.1A & B have been pushed outward sufficiently to allow inner surfaces 29A & B of fingers 14A & B, respectively, to come into contact with and to start to be borne directly upon by the portions of outer surface 114 of anvil 110 which are in close proximity to trailing surface 116 of anvil 110.

With inner surfaces 29A & B of fingers 14A & B in direct contact with portions of outer surface 114 of anvil 110 and outer surfaces 25.2A & B of fingers 14A & B in direct contact with the walls of bore 1, anvil 110 is wedged as tightly between inner surfaces 29A & B by the amount of pressure being applied by actuator stem 30 by way of actuator head 124 and in turn sleeve 122, as the relatively large wedge angle between inner surfaces 29A & B will allow, and as the pressure continues to increase deformable sleeve 122 begins to deform.

FIG. 5.6

In FIG. 5.6 the pulling force applied to stem 30 by pulling portion 6 of the rivet installation tool continues to increase while the pushing portion 5 of the same tool continues to push on outer surface 18 of head 16. The increased pressure bearing upon deformable sleeve 122 resulting from actuator head 124 being pulled and forcing leading surface 126 against sleeve 122, which is forcing sleeve 122 against trailing surface 116 of anvil 110, while trailing surface 116 of anvil 110 is held stationary by the wedged condition of anvil 110, exceeds the amount necessary to deform sleeve 122, and sleeve 122 deforms, expanding outward plastically and elastically.

As sleeve 122 deforms, it cooperates with leading surface 126 of actuator head 124 and head 124 itself, and is deformed outwardly, plastically and elastically, sufficiently to allow leading surface 126 of head 124 and head 124 itself to enter into sleeve 122. As head 124 deforms sleeve 122 outwardly and is drawn closer to first anvil 110 and into sleeve 122, second anvil 120 is drawn towards and into inner surface 119 of first anvil 110.

As second anvil 120 is drawn into first anvil 110, the slightly tapered outer surface of second anvil 120 bears upon inner surface 119 of first anvil 110 and the outward force causes edge surfaces 118A & B of anvil 110 to be spread apart from each other, as outer surface 114 of anvil 110 is wedged outward very forcefully against inner surfaces 29A & B of fingers 14A & B, respectively, and toward the wall of bore 1.

Second anvil 120, having a relatively small wedge angle in comparison to the tapered wedge-like passage formed by junctures 29.1A & B and inner surfaces 29A & B of fingers 14A & B, respectively, with which first anvil 110 interacted to effect the second outward deflection rate upon fingers 14A & B, deflects and forces first anvil 110 outward much more forcefully and at an even further reduced deflection rate than first anvil 110 previously forced fingers 14A & B outward, with the result that the outer surface 114 of first anvil 110 is driven extremely forcefully against inner surfaces 29A & B of fingers 14A & B, respectively, deflecting said fingers somewhat farther outward, which in turn drive the portions of outer surfaces 25.2A & B of said fingers already in contact with bore 1 and in close proximity to anvil 110, against the wall of bore 1 with a force several to many times greater than the force exerted by anvil 110 previously upon fingers 14A & B.

The extremely large amount of force generated by slightly tapered second anvil 120 bearing upon the inner surface 119 of first anvil 110, and the subsequent transmission of this great force through anvil 110, which in turn forces outer surface 114 of anvil 110 against inner surfaces 29A & B of said fingers, outer surfaces 25.2A & B of which are already in contact with the wall of bore 1, is sufficient to cause the inward deflection of the end portions of said fingers by the mechanism of localized reduction of radial cross section.

The extreme force exerted upon the portions of fingers 14A & B in close proximity to anvil 110 causes said fingers to deform plastically in a manner which reduces the radial dimensions of the radial cross section, that is to say thickness, of the these portions of fingers 14A & B to a degree that the portions of fingers 14A & B not reduced in thickness, but which are directly adjacent to the portions of reduced thickness, push against the wall of bore 1 with sufficient force and in a manner which causes finger end surfaces 22A & B, and those portions of said fingers between said ends surfaces and anvil 110, to deflect farther inward away from the wall of bore 1, and to articulate at locations behind and close to said anvil.

When the portions of inner surfaces 29A & B of said fingers, which are located between end surfaces 22A & B and anvil 110 are deflected inward, said portions are deflected inward to an extent that they engage outer surface 114 of anvil 110 at or very near to its juncture with trailing surface 116 of anvil 110, in such a manner as to prevent anvil 110 from moving in the direction back into bore 1 and out from between fingers 14A & B, thus effectively retaining anvil 110 in place between fingers 14A & B.

To review in more direct terms, the low angle or slightly tapered wedge of second anvil 120 generates enough force by its wedge-like interaction with inner surface 119 of anvil 110, that outer surface 114 of anvil 110 crushes fingers 14A & B sufficiently to cause portions of fingers 14A & B to bend in and hold anvil 110 in place.

Second anvil 120 has been drawn as far into inner surface 119 of first anvil 110 as it can be drawn, as leading edge 126 of actuator head 124 has swaged or flared deformable sleeve 122 outward and actuator head 124 has been drawn into and mostly or even completely through sleeve 122 toward trailing surface 116 of anvil 110 and is abutted against trailing surface 116 of anvil 110.

It should be pointed out that in some circumstances, second anvil 120 may not be drawn as far into inner surface 119 of first anvil 110, with the result that leading edge 126 of actuator head 124, and said head itself, may not be drawn as far through deformable sleeve 122. In the event that the amount of tensional force necessary to pull second anvil 120 into first anvil 110 exceeds the predetermined amount necessary to cause stem 30 to break at notch 32, second anvil 120 may only be drawn partially into inner surface 119, and said head and leading surface may only be drawn partially through said sleeve, before stem 30 breaks at notch 32.

As actuator head 124 has been drawn through sleeve 122, the portions of sleeve 122 through which actuator head 124 has already been drawn past, elastically contract or return toward their original diameter to some degree. The portions of sleeve 122 through which head 124 has already been drawn will not return or contract completely to their original dimensions, having been plastically deformed as well as elastically deformed, but they do reflex toward their original dimensions to an extent which reduces their inner diameter to a dimension that is smaller than the outer diameter of actuator head 124.

The very low cone or wedge angle itself of anvil 120, combined with the very large amount of force existing between anvil 120 and inner surface 119 of anvil 110 inhibits or discourages anvil 120 from moving from its position within the inner surface 119 of anvil 110, because of the fact that very low angle tapers are self-holding or locking, and in the absence of an axial force directed in such a way as to urge or force anvil 120 in the direction back into bore 1 and out from within inner surface 119 of anvil 110, anvil 110 will not move. For specific proportions and information on self holding tapers, I refer the reader to the *Machinery's Handbook*, fourteenth edition, published by; The Industrial Press of New York, N.Y.

In another embodiment, a small but significant modification to the present embodiment that would provide an additional mechanism to retain anvil 120 within anvil 110, would be to couple sleeve 122 to trailing surface 116 of anvil 110 in such a manner that they would form, or would effectively form, a single structure with the same significant dimensions and characteristics as the two separate pieces, i.e., an anvil similar to anvil 110 with a sleeve similar to elastically and plastically deformable sleeve 122 positioned and coupled in such a way that the alternate-anvil-with-attached-sleeve would operate identically during the actuation process, but after the completion of actuation, anvil 120 would be prevented from moving in the direction out from within inner surface 119 of anvil 110 by the portions of the sleeve portion of the alternate anvil-with-sleeve, which actuator head 124 had already passed through, elastically contracting and returning to their original diameter to some degree and gripping head 124 within.

FIG. 5.7

In FIG. 5.7 as pulling portion 6 and pushing portion 5 of the rivet tool continue to pull on stem 30 and push on outer surface 18 of head 16 respectively, with the result that the tensional force on stem 30 continues to increase and with anvil 110 wedged between inner surfaces 29A & B of fingers 14A & B, respectively, and anvil 120 wedged inside inner surface 119 of anvil 110, and neither anvil able to be moved any farther, the pressure exerted on head 16 exceeds the predetermined amount necessary to cause head 16 to plastically deform and head 16 deforms in the direction of surface 3, with the result that inner surface 17 of head 16 is firmly or even strongly pressed against surface 3. As the deformation of head 16 is plastic in nature, some portion of the force or pressure exerted upon surface 3 by inner surface 17 of head 16 will continue to bear upon outer surface 3 after the cessation of the deforming force applied to outer surface 18 of head 16 by pushing portion 5 of the rivet installation tool.

The amount of force with which inner surface 17 of head 16 presses against surface 3 is a predetermined amount which is sufficient to prevent head 16 and the portions of body 10 located between head 16 and the portions of fingers 14A & B which are strongly engaged with the wall of bore 1, from moving in any radial direction without the application of a significantly large radially directed force.

FIG. 5.8

In FIG. 5.8 it is depicted that, as the tensional force applied to stem 30 and the pressure applied to outer surface 18 of head 16 continued to be increased, the amount of tensional force applied to stem 30 exceeded the predetermined amount necessary to break stem 30 at notch 32, and stem 30 has broken. The spent portion of stem 30 has been withdrawn from inside the inner diameter of body 10 and been removed along with the pushing portion 5 and pulling portion 6 of the blind rivet installation tool.

Bidirectionally deflectable and triply articulable fingers 14A & B are extremely forcefully engaged with the wall of bore 1 in such a manner as to couple the anchor structure of the present embodiment securely and enduringly with bore 1, while inner surface 17 of head 16 applies a predetermined amount of pressure against surface 3 that is sufficient to hold head 16 radially immobile so as to improve the ability of threaded inner portion 55 of body 10 of the anchor structure to be utilized as an ancillary or secondary separable article attachment means.

Though the axially deformable article attachment means embodied by deformable head 16 was not utilized in this particular instance to secure any article to surface 3 of material 2, the term ancillary separable attachment means is appropriately applied to threaded portion 55 of body 10 as it is not the primary article attachment means, and is only useable after the actuation of the anchor structure is complete.

Fingers 14A & B have been deflected out towards and into forceful engagement with the wall of bore 1, by the application of three distinct and diminishing deflection rates, and each deflection rate has been accomplished at a distinct and increased amount of outwardly directed force or power; and the end portions of fingers 14A & B have been caused to deflect away from the wall of bore 1, by application of two inward deflection mechanisms, namely localized radial deformation and localized reduction of radial cross section. These combined mechanisms have caused the end portions of fingers 14A & B to deflect inward and behind anvil 110 to such an extent as to cause portions of inner surfaces 29A & B of fingers 14A & B, respectively, to engage the portions of outer surface 114 in close proximity to trailing surface 116 of anvil 110, in such a manner as to prevent anvil 110 from moving in the direction back into bore 1, and thus holds or locks anvil 110 in its location between fingers 14A & B.

Second anvil 120 is fully engaged with inner surface 119 of first anvil 110 and is held in position by the mutual pressure and friction between anvil 120 and inner surface 119 of first anvil 110. Second anvil 120 is exerting a very great force upon anvil 110 which in turn is exerting a very great force upon fingers 14A & B which in turn are pressed very forcefully against the walls of bore 1, and are thus coupling the anchor component of the present embodiment securely with bore 1.

FIG. 5.9

In FIG. 5.9, the previously actuated anchor structure of the present embodiment is utilized to attach or affix an article, article 4, to surface 3 of material 2 by threadedly coupling a Phillips headed screw, screw 262, not of this invention, within interiorly threaded portion 55 of body 10.

To accomplish this, article 4 was positioned such that screw 262 could be passed through some appropriate opening or hole in it, then screw 262 was passed through the hole and into threaded portion 55 of the previously actuated anchor structure, and then screw 262 was tightened against article 4 by being rotated in an appropriate direction and manner, until the desired amount of force was applied by the head of screw 262 to hold article 4 against surface 3. If necessary, Phillips screwdriver tip receiver 260 can be utilized, by inserting a Phillips screwdriver tip (not show and not of this invention) into receiver 260 and using said screwdriver to apply rotational force to screw 262 as desired.

In summary, the present embodiment, in addition to an exemplary embodiment which demonstrates an extremely useful anchor structure of the present invention, is also an excellent embodiment with which to compare some previous embodiments to isolate and clarify another characteristic of the nature of the deflection of the bidirectionally fingers of the present invention in general.

In all embodiments preceding the present embodiment, the bidirectionally deflectable fingers have been deflected outward at two different deflection rates. The fingers of the present embodiment are deflected outward by the application of three different deflection rates, which helps calls attention to a number of characteristics of the nature of the deflection of the bidirectionally deflectable fingers of the present invention.

Firstly, it is apparent that the bidirectionally delectable fingers of the present invention can be deflected outward by sequential application of two different deflection rates; secondly said fingers can also be deflected outward by sequential application of multiple deflection rates. Additionally it is possible, and may be desirable to, configure the bidirectionally deflectable fingers and actuator device of an alternate embodiment in such a manner as to cause said fingers to be deflected outward at a single deflection rate.

One way in which this could be accomplished is by configuring the bidirectionally deflectable fingers and actuator device of another alternate embodiment in such a manner as to predetermine that the portions of the force applying portion of the actuator device which bear upon said fingers only contact the portions of said fingers which comprise or will comprise the internally tapered wedge-like passage with which the force applying portion will interact to effect the outward deflection of said fingers.

In practical terms this means generally configuring the anvil in relation to the fingers in such a manner that the anvil will only contact and bear upon the inner surfaces or the edge surfaces or both of said fingers, as opposed to contacting and bearing upon the end surfaces and then contacting and bearing upon the inner surfaces or edge surfaces or both of said fingers.

In conclusion, upon consideration of the forgoing description, it is again evident that both the nature and extent of the deflections of bidirectionally deflectable fingers of the present embodiment, and the nature and extent of the engagement of said fingers with the wall of a bore, are predetermined by the specific configurations of said fingers in conjunction with the specific configuration of the actuator device with which said fingers interact.

Detailed Description of a Fifth Alternate Embodiment

The following is a detailed description of an exemplary anchor structure with internally tapered bidirectionally deflectable, doubly articulable, bore specific anvil reforming, sequentially and differentially deflected bore gripping fingers, inward deflection augmentation of the localized reduction of radial cross section mechanism by means of radially oriented grooves, an actuator with a separable plastically deformable force applying portion, nondeformable article attachment means embodied in the form of a fixed head, and ancillary separable article attachment means embodied in the form of a receiver configured to accept a push-in or snap-in fastener (not of this invention).

This embodiment has bidirectionally deflectable and doubly articulable fingers of two significantly different circumferential dimensions. It will be shown that this has a number of significant effects upon the nature and extent of the deflection of said fingers. One effect is that the wider fingers will deflect outward and contact the wall of a bore before the narrow fingers, thus making these fingers sequentially deflectable. Another effect is that the narrower fingers will be deflected inward to a greater extent than the wide fingers thus making these fingers differentially deflectable. This differential deflection effect is augmented by configuring the narrower fingers in relation to the wider fingers in a manner which allow the narrower fingers to deflect inward while at the same time preventing or hindering the wider fingers from doing so.

The fingers are additionally configured to interact with the anvil to resize or reshape or reform the anvil to a degree that is dependant upon the actual size of the bore. And to operate in conjunction with the anvil reforming fingers, the present embodiment is provided with an anvil which is substantially plastically deformable to an extent which allows it to be reformable or reshapeable or resizable.

Additionally, this embodiment utilized three inward deflection mechanisms, beam deformation, localized radial deformation, and localized reduction of radial cross-sectional area, but as a result of the specific configurations of the fingers, one combination of mechanisms act upon the wider fingers, and another combination of mechanisms act upon the narrower fingers.

One of the objects of the present embodiment is to provide an anchor structure of the present invention which can be applied to bores with diametral values which are significantly larger than the largest diameters within the normally expected range of bore diameters, in other words over sized bores, while at the same time still being applicable to bores within the normally expected range.

The following disclosure makes reference to FIG. 6.0, a perspective view of the anchor structure of the present embodiment. FIG. 6.1A, an axial cross-sectional view, which is oriented such that wider fingers 160A & B are located at the top and bottom of the drawing, respectively. FIG. 6.1B, a radial cross-sectional view of the location indicated in FIG. 6.1A. FIG. 6.1C, an axial cross-sectional view oriented such that narrower fingers 170A & B are located at the top and bottom of the drawing, respectively; and FIG. 6.1D, a radial cross section of the anchor structure at the location indicated in FIG. 6.1C.

Body 10.7

In the above cited figures it can be seen that body 10.7 is a short hollow cylinder with a stepped inner diameter. One end of body 10.7 is designated distal end 10.1 and the other end of body 10.7 ends at and joins with head 150.

The larger diameter portion of the inner diameters of body 10.7 is designated larger inner diameter 10.5; and the diameter and length of larger inner diameter 10.5 are configured to cooperate with portions of head 150, to be disclosed subsequently, to facilitate the attachment of a commercially available push-in or snap-in type fixture or fastener (not of this invention), after the completion of the actuation of the subject anchor structure.

The outer diameter of body 10.7 is slightly to substantially smaller than the diameter of the bore in which it will be actuated as the present embodiment is specifically intended and configured to be applied to bores which may have diameters which are larger than the largest diameters of the range of diameters normally expected for a hole or bore drilled in a masonry material.

Head 150

Attached to or integrally formed with the end of body 10.7 in which larger inner diameter 10.5 is located, is head 150. Head 150 is flat ring or washer shaped disk with an inner diameter that is smaller than larger inner diameter 10.5 of body 10.7, and an outer diameter that is equal to about two diameters of body 10.7. Furthermore head 150 is not configured in composition or design to be particularly plastically or elastically deformable but rather is substantially rigid.

Head 150 has an inner radial surface 152, an outer radial surface 151, a sloped outer surface 154, an outer peripheral surface 155, an inner diameter 156, a sloped inner surface 158, and an interior radial surface 153; All of which are configured in relation to each other and to larger inner diameter 10.5 of body 10.7 in such a manner as to receive and retain a push-in or snap-in fastener or fixture (not of this invention), after the actuation of the present embodiment and subsequent removal of stem 30 from the inner diameters of body 10.7.

Wider Fingers 160A & B, and Narrower Fingers 170A & B

Located at and integrally connected to distal end 10.1 of body 10.7, are wider bidirectionally deflectable and doubly articulable fingers 160A and 160B and narrower bidirectionally deflectable and articulable fingers 170A and 170B. Wider fingers 160A & B and narrower fingers 170A & B each have an inner surface, which are designated inner surfaces 162A & B and 172A & B, respectively; an outer surface, which are designated outer surfaces 164A & B and 174A & B, respectively; and an end surface, which are designated end surfaces 166A & B and 176A & B, respectively. Additionally each finger 160A & B and 170A & B has two edge surfaces, which are designated edge surfaces 163A & B and 173A & B, respectively. The intersections of edge surfaces 163A & B and inner surfaces 162A & B are designated junctures 162.1A & B, and the intersections of edge surfaces 173A & B and inner surfaces 172A & B are designated junctures 172.1A & B.

Outer surfaces 164A & B of wider fingers 160A & B, respectively, and outer surfaces 174A & B of narrower fingers 170A & B, respectively, extend away from distal end 10.1 of body 10.7 for some distance, while maintaining the same outer diameter and shape as body 10.7, and then join obliquely with finger end surfaces 166A & B and 176A & B, respectively. End surfaces 166A & B and 176A & B slant away from body 10.7 for a short distance and then join inner surfaces 162A & B and 172A & B, respectively, at sharp or well defined edges 167A & B and 177A & B, respectively.

Sharp or well defined edges 167A & B and 177A & B, and end surfaces 166A & B and 176A & B, and fingers 160A & B and 170A & B are configured in relation to each other, and in conjunction with reformable anvil 180 to cooperate with anvil 180 during the actuation process, by interacting with the outer surface 182 of anvil 180, and anvil 180 itself, to reform or reshape or redistribute or even remove some portions of anvil 180. The actual degree of sharpness, or if edges 167A & B and 177A & B are sharp to any extent, is dependent on and generally determined by the characteristics of the material or materials of which anvil 180 and fingers 160A & B and 170A & B are made.

Additionally, as will be disclosed in more detail in the operational portion of this disclosure, the amount or degree of reforming, or reshaping or resizing to which anvil 180 is subjected, and the dimensions and shape to which anvil 180 is ultimately reformed or reshaped or resized are dependant on the actual diametric dimension of the bore in which the anchor structure of the present embodiment is actuated, and the composition of anvil 180.

From sharp edges 167A & B and 177A & B, inner surfaces 162A & B and 172A & B, respectively, extend and taper inward toward body 10.7 until they join with body 10.7 at distal end 10.1 at which point their inner radial dimensions are equal to the inner diameter of said body.

Inner surfaces 162A & B and 172A & B form a tapered wedge-like passage with which anvil 180 will interact with during the actuation process. The amount of taper or slope of inner surfaces 162A & B and 172A & B is relatively large, so as to effect a relatively rapid outward deflection of fingers 160A & B and 170A & B. Furthermore the tapered wedge-like passage formed by inner surfaces 162A & B and 172A & B is regular in form, that is to say that at any axial location of inner surfaces 162A & B and 172A & B the portions intersected by a radial cross section will appear generally circular in nature, when viewed together as a whole.

Due to the fact that fingers 160A & B and 170A & B are doubly articulated, as opposed to triply articulated, the amount of taper or slope of inner surfaces 162A & B and 172A & B is increased during the actuation process due to the outward deflection of fingers 160A & B and 170A & B by an amount that is dependant on, and relative to, how far outward fingers 160A & B and 170A & B are deflected before and after they contact the wall of a bore. As a result, the factor by which the amount of the tensional force that is applied to stem 30 is multiplied and redirected in an outward direction, by the interaction of anvil 180 with the tapered wedge-like passage formed by inner surfaces 162A & B and 172A & B during the actuation process, is reduced to some extent. The extent to which said factor is reduced is dependent on, and is determined by, the actual amount that fingers 160A & B and 170A & B are deflected outward.

Edge surfaces 163A and 163B are planar in form and extend axially from the junctures of fingers 160A & B with body 10.7 at distal end surface 10.1, to end surfaces 166A & B. Edge surfaces 163A & B extend radially from outer surfaces 164A & B to connect with inner surfaces 162A & B at junctures 162.1A and 162.1B.

Similarly, edge surface 173A and 173B are planar in form and extend axially from the junctures of fingers 170A & B with body 10.7 at distal end 10.1, to end surfaces 176A & B. Planar edge surfaces 173A & B extend radially from outer surfaces 174A & B to connect with inner surfaces 172A & B at junctures 172.1A and 172.1B.

Though the relative circumferential proportions of wider fingers 160A & B and narrower fingers 170A & B may be varied over a range of proportions, in practice the width of narrower fingers 170A & B is minimized, and thus the width of wider fingers 160A & B is maximized, to the extent possible, while configuring fingers 170A & B to still be strong enough to withstand the forces to which they are subjected during the actuation process without being deleteriously affected. In other words, the width of narrower fingers 170A & B is minimized as much as possible, while making sure that fingers 170A & B are still strong enough to operate effectively during the reshaping or reforming or resizing of anvil 180 during the actuation process, and that they are strong enough that when the end portions of said fingers are deflected inward and behind anvil 180 they can effectively engage anvil 180 in a manner that will prevent anvil 180 from moving in the direction back into a bore after actuation is completed.

Although narrower fingers 170A & B are configured to withstand any forces or loads to which they may be subjected during the actuation process, it should be noted that because narrower fingers 170A & B are substantially narrower than wider fingers 160A & B they are commensurately easier to deflect and bend and to be plastically deformed as a result of any inward deflection mechanism which may act upon them.

Furthermore, aside from the differences in circumferential dimensions of wider fingers 160A & B and narrower fingers 170A & B, all the fingers both narrow and wide are practically identical in radial and axial dimensions, so that narrower finger 170A is practically identical to narrower finger 170B, and wider finger 160A is practically identical to wider finger 160B.

Relative Orientation and Composition of Fingers 160A & B and 170A & B

Wider fingers 160A & B and narrower fingers 170A & B are adjoined to distal end 10.1 of body 10.7 in such a manner that wider finger 160A is directly opposed to wider finger 160B and narrower finger 170A is directly opposed to narrower finger 170B. Additionally all the fingers are evenly disposed in relation to one another other and they are close set to one another. This finger arrangement is depicted in FIG. 6.1B and FIG. 6.1D.

Edge surfaces 163A & B and 173A & B of fingers 160A & B and 170A & B, respectively, are configured, in relation to one another and particularly in relation to any edge surface which might be directly adjacent to itself, in such a manner that if one pushes on outer surface 174A or B of a narrower finger 170A or 170B, respectively, that finger could bend inward without touching edge surfaces 163A or B of the wider fingers 160A & B that are directly adjacent to the inwardly pushed finger 170A or B, but if one pushes on outer surface 164A or B of a wider finger 160A or 160B, respectively, so as to push it inwards, edge surfaces 163A or B of the wider finger will engage or touch edge surfaces 173A or B of the narrower fingers 170A & B directly adjacent to the inwardly pushed wider finger 160A or B, and be prevented from being pushed inwards to any large extent.

The material used to make fingers 160A & B and 170A & B should be selected to not only provide the requisite characteristics necessary for the anchor structure of the present embodiment to function effectively as an anchor or fastener but to also work in cooperation with anvil 180 in the process of reforming anvil 180 during the actuation process. That is to say, fingers 160A & B and 170A & B should be configured compositionally, mechanically and geometrically, to be able to effectively cooperate with anvil 180 to reform or reshape or resize anvil 180 without being deleteriously impacted to an extent that would lessen the abilities of fingers 160A & B and 170A & B to function effectively while acting upon anvil 180 and afterwards to continue to function effectively during continued outward defection and then inward deflection as the actuation process continues.

To meet these requirements, fingers 160A & B and 170A & B are generally made of a material that is at least as strong and hard as the material used to make anvil 180, and is usually somewhat or even much stronger and harder than the material of anvil 180, so that fingers 160A & B and 170A & B can be pushed upon by portions of anvil 180 during the actuation process and cause portions of anvil 180 to be displaced or moved or even removed, and said fingers themselves not be bent or deformed or broken.

Fingers 160A & B and 170A & B of the present embodiment, are made of mild steel and may be work hardened to whatever extent may be desired or may be incidental to the formation processes which are utilized to form them, though they can be made out of any other metal or materials that exhibit the requisite characteristics to function effectively as deflectable, articulable and anvil reforming fingers.

Outward Articulation Grooves 161A and 161B, and 171A and 171B

On outer surfaces 164A & B and 174A & B of fingers 160A & B and 170A & B, respectively, located at or near to the junctions of fingers 160A & B and 170A & B with body 10.7 at distal end 10.1, are outward articulation grooves 161A & B and 171A & B, respectively. Outward articulation grooves 161A & B and 171A & B are configured to facilitate the outward articulation of fingers 160A & B and 170A & B and to tend to minimize and localize any unwanted deformation or distortion of fingers 160A & B and 170A & B which might result from their being outwardly articulated during the actuation process.

Inward Deflection Grooves 168A and 168B, and 178A and 178B

Located on outer surfaces 164A & B and 174A & B of fingers 160A & B and 170A & B, respectively, are a plurality of inward deflection grooves 168A & B and 178A & B, respectively.

Beginning at locations near to or at the junctures of outer surfaces 164A & B and 174A & B with end surfaces 166A & B and 176A & B, respectively, grooves 168A & B and 178A & B are arranged in close set radially oriented patterns which extend over outer surfaces 164A & B and 174A & B toward body 10.7, and terminate at locations some small distances from outward articulation grooves 161A & B and 171A & B, respectively.

Inward deflection grooves 168A & B and 178A & B are the radial counter parts of axially oriented inward deflection grooves 27A & B disclosed in the first alternate embodiment of the present invention. Grooves 168A & B and 178A & B augment the inward deflection of the end portions of their respective fingers, in effect, by allowing the outer surfaces of their respective fingers to be plastically and/or elastically deformable by application of a substantially reduced amount of force, in a manner which locally reduces the radial dimensions of the radial cross-sectional areas, that is to say the thickness, of portions of said fingers.

Radially positioned inward deflection grooves 168A 7 B and 178A & B function and operate on the same principles and mechanisms of their axially oriented counterparts described in reference to the first alternate embodiment, to augment the extent of the inward deflection of the end portions of fingers 160A & B and 170A & B and to predetermine the nature and extent of the engagement of said fingers with the wall of a bore. Furthermore, the radially oriented configuration of grooves 168a & B and 178A & B and specifically the configurations of said grooves themselves, being substantially equal to one another in axial dimensions, results in the portions, or amounts, of outer surfaces 164A & B and 174A & B located between their said respective grooves which actually contact the wall of a bore, being substantially equal portions, or equal amounts, over the totality of the axial dimensions of said grooves, that is to say from near to end surfaces 166A & B & 176A & B to locations some small distance from outward articulation grooves 161A & B and 171A & B. As a result, the amount of force necessary to cause said portions of said outer surfaces to be crushed is substantially the same amount of force, wherever said amount of force is applied over the totality of the axial dimensions of said grooves.

Body 10.7, head 150 and fingers 160A & B and 170A & B comprise the anchor component of the present embodiment.

Actuator Stem 30 and Actuator Head 31

Though actuator stem 30 has been previously disclosed, along with actuator head 31, notch 32 and upset portion 34, in this embodiment notch 32 is located on stem 30 at a distance from head 31 somewhat greater than the axial dimension of anvil 180.

The diameter of actuator head 31 of the present embodiment is some amount smaller than the diameter of the opening between finger end surfaces 166A & B and 176A & B, Head 31 is configured to push anvil 180 against and subsequently between said end surfaces. As the characteristics of anvil 180 and said end surfaces may encompass a wide range of variables, head 31 may be configured appropriately.

Reformable Anvil 180

Reformable anvil 180 is generally shaped like a short regular cone with a concentrically located bore. Anvil 180 has a substantially tapered leading outer surface, which is designated leading outer surface 182; a trailing outer surface, which is designated trailing outer surface 184; a concentrically located axial bore, which is designated inner surface 186. The intersection of leading outer surface 182 and trailing surface 184 is designated apex 188. The diameter of inner surface 186 is slightly larger than the diameter of stem 30 and the outer diameter of trailing surface 184 is usually about equal to the outer diameter of body 10.7.

Anvil 180 is configured in shape and form and dimensions in conjunction with the mechanical properties of the material of which it is made, and in conjunction with actuator head 31, and fingers 160A & B and 170A & B, and finger end surfaces 166A & B and 176A & B, and sharp junctures 167A & B and 177A & B of fingers 160A & B and 170A & B, respectively, in such a manner as to allow anvil 180 to be reformed, or reshaped or resized by interacting with finger end surfaces 166A & B and 176A & B and sharp junctures 167A & B and 177A & B of fingers 160A & B and 170A & B, respectively, and fingers 160A & B and 170A & B themselves, during the actuation process of the anchor structure.

To facilitate the forgoing configurational prerequisites, anvil 180 is substantially plastically deformable, that is to say that said anvil is configured in form and composition to exhibit substantially plastic deformation when subjected to a certain and relatively low amount of force. Furthermore, the extent or degree of the plastic deformability of said anvil is such that it can be reformed or reshaped or resized by the appropriately configured portions of fingers 160A & B and 170A & B and said fingers themselves.

With that said, and as an example only and not to limit the possible materials which can be used to form anvil 180, said anvil of the present embodiment is comprised of aluminum or a relatively soft alloy of aluminum, preferably an alloy which does not age harden, as this could negatively affect the desired degree of plasticity of said material over a period of time. Other possible materials of which said anvil could be comprised include, but are not limited to, tin, lead, antimony, copper, brass, iron, and compositions and alloys of the forgoing.

Reformable anvil 180 in assembly with actuator stem 30, notch 32, and upset portion 34 comprise the actuator device of the present embodiment.

Operational Description of a Fifth Alternate Embodiment

The following operational description makes reference to FIG. 6.2 through FIG. 6.8.

FIG. 6.2

FIG. 6.2 is an axial cross sectional view oriented such that narrow finger 170A is positioned nearer to the top of the drawing while narrow finger 170B is positioned nearer to the bottom of the drawing.

In FIG. 6.2 the anchor structure of the present embodiment is depicted having been inserted into an oversized bore, which is designated bore 1.5, in a solid material, material 2, which has an outer surface, surface 3. Inner surface 152 of head 150 is in contact with outer surface 3, while outer surface 151 of head 150 is being pressed upon by the pushing portion, pushing portion 5, of a blind rivet installation tool with whatever amount of pressure that may be necessary to position said tool, while actuator stem 30 is engaged by the pulling portion, pulling portion 6, of the same tool. The anchor structure of the present embodiment is ready to be actuated within and subsequently coupled with oversized bore 1.5.

FIGS. 6.3A, 6.3B, 6.3C and 6.3D

FIGS. 6.3A, B, C, & D are all different views of the same interval. FIGS. 6.3A & C are axial cross sections and FIGS. 6.3B & D are radial cross sections of the locations indicated in FIGS. 6.3A & C.

In FIGS. 6.3A, B, C, & D it is depicted that as pulling and pushing force are applied appropriately as indicated by arrows 5A and 6A, stem 30 pulls actuator head 31 which pushes reformable anvil 180 toward fingers 160A & B and 170A & B. In a short time portions of the tapered leading surface 182 of anvil 180 are pushed into contact with sharp edges 167A & B and 177A & B of fingers 160A & B and 170A & B, respectively. As leading surface 182 presses upon sharp edges 167A & B and 177A & B, they are deflected apart and out toward the wall of bore 1.5 and cause fingers 160A & B and 170A & B to articulate outward at articulation grooves 161A & B and 171A & B. This first outward deflection is at a relatively rapid rate and because leading surface 182 of anvil 180 initially contacts sharp edges 166A & B and 176A & B simultaneously, fingers 160A & B and 170A & B are initially deflected outward simultaneously. Furthermore because all fingers are evenly disposed in their relative positions, wider fingers 160A & B are deflected in opposite directions in relation to each other, and narrower fingers 170A & B are deflected in opposite directions to each other, and the directions that wider fingers 160A & B are deflected are perpendicular to the directions that narrower fingers 170A & B are deflected. Furthermore, the directions that all said fingers are deflected in are substantially perpendicular to the direction in which said fingers were moved to be inserted into oversized bore 1.5.

As fingers 160A & B and 170A & B continue to be deflected and articulated outward, the interaction of the tapered leading surface 182 of anvil 180 with sharp edges 167A & B and 177A & B changes as the diameters of the portions of the tapered leading surface 182 which contact the sharp edges increases in diameter. As portions of increasing diameter of tapered leading surface 182 continue to be drawn further between fingers 160A & B and 170A & B and the fingers continue to deflect outward, it is the portions of sharp edges 167A & B and 177A & B of fingers 160A & B and 170A & B, respectively, that are in close proximity to or at junctures 162.1A & B and 172.1A & B, respectively that contact and are deflected outward by the advancing leading surface 182 of anvil 180.

Anvil 180 continues to deflect fingers 160A & B and 170A & B outward by pressing tapered leading surface 182 against the portions of sharp edges 167A & B and 177A & B that are in close proximity to junctures 162.1A & B and 172.1A & B until some portions of outer surfaces 164A & B of fingers 160A & B, respectively, that are directly adjacent to end surfaces 166A & B are forced into contact with the wall of bore 1.5.

FIGS. 6.3A, 6.3B, 6.3C and 6.3D are all depictions of the interval at which some portions of outer surfaces 164A & B located directly adjacent to end surfaces 166A & B of fingers 160A & B, respectively, contact the wall of bore 1.5. By comparison of FIG. 6.3A and FIG. 6.3B, the orientation of which allows observation of wider fingers 160A & B, with FIGS. 6.3C and 6.3D, the orientation of which allows observation of narrower fingers 170A & B, it can be clearly seen that portions of wider fingers 160A & B come into contact with the wall of bore 1.5 before any portions of narrower fingers 170A & B contact the wall of bore 1.5.

The sequential manner in which outer surfaces 164A & B and 174A & B contact the wall of bore 1 is a result of the fact that as wider fingers 160A & B and narrower fingers 170A & B interact with the tapered leading surface of anvil 180 they exhibit significantly different effective radial dimensions; and the effective radial dimensions of wider fingers 160A & B are larger than the effective radial dimensions of narrower fingers 170A & B.

The term effective radial dimensions is used to refer to the radial dimensions of a finger 160A or B or 170A or B when measured radially from the locations or points at which they contact leading outer surface 182 of anvil 180 to the most radially distant portion of that finger being measured.

Specifically, because the radial dimension of wider finger 160A measured from the locations that wider finger 160A contacts leading outer surface 182 at the intersections of sharp edges 167A & B with junctures 162.1A & B, measured to the portions of outer surface 164A which are most radially distant, is a larger dimension than the radial dimension of narrower finger 170A measured from the locations that narrower finger 170A contacts leading outer surface 182 at the intersections of sharp edges 177A & B with junctures 172.1A & B measured to the portions of outer surface 174A which are most radially distant.

Additionally, because wider fingers 160A & B are practically identical and narrower fingers 170A & B are practically identical, the effective radial dimensions of finger 160B and finger 170B are equal to the effective radial dimensions of fingers 160A and 170A, respectively. Thus wider fingers 160A & B will deflect outward and contact the wall of bore 1.5 before narrower fingers 170A & B.

After the portions of outer surfaces 164A & B directly adjacent to end surfaces 166A & B respectively contact the wall of bore 1.5, and as a result can not be deflected outward any farther, the portions of sharp edges 167A & B in contact with leading surface 182 of anvil 180 begin to reform or reshape or resize anvil 180, as anvil 180 continues to be pressed or drawn forcefully against sharp edges 167A & B by actuator head 31 which is being pulled by stem 30 which is being pulled by pulling portion 6 of the rivet installation tool.

As leading surface 182 of anvil 180 is forced against sharp edges 167A & B, anvil 180 is reformed or reshaped or resized by sharp edges 167A & B preventing the portions of anvil 180 with which they are in contact from being pulled along with anvil 180. Anvil 180 reforms or reshapes or resizes to an extent that allows the portions of anvil 180 not in contact with the sharp edges 167A & B to be driven a little farther in the direction out of bore 1.5 and in between fingers 160A & B and 170A & B. As anvil 180 moves, and sharp edges 167A & B continue to reform, or reshape or resize anvil 180, end surfaces 166A & B may come into contact with portions of leading surface 182 of anvil 180 as well, with the result that any portions of anvil 180 or leading surfaces 182 of anvil 180 which come into contact with end surfaces 166A & B will be prevented from moving along with the portions of anvil 180 not in contact with end surfaces 166A & B or sharp edges 167A & B.

FIGS. 6.4A, 6.4B, 6.4C, and 6.4D

In a very short time anvil 180 is driven, being reformed, or reshaped or resized as it progresses, far enough in between fingers 160A & B and 170A & B, for the portions of junctures 172.1A & B of fingers 170A & B which are in contact with leading surface 182 of anvil 180 to deflect the portions of outer surfaces 174A & B in close proximity to end surfaces 176A & B respectively, outward and into contact with the wall of bore 1.5.

FIGS. 6.4A, B, C, & D all depict the interval at which the portions of outer surfaces 174A & B in close proximity to end surfaces 176A & B of fingers 170A & B, respectively, come into contact with the wall of bore 1.5. The initial deformations of the portions of anvil 180 which are in contact with wider fingers 160A & B can be observed in FIGS. 6.4A & B, while FIGS. 6.4C & D depict that portions of narrower fingers 170A & B have only contacted the wall of bore 1.5 and have not yet begun to reform or reshape or resize anvil 180.

At this time, because sharp edges 177A & B and end surfaces 176A & B of fingers 170A & B respectively, can not be deflected outward any further, they begin to act upon outer surface 182 of anvil 180 in the same manner as sharp edges 167A & B and end surfaces 166A & B of fingers 160A & B, respectively, preventing those portions of anvil 180 and leading surface 182 of anvil 180 with which they are in contact from being driven along with those portions of anvil 180 and outer surface 182 of anvil 180 not in contact with sharp edges 177A & B or 167A & B or end surfaces 176A & B or 166A & B.

One significant result of the sequential nature of the interaction of sharp edges 167A & B and portions of end surfaces 166A & B beginning to reform or reshape or resize anvil 180 before sharp edges 177A & B and portions of end surfaces 176A & B, is that the amount of force necessary to effect the reformation or reshaping or resizing of anvil 180 is distributed somewhat over a period of time, so that the peak amount of force necessary may be reduced to some extent.

The reforming or reshaping or resizing of anvil 180 by sharp edges 167A & B and 177A & B and possibly end surfaces 166A & B and 176A & B, continues as anvil 180 continues to be driven in the direction out of bore 1.5 and against said sharp edges and end surfaces.

The continued deformation of anvil 180 results in those portions of anvil 180 in close proximity to sharp edges 167A & B and 177A & B, and possibly end surfaces 166A & B and 176A & B, being deformed or reformed or relocated, if you will, out of, or from, their original positions or locations in or on anvil 180 to new positions or locations in or on anvil 180, which are generally farther from the juncture of leading outer surface 182 and inner surface 186 of anvil 180. That is to say that generally, those portions of anvil 180 that are displaced or relocated, are displaced or relocated in the direction toward trailing surface 184 of anvil 180. Additionally portions of trailing surface 184 itself are bent or pushed or otherwise moved in the direction away from the juncture of leading outer surface 182 with inner surface 186, though some portions of anvil 180 may actually be severed from anvil 180 by sharp edges 167A & B and 177A & B.

To restate; some outer portions of anvil 180 are stopped by sharp edges 167A & B and 177A & B and end surfaces 166A & B and 177A & B, while the rest of anvil 180 is forced between fingers 160A & B and 170A & B by actuator head 31, thus the outer portions of anvil 180 are pushed back toward trailing surface 184, which is itself forced in the direction away leading surface 182. During the reformation or reshaping or resizing of anvil 180, some outer portion or portions of anvil 180 might actually be removed or severed from anvil 180, dependent upon the configuration and composition of anvil 180, finger end surfaces 166A & B and 176A & B, and sharp edges 167A & B and 177A & B.

FIG. 6.5

In the interests of brevity and expediency, the remainder of this disclosure utilizes only one figure for each interval described. As narrower fingers 170A & B undergo a significantly greater amount of inward deflection and inward articulation, all of the figures utilized are axial cross sectional views in which narrower finger 170A is positioned near the top of the drawing and narrower finger 170B is positioned nearer to the bottom of the drawing.

In FIG. 6.5 it is depicted that the sustained force applied to anvil 180 by actuator head 31 which is drawn by stem 30, while outer surface 151 of head 150 is held in position, has resulted in anvil 180 being drawn farther in between fingers 160A & B and 170A & B. The outer portions of anvil 180, and leading surface 182 of anvil 180, which where in contact with sharp edges 167A & B and 177A & B, and end surfaces 166A & B and 176A & B, have been reformed or reshaped or resized, to such an extent that the portions of anvil 180 not in contact with sharp edges 167A & B and 177A & B and end surfaces 166A & B and 176A & B are being driven in between fingers 160A & B and 170A & B, and are now be in contact with inner surfaces 162A & B and 172A & B and junctures 162.1A & B and 172.1A & B of fingers 160A & B and 170A & B, respectively. As a result, partially reformed or reshaped or resized anvil 180 begins to interact with the tapered wedge-like passage formed by junctures 172.1A & B and 162.1A & B and inner surfaces 172A & B and 162A & B, and begins to generate outwardly directed force which begins to press outer surfaces 174A & B and 164A & B strongly against the wall of bore 1.5. Additionally, the outward deflection of fingers 160A & B and 170A & B continues at a reduced deflection rate.

From the point or interval at which the now at least partially and possibly mostly reformed or reshaped or resized anvil 180 is driven past sharp edges 167A & B and 177A & B and is in contact with inner surfaces 162A & B and 172A & B, and junctures 162.1A & B and 172.1A & B, the majority of any reforming or reshaping or resizing that anvil 180 may yet undergo, will be the result of the increasing radial pressure generated by the wedge mechanics associated with deformed anvil 180 being driven in between the tapered wedge-like passage formed by inner surfaces 162A & B and 172A & B and junctures 162.1A & B and 172.1A & B of fingers 160A & B and 170A & B, respectively.

Additionally, as the amount of outwardly directed force generated by the interaction of anvil 180 with junctures 162.1A & B and inner surfaces 162A & B of fingers 160A & B, respectively, and junctures 172.1A & B and inner surfaces 172A & B of fingers 170A & B respectively, has increased substantially and is being applied to the appropriate portions of fingers 160A & B and 170A & B so that the end portions of wider fingers 160A & B begin to deflect inward due to both the beam deformation mechanism and the localized radial deformation mechanism, while the end portions of narrower fingers 170A & B are deflected inward predominantly by the beam deformation mechanism.

The reason that narrower fingers 170A & B do not undergo, or undergo a very limited amount of, inward deflection due to the outward radial deflection and deformation of the relevant portions of said fingers, i.e. the localized radial deformation mechanism, is because inner surfaces 172A & B are narrow enough that junctures 172.1A & B of each finger 170A & B are close enough to each other that bending and plastically deforming junctures 172.1A & B outward requires a substantially greater amount of force than bending and deforming junctures 162.1A & B of wider fingers 160A & B outward, with the result that any amount of inward deflection of narrower fingers 170A & B due to the radial deflection deformation mechanism is minimal in comparison to the amount that wider fingers 160A & B undergo as a result of the same amount of appropriately applied force.

Despite this apparent disparity in application of inward deflection mechanisms, that is to say that narrower fingers 170A & B being acted upon by only one mechanism while wider fingers 160A & B are acted upon by two mechanisms, narrower fingers 170A & B deflect inward a substantial amount more than wider fingers 160A & B, because narrower fingers 170A & B, being narrower than wider fingers 160A & B, are more easily deflected and bent and plastically deformed than the wider fingers.

Additionally, when the end portions of fingers 170A & B located between end surfaces 176A & B and anvil 180 begin to deflect away from the wall of bore 1.5, they may be deflected inward without contacting edge surfaces 163A & B of fingers 160A & B. In the event that edge surfaces 173A & B of the inwardly deflected end portions of fingers 170A & B do contact edge surfaces 163A & B of fingers 160A & B, the end portions of fingers 170A & B will continue to be deflected inward because edge surfaces 173A & B of said fingers and edge surfaces 163A & B of fingers 160A & B are configured in such a manner as to enable the inward deflection of the end portions of fingers 170A & B and to impede the inward deflection of the end portions of fingers 160A & B.

In contrast, when the end portions of fingers 160A & B located between end surfaces 166A & B and anvil 180 begin to deflect inward, edge surfaces 163A & B of fingers 160A & B respectively, impact upon edge surfaces 173A & B of fingers 170A & B respectively, and are prevented from deflecting any farther inward.

FIG. 6.6

In FIG. 6.6 it is depicted that significantly reformed or reshaped or resized anvil 180 has been driven farther in between inner surfaces 162A & B and 172A & B and junctures 162.1A & B and 172.1A & B, with the result that fingers 160A & B and 170A & B have been forcefully deflected outward and have been caused to articulate outward at outward articulation grooves 161A & B and 171A & B, respectively, somewhat more. The outward pressure applied to fingers 160A & B and 170A & B by reformed anvil 180 pressing upon inner surfaces 162A & B and 172A & B, and junctures 162.1A & B and 172.1A & B, is forcing portions of outer surfaces 164A & B and 174A & B between inward articulation grooves 168A & B and 178A & B into forceful contact with the wall of bore 1.5.

The amount of outwardly directed force being generated and applied to fingers 160A & B and 170A & B is sufficient to cause the inward deflection mechanism of localized reduction of radial cross section to begin to contribute to the inward deflection of the end portions of both wider fingers 160A & B and narrower fingers 170A & B.

As the outward directed force presses the portions of outer surfaces 164A & B and 174A & B between grooves 168A & B and 178A & B respectively, and which are in close proximity to anvil 180 against the wall of bore 1.5, some of these portions are crushed in a manner which reduces their radial cross sections so that the portions directly adjacent to the crushed portion but not themselves crushed push upon the wall of bore 1.5 and cause the end portions of fingers 160A & B and 170A & B to deflect inward and behind anvil 180.

It is notable that neither wider fingers 160A or B nor narrower fingers 170A or B are affected to any significant extent by the shear force deflection mechanism. This is because the anchor component of the present embodiment is configured to produce a lower amount of outwardly directed force than is normally necessary to cause said mechanism to effect said fingers to any significant extent, additionally, anvil 180 is substantially more plastically deformable than said fingers, so that an application of a sufficient amount of force by anvil 180 to cause the inward deflection of the end portions of said fingers by the shear force mechanism is a practical improbability.

As farther inward deflection of the end portions of wider fingers 160A & B is impeded by edge surfaces 163A & B of wider fingers 160A & B, respectively, impinging on the edge surfaces 173A & B of narrower fingers 170A & B, respectively, the end portions of wider fingers 160A & B are prevented from being deflected inward or at least are prevented from being deflected inward as much as they would if unimpeded, while the end portions of narrower fingers 170A & B, are deflected farther inward with the result that portions of narrower fingers 170A & B located between finger end surfaces 176A & B and anvil 180 are caused to articulate inward at locations in close proximity to and behind anvil 180.

Also of note in the interval depicted in FIG. 6.6, is the fact that as the pressure increases between anvil 180 and fingers 160A & B and 170A & B, the pressure causes anvil 180 to be reformed or reshaped or resized somewhat more, and the deformation, of whichever form, may be sufficient, especially if anvil 180 is composed of a very soft material, to cause inner surface 186 of anvil 180 to press in upon or pinch stem 30.

FIG. 6.7

In FIG. 6.7 it is depicted that pulling portion 6 and pushing portion 5 of the rivet installation tool continued to appropriately apply pushing and pulling forces to the appropriate portions of the anchor structure, with the result that anvil 180 has been reformed or reshaped or resized somewhat more as it has been driven farther between fingers 160A & B and 170A & B.

In addition, fingers 160A & B and 170A & B have been deflected outward and caused to articulate outward somewhat more at outward articulation grooves 161A & B and 171A & B, respectively, as anvil 180 has interacted with the tapered wedge-like passage formed by inner surfaces 162A & B and 172A & B and junctures 162.1A & B and 172.1A & B of said fingers. As a result, portions of outer surfaces 164A & B and 174A & B of said fingers, are being forced or driven against the wall of bore 1.5 with an increased amount of force.

The increased force has caused more inward deflection and articulation of portions of fingers 170A & B located between end surfaces 176A & B and anvil 180. The end portions of fingers 170A & B which have been deflected inward, have been deflected inward a sufficient amount to cause portions of inner surfaces 172A & B to engage portions of the outer diameter of reformed anvil 180, and possibly portions of actuator head 31, especially if portions of anvil 180 were torn or sheared off during the reforming or reshaping or resizing of anvil 180, in such a manner as to prevent anvil 180 from moving in the direction back into bore 1.5. Anvil 180 has been drawn between fingers 160A & B and 170A & B to the point that it is jammed in place and can not practically be drawn or driven any farther in the direction out of bore 1.5.

As the tensional force applied to stem 30 continued to increase, the predetermined amount of force necessary to break stem 30 at notch 32 was exceeded, and stem 30 broke at said notch. The spent portion of stem 30 has been withdrawn from body 10.7 and portions 5 & 6 of the rivet tool have been removed.

Reformable anvil 180 has been reformed or reshaped or resized to a particular shape or size which has been determined by the actual diameter of bore 1.5, during the process of deflecting and articulating fingers 160A & B and 170A & B outward and into contact with bore 1.5. Furthermore, wider fingers 160A & B contacted the wall of bore 1.5 before narrower fingers 170A & B, reducing the peak amount of force necessary to reform anvil 180.

Reformed or reshaped or resized anvil 180 is jammed firmly between inner surfaces 172A & B and 162A & B, which forces outer surfaces 174A & B and 164A & B of fingers 170A & B and 160A & B, respectively, into forceful contact with the wall of bore 1.5, and simultaneously inner surface 186 of anvil 180 is pressing inward upon the portion of actuator stem 30 which is positioned within inner surface 186, in such a manner as to prevent the portion of stem 30 and actuator head 31 from moving in any direction.

Both narrower fingers 170A & B and wider fingers 160A & B, have deflected outward and been articulated outward at outward articulation grooves 161A & B and 171A & B, respectively, and into forceful contact the wall of bore 1.5 and then the end portions of fingers 170A & B and to a lesser extent fingers 160A & B and have been deflected away from the wall of bore 1.5, and were articulated inward, at or near to some of inward articulation grooves 168A & B and 178A & B by the application of different combinations of three inward deflection mechanisms, namely beam deformation, localized radial deformation, and localized reduction of radial cross section.

Additionally, though narrower fingers 170A & B have been deflected and articulated inward by application of the beam deformation mechanism and the localized reduction of radial cross section mechanism, whereas wider fingers 160A & B have been acted upon the localized radial deformation mechanism in addition to both aforesaid mechanisms, narrower fingers 170A & B have deflected inward to a greater extent than wider fingers 160A & B. This is due to narrower fingers 170A & B, being narrower than wider fingers 160A & B, resist the effects of the inward deflective mechanisms less than wider fingers 160A & B. Furthermore edge surfaces 173A & B of narrower fingers 170A & B, respectively, have impeded the inward deflection and articulation of wider fingers 160A & B. As a result the end portions of narrower fingers 170A & B have been deflected inward to an extent that inner surfaces 172A & B of said portions are engaged with anvil 180 in a manner which prevents said anvil from moving in the direction back into bore 1.5, so that anvil 180 is effectively restrained between outwardly and inwardly deflected portions of fingers 170A & B and thus the anchor structure of the present embodiment is coupled with oversized bore 1.5.

Head 150 is positioned directly adjacent to, and possibly in contact with, surface 3 of material 2, but is applying no more force or pressure to surface 3 than whatever amount has been applied to position the rivet installation tool prior to the actuation process.

FIG. 6.8

FIG. 6.8 depicts the head portion only of the anchor structure of the present embodiment, the bore gripping portions of which are firmly affixed within bore 1.5. A push-in or snap-in device, the type with a resilient probe or projection, such as the hook-like device 159 (not of this invention) has been positioned appropriately and the resilient probe portion has been urged through inner diameter 156 of head 150 so that the resilient probe portion of snap-in device 159 has engaged the sloped inner surface 158 of head 150 and thus holds snap-in device 159 in place against outer surface 151 of head 150. Snap-in device 159 could be decorative or functional or both and because of the ease of installation, removal and replacement of snap-in devices, the applications for seasonal decorations seem obvious, along with numerous other applications requiring a temporary, semi permanent, or even permanent attachment of decorative or functional items such as lights, signs, wires, cables, tubing, and the like.

In summation, the configurations of wider fingers 160A & B and narrower fingers 170A & B have been demonstrated to predetermine the nature and extent of the deflections of said fingers in such manners that said wider and narrower fingers have been deflected outward and inward in significantly different manners, have been acted upon by different combinations of inward deflection mechanisms, have been affected to differing degrees by those the inward deflection mechanism which have been applied, and have been deflected inward to significantly different extents. Furthermore, the divergent configurations of said wider and narrower fingers have caused the nature of the deflections of said fingers to be sequential, in addition to differential, in nature.

Furthermore, the configuration of outer surfaces 164A & B and 174A & B, with inward reflection grooves 168A & B and 178A & B, respectively, has not only resulted in augmenting the extent to which the end portions of fingers 160A & B and 170A & B have been inwardly deflected, said grooves have also contributed to predetermining the nature and extent of the engagement of said fingers with the wall of bore 1, by allowing the portions of said outer surfaces which contacted and engaged with said wall to be deformed to a greater extent against said wall, with the result that the friction between said fingers and said wall is substantially increased, and thus the amount of force necessary to pull said fingers from said bore has been substantially increased.

Detailed Description of a Sixth Alternate Embodiment

This alternate embodiment is an exemplary anchor structure which has an anchor component that has compositely constructed externally tapered bidirectionally deflectable and doubly articulated bore gripping fingers. That is to say that the bore gripping fingers of the anchor component are composed of separate finger portions which when assembled together, form gripping fingers.

To present the gist of this embodiment the composite form will be applied to an anchor component which is very similar to the anchor component of the preferred embodiment in both general shape and operation. However the composite form disclosed in reference to this embodiment can and probably will be applied to other embodiments of the present invention, as the benefits relating to, and as a result of, the composite form of the present embodiment are far reaching.

Although appropriately configured anchor components and actuator devices of other embodiments can be assembled together to provide an anchor structure of the present invention which is configured for application to a specific bore, the composite form of the anchor component of the present embodiment which can be assembled from selected interchangeable modules at the time and place of use, if so desired, and which then is assembled with a selected actuator device, allows an anchor structure to be more closely configured for a specific application. Additionally the modular format of assembly allows a limited number of components to be configured for application to a wider range of bore anchorage requirements, thus reducing manufacturing, inventory and distribution costs.

The composite anchor component of the present embodiment is comprised of, or constituted from, separate members or components which are then assembled together to form or make or constitute an operable and functional composite anchor component, which is still separable into its original constituent members or components. In another alternate embodiment, a compositely formed anchor component could be appropriately configured in such a manner that the separate members or components constituting the anchor component, after having been assembled together to constitute an operable and functional composite anchor component, could be permanently joined together in some appropriate fashion which would allow the composite anchor component to still operate and function in manner which is a practically identical to the manner in which a composite anchor component comprised of separable members operates and functions, while in fact it would be an anchor component comprised of separate but not separable members.

As will be seen, the composite fingers of the present embodiment are acted upon by two of the four inward deflection mechanisms, the actuator device is comprised of an integrally formed actuator stem and anvil, and fixed or nondeformable article attachment means are provided.

In addition, the nondeformable head of the composite anchor component is configured with orientation indicia which allow the anchor structure to be radially oriented within a bore, before or after insertion into a bore, in preparation for actuation of said anchor structure. This feature is related to the directionality of the anchor structures of the present invention, mentioned previously, and will be utilized to decrease the probability of breakage of the material of a bore due to the application of bore gripping forces during the actuation process.

Aside from the aforementioned specific aspects of the present embodiment, said embodiments presents numerous additional specific ways in which the bidirectionally deflectable fingers and actuator device of the present invention may be configured to predetermine the nature and extent of the deflection of said fingers, in addition to predetermining the nature and extent of the engagement of said fingers with the wall of a bore.

Description of the Modules of the Anchor Structure

The following detailed descriptions make reference to FIG. 7.0A which is a perspective view, FIG. 7.0B, which is an exploded perspective view, FIG. 7.1A, which is an axial cross-sectional view, FIG. 7.1B, and FIG. 7.1C, which are radial cross sections of the locations indicated in FIG. 7.1A.

An anchor structure of the present embodiment is comprised of three modules, an actuator module, a body module, and a finger sleeve module, which are assembled together to form a single anchor structure. The characteristics of each type of module can be configured to impart specific characteristics to the anchor structure as a whole.

Actuator Modules 238

Actuator modules 238 are comprised of an actuator stem 30, a notch 32, an upset portion 34, and an anvil 40. Actuator module 238 is the actuator device of the present embodiment. Stem 30 transfers tensional force from a blind rivet installation tool to anvil 40 which applies the force to the composite bidirectionally deflectable fingers of the present embodiment.

The characteristics of actuator module 238, such as the diameter and length of actuator stem 30, the specific geometry and diameter of anvil 40, the dimensions and relative location of upset portion 34 and the specific location and characteristics of notch 32, including the predetermined amount of force necessary to break stem 30 at notch 32, can be varied within the perimeters of their respective descriptions as presently and previously disclosed, from one actuator module 238 to another actuator module 238.

Variants of Actuator Module 238; Actuator Modules 238W, 238M, and 238S

For illustrative purposes three different actuator modules 238 will be produced that vary only in the amount of tensional force necessary to cause actuator stem 30 to be broken at notch 32. The resulting three variants of actuator module 238 are designated in accord with their relative and respective characteristics as follows; weaker actuator module 238W, medium actuator module 238M, and stronger actuator module 238S. Aside from the amount of intentional weakening of stem 30 at notch 32, all actuator module variants are practically interchangeable.

For illustrative purposes a plurality of each actuator variant 238W, 238M and 238S are formed or manufactured, and are retained in an illustrative inventory, a virtual inventory, so to speak. In this manner these modules are made available to be reviewed and selected from, and if selected, incorporated into an anchor structure of the present embodiment.

Furthermore, each actuator module variant 238W, 238M, and 238S, is marked in such a manner as to make it easily differentiated from other variants of module 238.

Note that for the purposes of expediency and brevity, drawings are not provided of all illustrative variations mentioned, as the gist of the matter is related more to the provision of alternate interchangeable modules of the various modules than to the actual variations of the modules themselves.

Body Modules 236

A body module 236 is comprised of a body 10, a head 250, an inner finger ring 212, and one each inner finger integrant 200A & 200B.

Body 10

Body 10 is a hollow cylinder with a proximal end surface 11, and a distal end surface 214. The outer diameter of body 10 is somewhat less than the diameter of the bore in which the present embodiment is to be actuated. The inner diameter of body 10 is a little larger than the outer diameter of stem 30. Around the outer circumference of body 10 at proximal end surface 11 is a radially enlarged ring or disk shaped member, head 250.

Distal end surface 214 is a generally flat radial surface that extends from the outer diameter of body 10 to the outer surface of inner finger ring 212. Located on end surface 214 of body 10 is index denticle or bump 215.

Index denticle 215 is a small bump or tooth or otherwise shaped protrusion positioned on end surface 214 of body 10, which is configured to cooperate with and fit inside an appropriately shaped index indent or recess 217, which is located in end surface 233 of outer finger integrant retainer ring 232, during and after the assembly of the portions of the present embodiment.

Index denticle 215 extends from the outer diameter of body 10 to the outer surface of inner finger ring 212 and is located and positioned on end surface 214 in such a way as to occupy a location that is adjacent to outer surface 202A of inner finger integrant 200A, and is equidistant from edge surfaces 208A & B of inner finger integrant 200A.

The purpose of index denticle 215 is that, when in cooperation with a properly located and reciprocally configured index indent 217, to be able to radially align inner finger integrants 200A & B with outer finger integrants 220A & B in a reliable manner, during the assembly of the modules of the present embodiment.

Head 250

Head 250 is disk or washer-shaped member with an inner radial surface 252, an outer radial surface 251, and an outer peripheral edge surface 254. Outer surface 251 is flush or even with proximal end surface 11 of body 10. Outer surface 251 of head 250 is the surface that will be pressed upon by the pushing portion of a blind rivet installation tool during the actuation process. Located on outer edge surface 254 of head 250 are orientation indicia 253A and 253B.

Orientation indicia 253A & B are notches or grooves or marks which are directly radially opposed to one another, and which are positioned on outer edge surface 254 of head 250 in such a manner that indicia 253A corresponds with direction in which inner finger integrant 200A moves when deflected outward, and indicia 253B corresponds with the direction in which inner finger integrant 200B moves when deflected outward. In addition, said indicia are formed or configured upon, or in, outer edge surface 254 of head 250 in such a manner as easily discernable visually or tactilely, or both visually and tactilely, when observed or touched frontally or when observed or touched in profile.

Orientation indicia 253A & B provide an easy-to-use method of determining the radial orientation of inner finger integrants 200A & B, before, during and after insertion of the anchor structure in a bore.

Head 250 is substantially nondeformable, being neither configured nor intended to be plastically or elastically deformable to any significant extent.

Inner Finger Ring 212 and Inner Finger Integrants 200A & 200B

Inner finger ring 212 is a tubular member that has an inner diameter equal to that of body 10 and an outer diameter that is less than the outer diameter of body 10. The axial dimension of ring 212 is generally equal to the axial dimension of outer finger retainer ring 232. Inner finger ring 212 serves to provide a mounting place or dock for outer finger retainer ring 232, while at the same time providing a means to connect inner fingers integrants 200A & B with body 10.

Inner finger integrants 200A & B each have an outer surface 202A & B, respectively, an inner surface 204A & B, respectively, an end surface 206A & B, respectively, and two planar edge surfaces 208A & B which extend axially from inner finger ring 212 to end surfaces 206A & B, and which extend radially from outer surfaces 202A & B to inner surfaces 204A & B. The intersections of edge surfaces 208A & B with inner surfaces 204A & B are designated junctures 210A & B. Inner finger integrants 200A & B are joined to or formed with inner finger ring 212 in such locations as to be directly opposed to each other.

Outer surfaces 202A & B are regular and untapered and extend from inner finger ring 212 to join perpendicularly with end surfaces 206A & B, respectively. End surfaces 206A & B are flat radial surfaces which extend inward to join perpendicularly with inner surfaces 204A & B, respectively. Inner surfaces 204A & B are regular and untapered and extend from end surfaces 206A & B, respectively to inner finger retainer ring 212.

Inner finger integrants 200A & B are not in themselves operable bidirectionally deflectable and articulable fingers with bore gripping or engaging abilities of their own; rather inner finger integrants 200A & B are proto-fingers or integrants that have not yet been combined into a complete product, if you will, that is to say they are the separate inner portions of multi-piece or composite bidirectionally deflectable fingers which are configured in relation to outer finger integrants 220A & B, respectively, and vice versa, in such a manner that when assembled together form operational functional composite bidirectionally deflectable fingers 200/220A & B.

Furthermore even though inner finger integrants 200A & B are configured to work in conjunction with outer finger integrants 220A & B, respectively, to form composite bidirectionally deflectable fingers 200/220A & B which as a composite assembly are configured to determine the nature and extent of the deflections and bore engagement characteristics of said composite fingers as whole units, or complete fingers, because the composite fingers formed are formed of separate portions, the separate portions may be configured individually to respond or react to deflective forces and deflective mechanisms differently, and to different extents, and for different purposes. That is to say that the inner finger integrants 20A & B may be configured to predetermine the nature and extent of the deflections of inner finger integrants, while outer finger integrants 220A & B may be configured to determine the nature and extent of the deflections in addition to the bore engagement characteristics of outer finger integrants 220A & B.

Therefore, inner finger integrants 200A & B are further configured in composition, temper, geometry, and dimensions and in relation to outer finger integrants 220A & B and anvil 40 in such a manner that the end portions of inner finger integrants 200A & B which are in relative proximity to end surfaces 206A & B of integrants 200A & B, respectively, can be deflected inward to a sufficient extent during, and as a result of, the actuation process so that inner surfaces 204A & B and junctures 210A & B of the inward deflected portions of integrants 200A & B can engage anvil 40 in manner which will prevent anvil 40 from moving in the direction back into a bore during and after the actuation process. While the corresponding end portions of outer finger integrants 220A & B may not necessarily be configured so.

In other words, the end portions inner finger integrants 200A & B are configured to deflect inward enough to engage anvil 40, while the end portions of outer fingers 220A & B may not be configured in such a manner.

Furthermore, in another alternate embodiment, outer surfaces 202A & B of inner finger integrants 200A & B, respectively, may be configured with inward deflection augmentation means, just as the outer surfaces of the monolithic fingers of other embodiments of the present invention have been. That is to say that the radial grooves or axial grooves or combinations of both or more pliable coatings and such that have been disclosed in other embodiments, to increase the amount of inward deflection of the end portions of bidirectionally deflectable fingers, might be applied to outer surfaces 202A & B of inner fingers 200A & B, respectively.

Variants of Body Module 236

In practice body modules 236 of various lengths with various article attachment means can, and may, be provided to select from. In order to simplify and shorten this missive, all body modules 236 will be of the same and appropriate dimensions, the same composition, and will have the same article attachment means.

Finger Sleeve Module 234

Finger sleeve modules 234 are comprised of an outer finger retainer ring 232 and one each outer finger integrant 220A and 220B.

Outer Finger Retainer Ring 232

Outer finger retainer ring 232 is a short or stubby hollow cone shaped ring which has a non-tapered bore which is designated inner surface 213, and end surface 233, and an aperture 225. Inner surface 213 extends concentrically through retainer ring 232 and joins retainer ring end surface 233 at one end, and joins inner surfaces 224A & B of outer finger integrants 220A & B, respectively, at the other end. The axial dimension inner surface 213 is equal to the axial dimension of inner finger ring 212 and the intersection of inner surface 213 and end surface 233 is designated aperture 225.

The diameter of inner surface 213 of retainer ring 232 is configured to enable inner finger ring 212 to be inserted within inner surface 213 and establish a slight or firm or even robust interference fit within it.

Located in or on end surface 233 of retainer ring 232, is a small indent or recess, which is designated index indent 217. Index indent 217 is adjacent to outer finger integrant 220A, and is located equidistantly from edge surfaces 228A & B of outer finger integrant 220A. Index indent 217 is configured to cooperate with and receive index denticle or bump 215 of distal end surface 214 of body module 236 within its appropriately configured recess. The purpose of index indent 217, in cooperation with index denticle 215, is to provide a positive and easy method of radially orienting and positioning inner finger integrants 200A & B with outer finger integrants 220A & B during the assembly of the modules of this embodiment.

Outer Finger Integrants 220A & B

Outer finger integrants 220A and 220B are integrally joined to or formed with outer finger retainer ring 232. Outer finger integrants 220A & B each have an outer surface 222A &B, respectively, an inner surface 224A and 224B, respectively; and an end surface 226A and 226B, respectively, and two planar edge surfaces which are designated edge surfaces 228A and 228B. Integrants 220A & B are joined to or formed with retainer ring 232 in such positions so as to be directly opposed to one another.

Outer surfaces 222A & B are start at the end of the outer surface of retainer ring 232 and taper inwardly as they extend to outer finger end surfaces 226A & B, respectively. The amount of taper of outer surfaces 222A & B is determined by the amount of outward directed force that is determined to be necessary for a given application, as the taper of outer finger surfaces 222A & B will eventually determine the majority of the angle at which anvil 40 will interact with inner surfaces 204A & B and junctures 210A & B of inner finger integrants 200A & B, respectively, in a wedge-like interaction, which will redirect and multiply the tensional force applied to stem 30 during the actuation process.

Outer finger end surfaces 226A & B are joined to outer finger outer surfaces 222A & B, respectively, and extend radially to perpendicularly intersect with and join with inner surfaces 224A & B, respectively, of outer finger integrants 220A & B, respectively. Inner surfaces 224A & B inner radial dimensions are generally equivalent to the inner radial dimensions of outer finger retainer ring 232, and are regular and untapered, and extend from their junctures with end surfaces 226A & B, respectively, and join with inner surface 213 of outer finger retainer ring 232.

Edge surfaces 228A & B extend axially from retainer ring 232 to end surfaces 226A & B, and extend radially from outer surfaces 222A & B to inner surfaces 224A & B.

Outer finger integrants 220A & B are not in themselves operable or functional bidirectionally deflectable bore gripping fingers. Rather they are the separable outer portions of composite fingers 200/220A & B, and as such are configured to cooperate with inner finger integrants 200A & B, and vice versa, in such a manner that when outer integrants 220A & B are combined with or assembled with inner finger integrants 200A & B, respectively, they will form composite bidirectionally deflectable bore gripping fingers 200/220A & B.

Because the separate inner and outer portions of composite fingers 200/220A & B are separate, even when combined to operate in concert, outer finger integrants 220A & B can be configured in composition, temper, geometry, dimensions, and in relation to inner finger integrants 200A & B, and anvil 40 in such a manner that the end portions of outer finger integrants 220A & B in relative proximity to end portions 226A & B, respectively, may not be deflected inward or may not be deflected inward as much as the relevant counter parts of inner finger integrants 200A & B.

Furthermore it is of note, especially as the composite form of the present embodiment can be applied to other embodiments of the present invention, that the specific manner in which inner integrants 200A & B and outer integrants 220A & B are configured, as described and depicted in the present embodiment, which allows said integrants to operate in cooperation to form operable and functional composite bidirectionally deflectable bore gripping fingers is not the only manner in which they can be configured to effect the same results.

For instance, inner integrants 200A & B and outer integrants 220A & B are of generally the same length and are configured in relation to each other in such a manner that when they are caused to articulate outward they do so while maintaining practically complete surface to surface contact. That is to say that substantially the entirety of outer surfaces 202A & B of inner integrants 200A & B, respectively, contacts and pushes upon substantially the entirety of inner surfaces 224A & B of outer integrants 220A & B, respectively, throughout the outward deflection of said integrants.

In another embodiment with differently configured composite bidirectionally deflectable fingers, the axial dimensions of the inner finger integrants may be significantly less than the axial dimensions of the outer finger integrants, while the end surfaces of both the inner and outer integrants are situated in relatively close proximity to each other, resulting in the locations at which the inner integrants articulate outward being axially offset from the locations at which the outer finger integrants articulate outward.

While still operating in cooperation to form operable and functional composite bidirectionally deflectable bore gripping fingers, the interaction of the inner and outer integrants would be significantly different during and after the outward articulation of said integrants. The difference being that after outward articulation of both the inner and outer integrants begins, only the portions of the inner surfaces of the outer integrants which are in general proximity to the end surfaces of said outer integrants would contact and be pressed upon by the outer surfaces of the inner integrants. In other words, after outward articulation of the integrants begins, rather than there being contact between substantially all of the outer surface of the inner integrant and the inner surface of the outer integrant, there would only be contact between the relevant surfaces near to the end portions of the outer integrants. Though the amount of contact between the relevant surfaces will increase to some extent during continued outward deflection and articulation, when the outward articulation of both inner and outer integrants is stopped by contact with the wall of a bore, only some portions of the outer surface of the inner integrant will be in contact with some portions of the inner surface of the outer integrant.

Variants of Finger Sleeve Module 234 Finger Sleeve Modules 234L, 234M and 234H

For purposes of dissemination and in the interests of simplicity, the numerous configurations and variations in geometry and composition of finger sleeve module 234 that are possible will be limited to the extent that three variants of module 234 with identical compositions but with the outer surfaces 222A & B of outer finger integrants 220A & B tapered with three different mounts of taper will be illustratively created. Because the amount of taper of outer surfaces 222A & B will determine the angle of the wedge-like passage with which anvil 40 will interact, the factor by which each variant of module 234 will cause the tensional force applied to the actuator module 238 to be multiplied and redirected will be different. The three variants are designated in accord with their relative and respective characteristics as follows; low outward force finger sleeve module 234L, medium outward force finger sleeve module 234M, and high outward force finger sleeve module 234H. Aside from the described variations of the amount of taper of outer surfaces 222A & B all variants of finger sleeve module 234 are practically identical so as to be interchangeable.

For illustrative purposes there is a plurality of each variant of finger sleeve modules 234L, 234M, and 234H produced and retained in an illustrative virtual inventory. In this manner these module are made available for review and selection from, and if selected, integration into an anchor structure of the present embodiment.

Additionally, each type or model of finger sleeve module 234, is marked in such a manner as to be easily differentiated from visually similar modules.

Other Possible Variations of Finger Sleeve Modules 234

Because the number of variants of finger sleeve module 234 has been limited to simplify and shorten this missive, the range and diversity of possible variations of finger sleeve modules 234 begs comment.

Although finger sleeve modules 234 of the present embodiment are made of the same material as body module 236, that material being an alloy of aluminum, in practice finger sleeve modules 234 could be made of a different material than the body module, or they could be made of the same material but with more or less temper. Dependent in part on the intended application of the anchor structure, the materials utilized to make sleeve module 234 can be very soft materials such as soft plastics and rubber and the like, or harder plastics such as poly vinyl chloride (PVC) and the like, or very ductile and malleable metals such as aluminum, copper, brass, tin, zinc, and alloys of such metals or harder less ductile metals such as iron, steel, stainless steels, nickel, and alloys of such metals or even extremely hard materials such as carbides, and the like or even precious metals or composites of carbon fibers or glass fibers fixed in various resins. This list is not to limit the materials that could be used to make sleeve modules 234 but rather to communicate the extreme range of possibilities.

Each of the materials listed, along with numerous others not listed, has specific qualities and/or characteristics that in many cases may make that material an attractive candidate from which to make finger sleeve modules, which may be intended for rather mundane applications or conversely extremely unique and specialized applications. The qualities of strength, durability, toughness, degrees of ductility or malleability, degrees of temper or lack thereof, coefficients of friction and degrees of pliability and indexes of plastic deformation verses elastic deformation, are only a portion of the various characteristics that can be utilized to select materials from which to form or make finger sleeve modules 234.

Other qualities such as electrical conductivity or lack thereof, chemical resistance to specific environments, continued performance at extremely high or low temperatures, or intentional bore engagement release at a specific temperature, are only a few of many additional characteristics which might very well play a significant or a defining role in the selection of materials from which finger sleeve modules 234 may be made or formed.

Being able to form or make a finger sleeve module 234 from a material which is selected, in large part, based upon the materials bore engagement characteristics and not its overall qualifications to form a complete and operable bore gripping finger or finger assembly is extremely important. This attribute, which is due to the composite nature of the present embodiment widens the application of the present invention many fold, while allowing the configuration of a particular anchor structure to be matched to a particular application with a degree of precision far beyond that previously practically attainable.

As an example of one possibly application of the composite nature of the present embodiment that may appear rather mundane, but which may have far reaching effects, would be to utilize a hardened or even extremely hard material, such as highly tempered steel or an alloy of carbide, to form a finger sleeve module 234, or the portions of the sleeve module which contact the wall of a bore, and then apply this hard or hardened module 234 to a body module 236 which would be comprised of a more malleable or ductile material, such as steel or aluminum or stainless steel.

The hard, or hardened, material utilized to form the finger sleeve 234, or the portions of the sleeve which contact the wall of a bore, might be provided with ridges or grooves or bumps or even a texture which could be configured in such a manner that when subjected to an appropriate amount of outwardly directed force, the bore contacting portions of outer fingers 220A & B would penetrate, or bite into the wall of a bore to some extent, while the more ductile material utilized to comprise inner finger integrants 200A & B would allow said integrants to interact with an appropriately configured actuator module 238, in a manner which would cause the outward deflection of composite fingers 200/220A & B, and would still enable the end portions of inner finger integrants 200A & B to be deflected inward more efficiently than if they were comprised of a harder material such as that utilized to comprise outer finger integrants 220A & B.

Review of Illustrative Modular Inventory

At this time it might be beneficial to briefly review the illustrative modular inventory that has been described.

There is a plurality of three different variants of actuator module 238; weaker actuator modules 238W, medium actuator modules 238M, and stronger actuator modules 238S.

There is a plurality of practically identical body modules 236.

There is a plurality of three different variants of finger sleeve modules 234; low outward force modules 234L, medium outward force modules 234M and high outward force modules 234H.

A plurality of each of these modules is made conveniently available, and from this inventory particular modules can be selected, based on their particular characteristics and the applicability of those characteristics to a specific bore, to be assembled with other modules selected from this inventory for their particular characteristics and their applicability to the same bore, and subsequently an anchor structures of the present embodiment can be assembled for application to that same specific bore.

Assembly of Modules 234, 236 and 238 to form an Anchor Structure of the Present Embodiment In combination, after being selected because of a specific characteristic or characteristics and being correctly oriented in relation to each other and assembled together, one finger module 234L or 234M or 234H, assembled with one body module 236 will form the anchor component of the present embodiment, which when assembled with one actuator module 238W or 238M or 238S, will form or comprise an anchor structure of the present embodiment.

In order to simplify a description of an assembly method of the present embodiment, all finger sleeve module variants will be referred to as finger sleeve 234, and all actuator module variants will be referred to as actuator module 238 throughout this description of an assembly method, as each variant of a module is designed to be, and is interchangeable with any other variant of the same module.

Assembly of an anchor structure can be accomplished as follows: Inner finger end surfaces 206A & B of inner finger integrants 200A & B, respectively, of one body module 236 are inserted into and through aperture 225 of outer finger retainer ring 232 of a finger sleeve module 234, and into inner surface 213 of outer finger retainer ring 232, by application of some urging, as the dimensions of outer surfaces 202A & B of inner finger integrants 200A & B are equal to the outer dimensions of inner finger ring 212, which is configured to engage the inner surface 213 of outer finger retainer ring 232 in a slight or firm or even robust interference fit.

Inner finger integrants 200A & B continue to be inserted into aperture 213 until distal end surface 214 of body 10 comes into proximity to end surface 233 of outer finger ring 232, at which time the insertion of inner finger integrants 200A & B is stayed or paused.

At this time observation is made of the radial position of index denticle 215 of body module 236, in relation to the radial location of index indent 217 of finger sleeve module 234. At this time, if necessary, finger sleeve module 234 is rotated in one direction or the other around inner fingers 200A & B of body module 236, while maintaining their axial positions in relation to each other, by the application of a sufficient amount of rotational urging, until index denticle 215 and index indent 217 are radially aligned in relation to each in a manner that will allow index denticle 215 to enter into index indent 217 when end surface 233 of finger sleeve module 234 is urged into contact with distal end surface 214 of body module 236.

Now the insertion of finger integrants 200A & B into and through aperture 225 of end surface 233 of sleeve module 234 resumes, with the result that index denticle 215 is pushed into index indent 217 so that end surface 233 of finger sleeve module 234 contacts end surface 214 of body module 236, which completes the assembly of the composite anchor component of the present embodiment.

It is of particular note that after fingers 200A & B are assembled with fingers 220A & B, respectively, resulting from the assembly of a body module 236 with a sleeve module 234, that composite fingers 200/220A & B are bidirectionally deflectable and doubly articulated bore gripping fingers possessing many of the same properties that are demonstrated by monolithic fingers of similar bidirectionally deflectable and doubly articulable anchor components disclosed in other embodiments of the present invention. For example, because they are bidirectionally deflectable and doubly articulated, they will be articulated once in an outward direction while being deflected outward and once in an inward direction while being deflected in an inward direction. Furthermore, because composite fingers 200/220A & B are practically identical and positioned so as to be directly opposed to one another and are acted upon equally by anvil 40 their deflections and articulations will be substantially simultaneous and in opposite directions; additionally, the outward force applied to the wall of a bore by fingers 200/220A & B will be applied in limited or focused locations due to the fact that only the portions of outer surfaces 222A & B of fingers 200/220A & B, respectively, which are located generally equidistantly between edge surfaces 228A & B of fingers 200/220A & B, respectively, contact the wall of a bore.

Now the assembly of an anchor structure of the present embodiment continues by axially inserting the end portion of an actuator stem 30 which is opposite to anvil 40 of an actuator module 238, between and past end surfaces 206A & B and inner surfaces 204A & B of inner fingers 200A & B respectively, and through the inner diameter of body 10 until a sufficient length of stem 30 protrudes from end surface 11 to be engaged by a commercially available blind rivet installation tool. The assembly of an anchor structure of the present embodiment is complete. The assembly of one each of the illustrative modules 234, 236 and 238 has made one illustrative anchor structure of the present embodiment.

Selection of Modules for Assembly into an Anchor Structure of the Present Embodiment and Radial Orientation of Structure within a Bore In previous embodiments the relative strength, hardness or softness, friability, and composition of various materials, especially masonry materials have been mentioned often as a contributing factor when configuring the amount of outward bore gripping force and in configuring the bore engagement characteristics of a particular embodiment, in the present embodiment in addition to the aforementioned factors the actual location of the bore in relation to specific features of the material which comprises the bore is also considered in the module selection process.

An illustrative example of the selection process of modules for incorporation into an anchor structure of the present embodiment is as follows: Stipulating that there is in fact a bore of appropriate dimensions to receive an anchor structure of the present embodiment, and that the illustrative inventory of modules has been provided, note is taken of the general location of the bore and based upon a number of criteria, including the type, strength, hardness, friability and general condition of the material which comprises the bore, that is to say the material that the bore is in, and the anchoring requirements of the specific application, that is to say what the anchor structure is intended to affix to the outer surface of the material of the bore, and a judgment or determination is made as to which modules of the present embodiment in the illustrative inventory could be combined to form an anchor structure which meets or exceed those general requirements. This initial general review of the material of a bore could be likened to the judgment that an experienced worker uses to determine which modules of the present embodiment should be made available at a job site.

After determining which modules could meet the general requirements of the application, the specific features of the material of the bore are also considered. The proximity of any features of the material of the bore, such as edge surfaces, cracks, breaks, cuts, or preexisting holes, or any other feature which might cause the material of the bore to break or to crack when the outwardly directed bore gripping force of an anchor structure is applied to the wall of the bore are evaluated. This more specific review of the location of the bore might be likened to the evaluation and judgment applied by an experienced worker to a specific bore in a specific location.

In the event that there are no such features of any significance within the proximity of the bore an anchor structure is assembled from the modules previously selected from the illustrative inventory and application of the assembled anchor structure may proceed.

In the event that there is a feature or features of some significance within the proximity of the bore which could, or would, cause the material of the bore to be broken or cracked by the outwardly directed forces applied to the wall of the bore during the actuation of an anchor structure which is comprised of the previously selected modules within that bore, a review of the inventory of modules of the present embodiment is made, and if possible different modules are selected which it is determined will satisfy the revised requirements, if possible, and an appropriate anchor structure is assembled from these modules.

In the event that an anchor structure of the present embodiment can not be configured to an extent that would reasonably insure a successful actuation of said anchor structure without causing cracking or breakage of the material of the bore due to the proximity of specific features of the material of the bore, the directionality of application of bore gripping forces of the present invention which is demonstrated by the present embodiment can be utilized to increase the likelihood of successfully actuating an anchor structure within said bore. That is to say, to decrease the likelihood of breakage of the material of the bore.

As there is a feature(s) of some significance within the proximity of the bore which could or would cause the material of the bore to be broken or cracked during actuation of an anchor structure within the bore, the direction in which the feature(s) is located, in relation to the direction that the anchor structure will be inserted into the bore is noted. After the relative direction of the negative feature is noted, a determination is made and note is taken as to which two directions the outwardly directed forces of actuation should be applied to the wall of the bore to minimize the potential of breaking or cracking the material of the bore.

After a determination as to which two directions it would be most advantageous to direct the outward bore gripping force within the bore has been made and noted, the directions that the anchor structure will exert outward bore gripping force are determined by reference to orientation indicia 253A or 253B or both 253A & B. An anchor structure of the present embodiment, which has been assembled from modules previously selected for application to this specific bore is inserted into the bore to the point that inner surface 252 of head 250 contacts the outer surface of the material of the bore and then the anchor structure is rotated back or forth, if necessary, until orientation indicia 253A & B are as closely aligned as conditions will allow with the two directions in which application of outwardly directed bore gripping force are most likely to result in a successful actuation of the anchor structure. At this point, the anchor structure will have been oriented within the bore in a manner which will direct the outward bore gripping forces in the selected directions determined to be most likely to result in a successful actuation of the anchor structure within that particular bore.

Operational Description of a Sixth Alternate Embodiment

The following description of the actuation of the anchor structure of the present embodiment makes reference to FIG. 7.2 through FIG. 7.7, all of which are axial cross sectional views, depicting progressively advanced intervals during actuation.

FIG. 7.2

In FIG. 7.2 it is depicted that the anchor structure of the present embodiment has been inserted into a bore, bore 1, which is in a material, material 2, which has an outer surface, surface 3. Stem 30 is engaged by the pulling portion, pulling portion 6, of a blind rivet installation tool and the pushing portion, pushing portion 5, of the same tool is pushing on outer surface 251 of head 250, while inner surface 252 of said head is contacting surface 3 of material 2.

Prior to the insertion of the anchor structure of the present embodiment into bore 1, a review of the general location of the intended bore was made, including the strength, friability, softness or hardness, and composition of the material of the bore and the intended purpose of the anchor structure, which is to attach article 4 to outer surface 3, of material 2.

For illustrative purposes the general location of bore 1 is in a relatively soft and friable masonry material, such as mortar or slump block or stucco; and article 4 is a diminutive article of no large size and is a decorative item which is not intended to operate in a load bearing or structural capacity. Based upon this information a determination was made that an appropriately configured anchor structure should apply a lower amount of outward force to the wall of bore 1 so as to minimize the potential of causing breakage of the material of bore 1 as a result of the actuation process, while at the same time providing a strong and secure enough anchorage to satisfy the attachment requirements of article 4. As a result, a selection was made of one actuator module 238M, one body module 236, and one finger sleeve module 234W to satisfy the predetermined requirements.

The selected modules where withdrawn from the illustrative inventory and assembled together to form one anchor structure of the present embodiment which will produce and apply a sufficient and relatively low amount of outwardly directed force to the wall of bore 1 as a result of the interaction of the particular modules selected.

However observation of the specific location of bore 1 revealed that bore 1 is in close enough proximity to a feature of material 2, such as an edge surface or crack, to cause concern as to whether the actuation of an anchor structure with even a relatively low amount outwardly directed force might cause material 2 to be broken. As a result a review of the available modules in inventory was made and it was determined that the previous selections were the best available selections for this specific application, despite some small but significant potential for breakage of the material of the bore.

Hence, so as to reduce the potential of breakage due to the actuation of the anchor structure to a minimum, observation was made of the directions in which the features causing concern, such as edge surfaces or cracks, are located in relation to the location of bore 1, and as a result a determination was made as to which directions in relation to the direction that the anchor structure would be inserted into bore 1, an application of outwardly directed force would be least likely to cause breakage of the material of the bore, and these directions were selected and noted.

Then the anchor structure of the present embodiment was inserted through an appropriately sized hole in article 4 and into bore 1 until inner surface 252 of head 250 contacted article 4, and article 4 contacted outer surface 3 of material 2. At which time observation was made of the locations of indicia 253A or 253B or both 253A & B which are situated upon outer periphery 254 of head 250, in relation to the previously selected and noted directions, then the anchor structure was rotated in one direction or the other until indicia 253A & B were as closely aligned with the selected directions as conditions would allow.

At which time rotation was discontinued, leaving the anchor structure situated within bore 1 in such a manner that indicia 253A & B are aligned with the selected directions which were determined to be less likely to cause breakage of material 2, and thus are directions which are more likely to result in a successful coupling of the anchor structure of the present embodiment and bore 1. Because indicia 253A & B are situated upon outer periphery 254 of head 250 in locations which correspond to the directions that composite fingers 200/220A & B will apply bore gripping force to the wall of bore 1, the anchor structure of the present embodiment is oriented within bore 1 in a corresponding manner, as a result of aligning said indicia.

As depicted in FIG. 7.2 the modular anchor structure of the present embodiment is ready to the actuated, and subsequently be coupled to bore 1, to affix article 4 to surface 3 of material 2, with a sufficient and moderate amount of outwardly directed bore gripping force, which will be applied to the wall of said bore in directions selected to decrease the likelihood of breaking the material of the bore by application of said force.

FIG. 7.3

In FIG. 7.3 it is depicted that as pulling portion 6 of the installation tool began to apply tensional force to stem 30 in the direction indicated by arrow 6A, while pushing portion 5 of the same tool applied pressure to outer surface 252 of head 250 in the direction indicated by arrow 5A, stem 30 and anvil 40 began to move in the direction out of bore 1.

The tapered portions of anvil 40 where drawn against the portions of inner surfaces 204A & B in close proximity to end surfaces 206A & B, respectively, with the result that inner finger integrants 200A & B are deflected outward while they articulate at locations in close proximity to their junctions with inner finger ring 212. As inner integrants 200A & B deflect outward they in turn deflect outer finger integrants 220A & B outward which cause outer integrants 220A &B to articulate at their junctures with outer finger retainer ring 232. As a result of the symmetry of composite fingers 200/220A & B and their diametrically opposed positioning, they are deflected outward substantially simultaneously and in opposite directions at a first relatively rapid deflection rate. Furthermore the directions in which they are deflected are directions which are substantially perpendicular to the insertion direction of the anchor structure into bore 1 and are directions which have been selected to reduce the possibility that the outwardly directed forces applied to the wall of bore 1 as a result of the actuation process will cause material 2 to be broken.

In a short period of time, as anvil 40 continued to be drawn against the end portions of inner finger integrants 200A & B, inner surfaces 204A & B of inner finger integrants 200A & B where deflected apart sufficiently to allow the outer most portions of anvil 40 to be pulled past end surfaces 206A & B and in between inner fingers 200A & B, and into contact with junctures 210A & B of inner fingers 200A & B, respectively.

As depicted in FIG. 7.3, anvil 40 is positioned between inner fingers integrants 200A & B, which contact the outer most diameter of anvil 40 by means of junctures 210A & B. Inner finger integrants 200A & B have pushed outer finger integrants 220A & B out toward the wall of bore 1 to the extent that portions of outer surfaces 222A & B of outer finger integrants 220A & B, respectively, which are in close proximity to end surfaces 226A & B of outer finger integrants 220A & B, respectively, have come into contact with the wall of bore 1.

It can be seen that the outward deflection of composite fingers 200/220A & B has caused inner surfaces 204A & B and junctures 210A & B of inner finger integrants 200A & B, respectively, to form a tapered wedge-like passage. As anvil 40 is drawn farther between fingers 200/220A & B, it will first interact with junctures 210A & B and then will interact with inner surfaces 204A & B and junctures 210A & B, to multiply the force applied to anvil 40 and redirect the increased amount of force outward toward the wall of bore 1.

FIG. 7.4

In FIG. 7.4 it is depicted that continued urging of anvil 40 in the direction out of bore 1 has resulted in anvil 40 bearing against junctures 210A & B of inner finger integrants 200A & B, respectively, which has deflected inner finger integrants 200A & B and outer finger integrants 220A & B out toward the wall of bore 1 with an increasing amount of force due to the interaction of anvil 40 with the wedge-like passage formed by junctures 210A & B. As composite fingers 200/220A & B are forced outward the inward deflection mechanism due to beam deformation begins to act upon said fingers. Additionally the amount of increased outwardly directed force is moderate but sufficient to force more portions of outer surfaces 222A & B into contact with the wall of bore 1 and to begin to cause the inward deflection of the end portions of fingers 200/220A & B due to the localized radial deformation mechanism. At the interval depicted in FIG. 7.4, the results of the inward deflection of the end portions of fingers 200/220A & B is not yet apparent, as the inward deflection mechanisms are just starting to act upon said fingers.

FIG. 7.5

In FIG. 7.5 it is depicted that anvil 40 has been drawn farther between inner finger integrants 200A & B and is now exerting a moderate but increasing amount of outwardly directed force upon both inner finger integrants 200A & B and outer finger integrants 220A & B. The increased outward force in conjunction with the inward deflection mechanisms acting upon fingers 200/220A & B, namely beam deformation and localized radial deformation, has caused both the end portions of inner finger integrants 200A & B located between end surfaces 206A & B and anvil 40 and the end portions of outer finger integrants 220A & B located between end surfaces 226A & B and anvil 40 to deflect inward to some extent while articulating at locations close behind anvil 40.

Note that the inwardly deflected end portions of inner integrants 200A & B are depicted as having deflected inward to a greater extent than the inwardly deflected end portions of outer finger integrants 220A & B. In this particular instance, in which inner and outer finger integrants 200A & B and 220A & B, respectively are composed of the same material and have the same temper or hardness, the differential between inward deflections is due mostly to the smaller radial cross sections of inner finger integrants 200A & B which resist the effects of the inward deflection mechanisms being applied less than the larger radial cross sections of outer finger integrants 220A & B.

At about this same time the amount of outwardly directed force being generated by the interaction of anvil 40 with the tapered passage formed by the outwardly deflected junctures 210A & B has radially deformed said junctures outward a sufficient amount so that anvil 40 comes to bear upon inner surfaces 204A & B in addition to said junctures. From this point onward the relatively low amount of force being transferred from inner surfaces 204A & B through composite fingers 200/220A & B to outer surfaces 222A & B increases more rapidly, though still a relatively low amount, as composite fingers 200/220A & B are composed of modules selected to produce a relatively low amount of outwardly directed force Additionally, because composite fingers 220/220A & B are configured to produce a relatively low amount of outward force, the relevant end portions of said fingers probably will not be acted upon by the inward deflection mechanisms of localized reduction of radial cross section or shear force.

FIG. 7.6

In FIG. 7.6 it is depicted that anvil 40 has been pulled a little distance farther in between composite fingers 200/220A & B, with the result that said fingers are being driven outward against the wall of bore 1 with somewhat more force, so that portions of outer surfaces 222A & B are appressed to the wall of said bore.

As anvil 40 was drawn between inner surfaces 204A & B, the amount of force pressing anvil 40 against said surfaces was sufficient to cause the end portions of inner finger integrants 200A & B and outer finger integrants 220A & B to deflect inward somewhat more due to both beam deformation and localized radial deformation, with the result that portions of inner surfaces 204A & B of inner finger integrants 200A & B, respectively, have been deflected inward to an extent that they engage the outer diameter of anvil 40 in such a manner a to prevent said anvil from moving in the direction back into bore 1.

Anvil 40 has become jammed or lodged between composite fingers 200/220A & B and resists moving in the direction out of bore 1, to an extent which causes the tensional force, which is being applied to actuator stem 30 by continued pulling by pulling portion 6 of the rivet installation tool, and continued pushing upon outer surfaces 251 of head 250 by pushing portion 5 of the rivet installation tool, to increase to a moderate amount that is nearly sufficient to cause stem 30 to break at notch 32.

FIG. 7.7

In FIG. 7.7 it is depicted that the continued application of pulling and pushing forces by the appropriate portions of the installation tool has resulted in the amount of tensional force between actuator stem 30 and anvil 40, of actuator module 238M, exceeding the predetermined and moderate amount necessary to cause stem 30 to break at notch 32, and stem 30 has been broken. The now spent portion of stem 30 has been withdrawn from the inner diameter of body 10 of body module 236, and is removed along with pulling portion 6 and pushing portion 5 of the rivet installation tool.

Anvil 40 of actuator module 238M is lodged between inner surfaces 204A & B of inner finger integrants 200A & B, respectively of body module 236, which are being pressed outward against outer finger integrants 220A & B of finger sleeve module 234W, which are in turn pressing against the wall of bore 1 in selected directions with a relatively low but sufficient amount of force to couple the anchor structure with the bore.

The directions in which composite fingers 200/220A & B are applying force to the wall of bore 1 are directions which where selected to be directions in which the application of a relatively low amount of outward force would be less likely to cause breakage of material 2, than application of the same amount of force in other directions; and the directions in which said fingers are applying the relatively low amount of force where predetermined by radially orienting the fingers within bore 1 in relation to the direction in which they where inserted into bore 1 in such a manner that when deflected outward they would be deflected in the selected directions, and furthermore, this was accomplished by positioning or alignment of orientation indicia 253A & B and thus said fingers, in particular orientations in relation to the selected directions.

Furthermore, the sufficient amount of force being applied to the wall of bore 1 is an amount determined to be sufficient to couple the composite anchor component with bore 1 in order to attach article 4 to surface 3, while at the same time being an amount of force not likely to cause material 2 to be broken.

Furthermore finger sleeve module 234W was selected because of specific characteristics, and actuator module 238M was selected because of specific characteristics, which in combination together and with body module 236 would comprise a modularly formed anchor structure which would produce the amount of force which was determined to be a sufficient amount of force to effectively couple the anchor structure with bore 1 so as to attach article 4 to surface 3 of material 2, while at the same time being an amount not likely to cause material 2 to be broken.

In other words, the anchor structure of the present embodiment was assembled of modules selected on the basis of general and specific location of bore 1 and the intended purpose of the anchor structure, to form an anchor structure which is specifically configured for said purpose and specifically for application to bore 1 so as to have a low likelihood of causing breakage of material 2; said anchor structure was then oriented in a specific manner within bore 1 so as to further minimizing any likelihood of causing breakage of said material.

As shown in FIG. 7.7, the modularly assembled anchor structure of the present embodiment has been successfully actuated within bore 1, and inner surface 252 of head 250 is holding article 4 against outer surface 3 of material 2. As head 250 is a substantially nondeformable article attachment means, any amount of pressure or force being applied to article 4 by head 250 to hold or pinch said article against outer surface 3 of material 2 is substantially incidental, and is generally equal to whatever amount of force or pressure was used to effectively position and hold the blind rivet installation tool to facilitate the actuation of the anchor structure.

In summation, upon consideration of the material presented in regards to the modular anchor structure of the present embodiment, it is evident that the specific configurations of composite fingers 200/220A & B and the actuator device comprised of anvil 40 and actuator stem 30, have determined the nature and extent of the deflections of said fingers, and the nature and extent of the engagement of said fingers with the wall of bore 1. In addition, the specific configurations of inner finger integrants 200A & B and outer finger integrants 220A & B, in relation to one another and in relation to the configuration of said actuator device, have determined the nature and extent of the deflections of said inner integrants to be a certain nature and a certain extent, while said configurations have determined the nature and extent of the deflections of said outer integrants to be a different nature and a different extent.

In conclusion, as mentioned previously, other anchor components of the present invention could be configured in similar fashion to the composite form of the anchor component of the present embodiment, that is to say that said other anchor components could and probably will be formed of separate or separable finger portions which are, or can be, assembled together to form operable and functional bidirectionally deflectable fingers. Not only to allow other anchor components of the present invention to be configured in manners which would allow for a modular version of said anchor components and their corresponding anchor structures to be formed to take advantage of the numerous advantages presented in reference to the modular format of the present embodiment, but to also allow said other anchor components to be compositely configured so as to increase the already numerous ways in which the natures and the extents of the deflections and the bore engagements of the bidirectionally deflectable fingers of said other anchor components could be predetermined.

Consideration of the basic premise of the composite form of the anchor component of present embodiment and the modular format of the anchor structure of said embodiment begs comment.

Firstly, it has already been stated that the separate finger portions of the present embodiment may be assembled together in such a manner that they would not necessarily be separable, but yet function as separate portions of bidirectionally deflectable fingers. Secondly, it is also possible and probable that other portions of the anchor components of the present invention will be compositely constructed, in either separable assemblies or separate yet not separable assemblies, or both.

For instance, it is easy to envision another alternate embodiment of the anchor component of the present invention in which the body portion of the anchor component, in addition to the fingers, is comprised of separate portions, either separably assembled or as separate yet not separable assemblies of portions. This is not to say that the finger portions would be separate from the body portions, but rather to say that each body portion would be integrally formed with a finger portion, and then a body-portion-with-finger-portion would be assemble with another body-portion-with-finger-portion to form an assembly which would resemble a body module 236 of the present embodiment, which would then be assembled with a finger sleeve module 234 of the present embodiment, to comprise an operable and functional composite anchor component with composite bidirectionally deflectable fingers. Alternately, a body portion could be formed with a finger, and then be assembled with another body-portion-with-a-finger to form a composite anchor component with bidirectionally deflectable fingers.

ADVANTAGES

From the forgoing descriptions, a number of advantages of my anchor structure with bidirectionally deflectable bore gripping fingers become evident:

(a) They are easily configurable to reliably engage and couple with bores in hard and rugged masonry materials such as cured concrete, as well as softer and less robust masonry materials such as mortar, stucco, and slump block.

(b) They are simple and inexpensive to manufacture.

(c) They are simple and easy to use.

(d) They are well suited to shallow bores.

(e) They can be configured to be easily removed, without damaging the material of the bore.

(f) They can be configured to be difficult to remove, a prerequisite for anchor structures used to install security bars, grates, and doors.

(g) They can be configured to attach articles directly to surfaces without any additional attachment elements, or they can be configured to allow attachment of articles by use of threaded nuts or screws or bolts or they can be configured to first attach an article directly to a surface and then secondly to attach another article to the same anchor structure by use of separable attachment elements.

(h) They can be configured to attach articles to surfaces by use of push-in or snap-in type fasteners, which is particularly useful for seasonal decorations.

(i) They can be easily configured to produce and apply a precise amount of outwardly directed force, one result of which they can be applied to masonry-like materials such as ceramic and porcelain tile, roof tile, glass, and stone, as well as metals, plastics, composite plastics, and wood.

(j) They can be easily configured to be applicable to bores in masonry materials that are within the normally expected range of bores in masonry materials, and at the same time be applicable to oversized bores.

CONCLUSION, RAMIFICATIONS, AND SCOPE

Accordingly, the reader will see that the anchor structure with bidirectionally deflectable fingers of this invention is versatile, broadly applicable, easy to use, and economic to manufacture. Additionally it can be embodied in anchor structures which are easy to remove from a bore, or hard to remove, while at the same time being configured to be applicable to a broad range of materials and a diverse spectrum of attachment requirements.

Furthermore, though obvious, it should be stated that the presentation of the present invention by use of segregated embodiments does not preclude the integration of any particular features or members portions or components or mechanisms or methods or processes disclosed in one embodiment from being combined appropriately with other features or members or portions or components or mechanisms or methods or processes disclosed in reference another embodiment or other embodiments to form yet another embodiment of the present invention. And though the preceding descriptions and disclosures relating to the present invention have been extensive, they have by no means been exhaustive, and so should not be construed as limitations upon the scope of the invention but as merely providing illustrations of some of the presently preferred embodiments of this invention.

A few of many possible examples of other possible embodiments are; specifically and appropriately configured embodiments can be applied to the lumens of tubes or pipes and the like; the bore gripping fingers of an embodiment can initially be frangibly connected to one another and then be separated by their outward deflection to operate and function as bidirectionally deflectable fingers; the outer radial profile of the body of the anchor component can be of other shapes such as triangular, square, trapezoidal, hexagonal or other multi-sided shapes which are regular or irregular or symmetrical or asymmetrical; the outer radial profiles of the fingers can be shaped differently, much the same as the different shapes possible for the body; the axial dimensions of the fingers of finger sleeve modules of compositely formed anchor components could be significantly greater than the axial dimensions of the fingers of the body module with which they would be assembled, and they could be assembled together in such a manner that after the actuation of the previously assembled composite fingers, the outwardly deflected inner finger portions could be pulled in the direction out of a bore and be moved to some extent while the outer finger portions and finger sleeve module would not be moved in an axial direction in relation to the bore; the composite form presented in reference to the sixth alternate embodiment can be applied to the anchor components of other embodiments; the modular form of the sixth alternate embodiment can be applied to anchor structure of other embodiments; and more portions of the anchor component of the sixth alternate embodiment, and other embodiments, can be compositely formed of separate portions, such as the body could be comprised of body portion and the head could be comprised of head portion, either separably assembled or separate and not separable.

Thus the scope of the invention should be determined by the appended claims and their legal equivalents, rather than by the examples given.

I claim:

1. A process for coupling an anchor structure with a bore in a member formed of masonry material, comprising
   a. providing an anchor structure comprising an anchor component and an actuator device that are assembled to form the anchor structure;
      i. the anchor component and actuator device configured so that as the anchor structure is inserted in a first direction into a bore in a member, the anchor component and the actuator device are simultaneously moved in the first direction, to enable an assembled anchor structure to be inserted into a bore in a member,
      ii. the actuator device further configured to be pulled in an opposite direction after the assembled anchor structure has been inserted into the bore, and
      iii. the anchor component including bidirectionally deflectable fingers and the actuator device having a force applying portion that initially forces at least portions of the deflectable fingers to deflect outward and into contact with the wall of the bore as the actuator device is being pulled in the opposite direction, and continued movement of the actuator device in the opposite direction results in deflection of portions of the fingers inwardly and behind the force applying portion, to couple the anchor structure with the bore, and the force applying portion of the actuator is configured to break away from the remainder of the actuator device and remain in the portion of the anchor component that forms the deflectable fingers as the portions of the deflectable fingers deflect inwardly and behind the force applying portion; and
   b. inserting the anchor structure in a first direction and into a bore in a member formed of masonry or masonry like material, and then pulling the actuator device in an opposite direction, so that at least portions of the deflectable fingers are deflected outward and into contact with the wall of the bore, and continued movement of the actuator device in the opposite direction results in deflection of portions of the fingers inwardly and behind the force applying portion, and causes the force applying portion of the actuator to break away from the remainder of the actuator device and remain in the portion of the anchor component that forms the deflectable fingers as the portions of the deflectable fingers deflect inwardly and behind the force applying portion, to couple the anchor structure with the bore.

2. A process as defined in claim 1, wherein the step of inserting the anchor structure in the first direction and into the bore comprises inserting the anchor structure with the bidirectionally deflectable fingers in a selected orientation relative to the first direction, so that the deflectable fingers will deflect outwardly in selected directions relative to the first direction.

3. The process of claim 1 wherein the step of providing an anchor structure comprises configuring said anchor component to be plastically axially compressible.

4. The process of claim 1 wherein the step of providing anchor structure comprises configuring said bidirectionally deflectable fingers to be simultaneously deflectable.

5. The process of claim 1 wherein the step of providing anchor structure comprises configuring said anchor component with at least one article attachment means selected from the group consisting of axially nondeformable heads, axially plastically deformable heads, separable attachment elements, and ancillary separable attachment elements.

6. The process of claim 1 wherein the step of providing anchor structure comprises configuring said fingers and said actuator device to predetermine the nature and the extent of the engagement of said fingers and said bore.

7. The process of claim 1 wherein the step of providing anchor structure comprises configuring said fingers and said actuator device to predetermine the nature and the extent of the deflection of said fingers.

8. The process of claim 1 wherein the step of providing anchor structure comprises configuring said actuator device as an integrally connected actuator stem and force applying portion.

9. The process of claim 1 wherein the step of providing an anchor structure comprises forming said force applying portion as an anvil selected from the group consisting of substantially rigid anvils, substantially elastically compressible anvils, substantially plastically deformable anvils, and expansive anvils.

10. The process of claim 1 wherein the step of providing anchor structure comprises configuring said anchor component and said actuator device to deflect said bidirectionally deflectable fingers outward at multiple sequential and progressively diminished deflection rates.

11. The process of claim 1 wherein the step of providing anchor structure comprises configuring said anchor component with a plurality of said fingers and at least a portion of each finger is tapered.

* * * * *